INVENTOR:
RALPH SINGMAN
By Henry Heyman
ATTY.

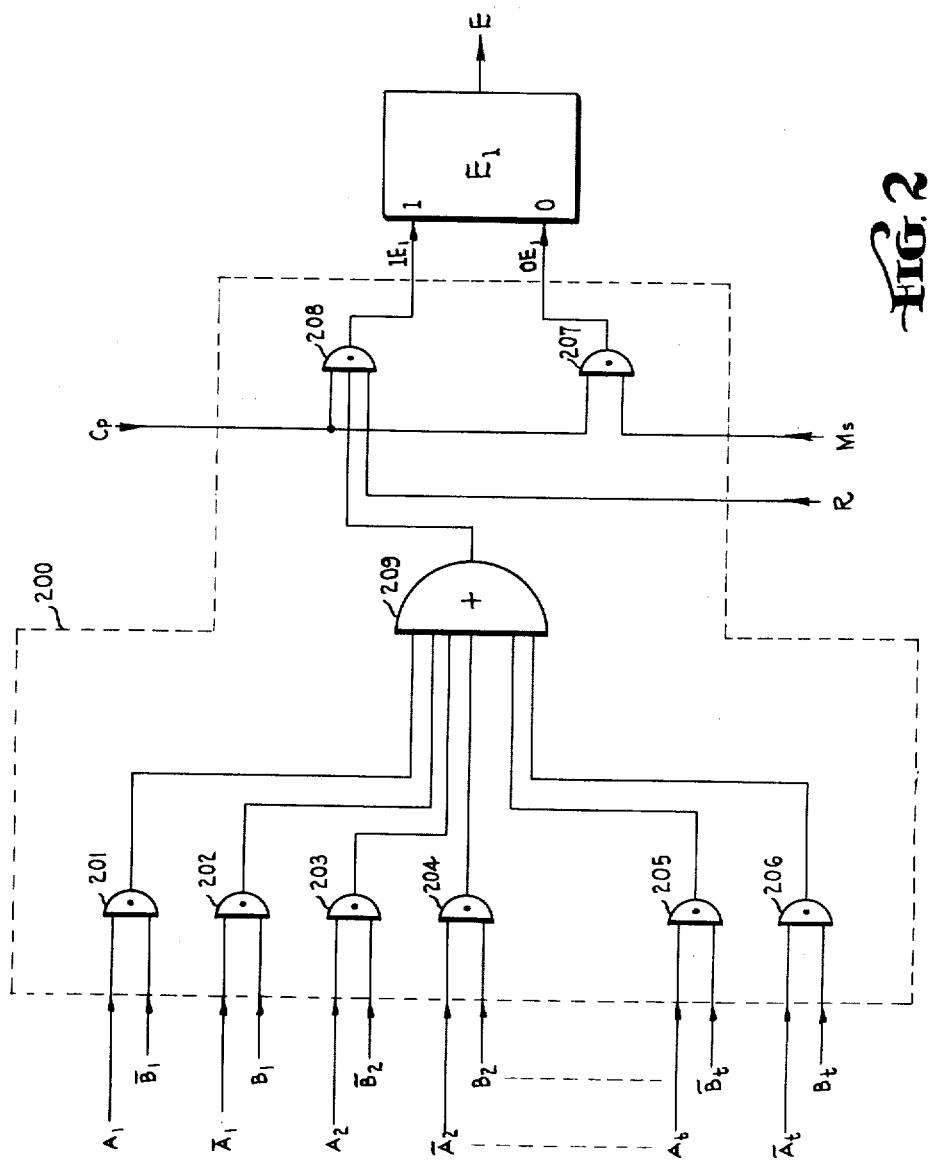

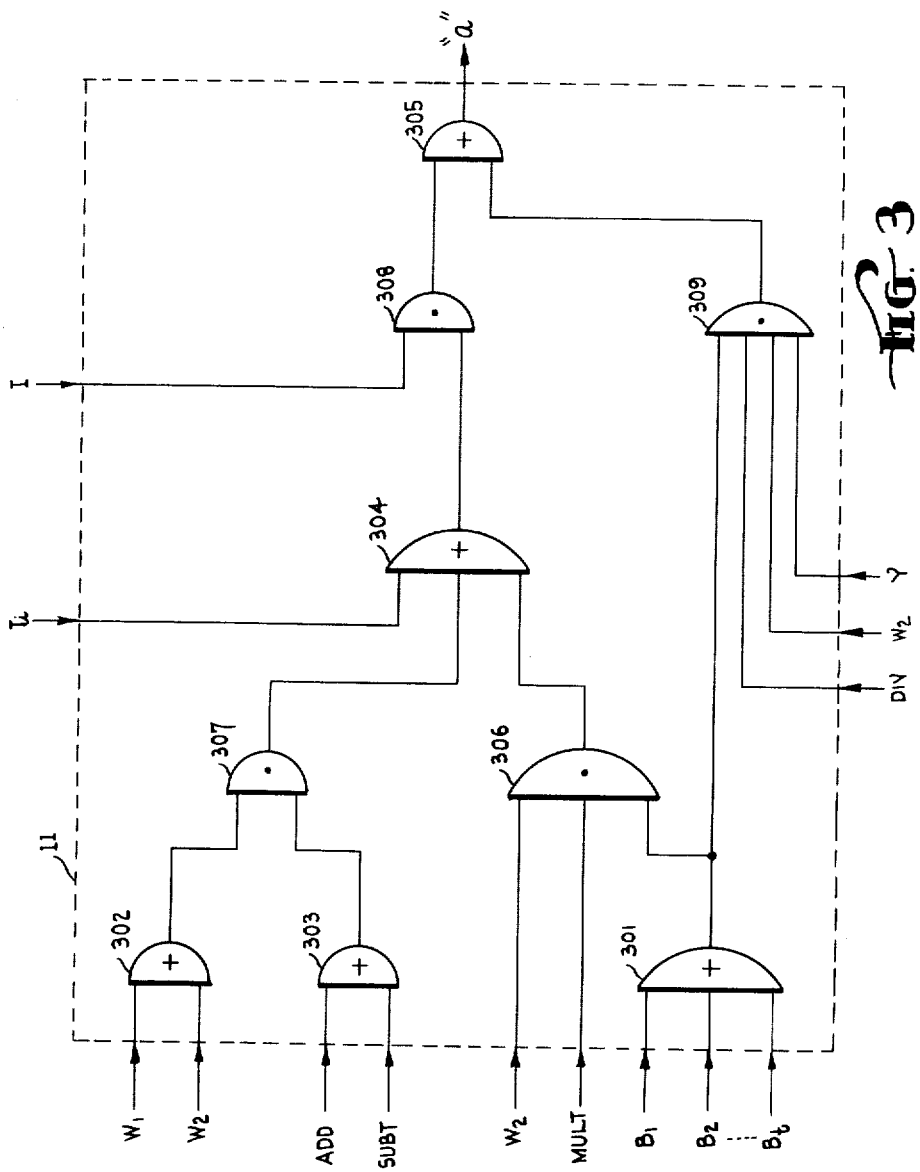

INVENTOR:
RALPH SINGMAN

By Henry Heyman
ATT'Y.

Jan. 5, 1960 R. SINGMAN 2,919,854
ELECTRONIC MODULO ERROR DETECTING SYSTEM
Filed Dec. 6, 1954 15 Sheets-Sheet 7

INVENTOR:
RALPH SINGMAN

By Henry Hyman

ATTY.

INVENTOR:
RALPH SINGMAN
By Henry Heyman
ATT'Y.

INVENTOR:
RALPH SINGMAN

By Henry Heyman
ATT'Y.

INVENTOR:
RALPH SINGMAN

INVENTOR:
RALPH SINGMAN

By Henry Heyman
ATTY.

United States Patent Office 2,919,854
Patented Jan. 5, 1960

2,919,854

ELECTRONIC MODULO ERROR DETECTING SYSTEM

Ralph Singman, Culver City, Calif., assignor to Hughes Aircraft Company, Culver City, Calif., a corporation of Delaware Application December 6, 1954, Serial No. 473,214

27 Claims. (Cl. 235—153)

This invention relates to error detecting systems and more particularly to an electronic modulo error detecting system for supervising the transfer or arithmetic processing of binary and binary-coded data.

In the transfer or arithmetic processing of binary or binary-coded data, that is, data represented by groups of binary digits in accordance with a certain code, it is exceedingly important to detect the occurrence of error. For example, in an electronic digital computer in which large groups of numerical data are processed in order to obtain a single result, the value of the result is necessarily based on and commensurate with computer accuracy. An error detecting device is therefore especially useful in such systems because an error can be detected in the initial process, thereby effecting a saving in time which would otherwise be consumed in checking a possibly erroneous final result.

The prior art discloses various systems for detecting errors in the transfer of binary or binary-coded information data from a source to a receiver. An early method, known in the prior art as the "parity system," utilizes equipment for selectively adding a single binary digit to the data or binary digit groups representing words or numbers at the source in order to produce data having an even number of binary one digits for each datum. An error in transmission is indicated at the receiver by the presence of any datum having an odd number of binary ones. Another method known in the prior art is an extension of the basic parity system wherein each datum at the source is represented by a predetermined number of binary one and zero digits. For example, in a seven element code wherein each datum at the source is represented by three binary one digits and four binary zero digits, any deviation in the number of binary one and zero digits of a datum at the receiver would indicate an error in transference. A more complex extension of the basic parity system for double error detection and single error correction of errors occurring in the transfer of binary-coded information data is disclosed in U.S. Patent 2,552,629 entitled "Error Detecting and Correcting System," by R. W. Hamming et al., issued May 15, 1951. In the Hamming system, the data code groups are divided into parity sub-groups, which are so developed that each element in a code group is included in at least one of the parity sub-groups with no two different elements in each group being in the same set of parity sub-groups.

The error detection systems described above for supervising the transfer of binary or binary-coded information data from a source to a receiver have the disadvantage of limiting the number of available combinations possible for a given number of binary digits or elements in that each character or datum requires non-information carrying elements. Another disadvantage of the above systems is the complexity of the equipment necessary to generate the special codes or permutation groups required. A further important disadvantage, particularly in relation to digital computers, is that the above systems are limited to supervising the transmission or transfer only of datum groups and are not readily adaptable to the supervision of arithmetic processes such as addition, subtraction, multiplication and division.

A prior art method for supervising the transfer and arithmetic processing of binary or binary-coded information data is the "duplication" process wherein each code group or datum is duplicated and the original and duplicate data similarly handled, either simultaneously or consecutively, an error being detected by any dissimilarity between the results derived from the original and duplicate data. The duplication process has the disadvantage of requiring complete duplication of handling equipment in a parallel system or requiring double the handling time in a serial operation.

An error detecting system for supervising the multiplication or division of non-algebraic bi-quuinary or quasi-decimal coded numbers is disclosed in U.S. Patent 2,425,-549 entitled "Calculation Checking Device," by H. P. Luhn, issued August 12, 1947. In accordance with the Luhn checking system, the holding coils of three relay banks are given pre-assigned weights or significance in a manner permitting the storage, in bi-quinary coded form, of a decimal number in each bank. The contacts of each bank are so inter-connected with a common direct current supply as to form, on an associated three-lead output in a binary-coded representation, a modulo three value of the number stored in the bank. The term modulo to the base $n$ will be explained hereinafter. Each operand and the corresponding result, obtained from the arithmetic unit supervised, are placed in an associated one of the three relay banks. The three-lead outputs of each relay bank are connected with the holding coils and contacts of three additional relays in a manner permitting a comparison of the product or quotient of the modulo three values of the operands with the modulo three value of the corresponding result. Error and no error indicator lights are provided for indicating the result of the comparison.

The Luhn error detecting system has the disadvantage of relatively slow operation because it requires electro-magnetic relays in addition to the inherent possibilities of metallic electrical contacts of not properly making or breaking. In supervising the arithmetic units in high speed digital electronic computers, the operating time of the fastest known relay is longer by two or three orders of magnitude. In addition, the Luhn system, although capable of supervising the arithmetic processes of multi-plication and division where the algebraic signs of the operands and result are ignored, is not readily adaptable to supervising the processes of addition and subtraction. Also the above system it limited to supervising the multi-plication and division of bi-quinary coded numbers only, and is not conveniently adaptable to supervising the arithmetic processing of binary or binary-coded numbers.

An error detecting system for supervising the transfer or arithmetic processing of binary numbers is disclosed in U.S. Patent 2,634,052 entitled "Diagnostic Information Monitoring System" by R. M. Block, issued April 7, 1953. In the Block error detecting system, each binary number, ignoring algebraic signs, is given a "weighted count" in accordance with a pre-assigned weighting scheme different from the conventional binary weight count of $1, 2, 4, 8, \ldots 2^{m-1}$, where $m$ represents the number of binary-digit places in the number. In the example used in the Block patent, the weights 1, 2, 4, 1, 2, 4, etc. are employed, and the "weighted count" is formed from the lowest order four digits of the sum of the weights of all binary one digits of the number. The weighted count is electronically converted to a binary number representation and is transferred or arithmetically processed along with the original numbers. The transfer of a number from a source to a receiver is electronically checked by formulating a new weighted count of the number at the receiver and checking this for identity with the weighted count carried with the number. The arithmetic processing of operand numbers is electronically checked by formulating the weighted count of each operand, performing the corresponding arithmetic operation on the weighted counts of the operand numbers to form a "weighted count result," and comparing the relationship between the weighted count of the arithmetic result and the weighted count result. The weighted count of the arithmetic result and the weighted count result bears a predeterminable but different relationship for each of the arithmetic processes of addition, subtraction, multiplication, and division, and the accuracy of the arithmetic operation is checked by a different electronic comparison for each type of arithmetic operation.

The Block error detecting system, although employing electronic circuitry and thus overcoming the slow operational disadvantages of the Luhn relay system, requires extremely complex circuitry for performing a different comparison process for checking each of the arithmetic processes of addition, subtraction, multiplication and division. Also, like the Luhn system, the Block system fails to account for the algebraic signs of the operands and hence permits supervising the arithmetic processing of non-algebraic quantities only. Further, the Block system is limited to binary numbers only and not readily adaptable to supervising the transfer or arithmetic processing of binary-coded decimal or binary-coded octal numbers. Another disadvantage of the Block system is the necessity of transferring or arithmetically processing of the weighted count binary signals thus reducing the efficiency of the transfer medium or arithmetic units.

Accordingly, it is an object of the present invention to provide an electronic error detecting system for supervising the transfer or arithmetic processing of binary or binary-coded data having the advantages of simplicity of circuitry and rapid and reliable operation.

It is another object of the present invention to provide an electronic error detecting system of the type referred to requiring the transfer or arithmetic processing of information-carrying binary digits only.

A further object of the present invention is to provide an electronic error detecting system of the type referred to, operable in combination with a binary or binary-coded data handling system, that is capable of detecting transpositional errors.

It is still a further object of the present invention to provide an electronic error detecting system of the type referred to capable of supervising the transfer of numbers or algebraic operations.

Yet another object of the present invention is to provide an electronic modulo error detecting system for supervising the transfer or arithmetic processing of primary binary or binary-coded data by a data handling system to form the corresponding secondary data, by forming a first and a second modulo equivalent of the primary and secondary data and directly comparing the modulo equivalents so formed.

In accordance with the present invention, an error in the transfer or arithmetic processing of primary binary or binary-coded algebraic data to produce the corresponding secondary data or result is detected by producing a first and a second binary-coded modulo equivalent in accordance with the modulo to the base $n$ values ($Mod_n$) of the primary and secondary data, and directly comparing the first modulo equivalent with the second modulo equivalent. To this end it is only necessary to transfer or to process arithmetically information-carrying binary signals. An error in the transference or arithmetic processing of the data is indicated by any dissimilarity between the first and the second modulo equivalents obtained. The $Mod_n$ value of a number, which may be zero, is herein defined, in accordance with conventional usage, as the remainder left after dividing the number by $n$ to obtain the largest whole integer quotient or "partial quotient" ($Pq$), where $n$ may be any number except zero or one.

In supervising the transfer of algebraic data, a first and a second modulo equivalent is formed equal, respectively, to the $Mod_n$ value of the sum of the $Mod_n$ values of the primary data and of the corresponding secondary data or result. The arithmetic processes of addition, subtraction, and multiplication are supervised by producing a first modulo equivalent equal to the $Mod_n$ value of the sum, difference and product respectively, of the $Mod_n$ values of the primary data, and producing a second modulo equivalent equal to the $Mod_n$ value of the corresponding result or secondary datum. Division is supervised or monitored in accordance with the present invention by forming the first modulo equivalent as the product of the $Mod_n$ values of the primary datum representing the divisor ($Dr$) and the secondary datum representing the partial quotient ($Pq$), and producing the second modulo equivalent as the difference between the $Mod_n$ values of the primary datum representing the dividen ($Dd$) and the secondary datum representing the remainder ($Re$).

While the invention is not limited in its employment to supervising the transfer or arithmetic processing of binary or binary-coded data in any particular type of data handling or transmission system, it is particularly adapted to supervise an "operational unit" in a digital computing system employing trains of discrete electrical pulses or electrical binary signals to represent each datum of information. The term "operational unit," as herein used, refers to a transfer medium, such as an electromagnetic or electrostatic memory device, or an arithmetic unit such as an adder, subtracter, multiplier, or divider unit or combination thereof, for transferring or arithmetically processing, respectively, binary or binary-coded data in digital computing systems. In such systems, each space or time position in the pulse train is representative of a single binary digit. In the system employed to illustrate the present invention, for example, a binary 1 digit is represented by an electrical pulse in a space or time position and a binary 0 digit by the absence of a pulse in the corresponding space or time position.

Although the present invention is adapted to supervise the transfer or arithmetic processing of algebraic numbers in a digital computing system employing any one of the many known methods of representing algebraic numbers, only the "sign-absolute-magnitude" representation is considered in the present specification in order to illustrate the present invention. In accordance with the sign-absolute-magnitude representation, each algebraic datum or number is represented by binary magnitude signals and binary sign signals representing, respectively, the absolute magnitude and algebraic sign of the datum.

There are two general methods of identifying data in digital computing systems, the "program" method and the "identification signal" method, either one or the other or a combination of the two being employed within a given system. According to the program method, each datum is identified in accordance with its position in a serial programming sequence; that is, each datum and its characteristics are identified in the light of the characteristics of the immediately preceding datum as evidenced by the operational program. The identification signal method of identification employs generating, within the computing system, binary identification signals numbering each datum or word, and indicating the algebraic signs and commands or operations associated with the datum. The error detecting system of the present invention is operable in a computing system employing either of the above data identification methods. For clarity of explanation, however, the principles of the present invention are illustrated in embodiments for operation in an identification signal system employing sign, bit, word, and command binary identification signals indicating, respectively, the algebraic sign, binary digits, number, and corresponding operation associated with and forming a part of each datum.

In its basic structural form, the present invention comprises a modulo circuit responsive to binary identification signals and series of primary and secondary binary magnitude signals representing, respectively, the absolute magnitude of the primary and secondary data, for producing a reset signal, and a first and a second binary signal set representing, respectively, the first and second modulo equivalents of the primary and secondary data. Preferably an error circuit, coupled to the modulo circuit and responsive to the reset signal, the first and the second binary signal sets and an externally applied setting signal may be employed for directly comparing the first and the second binary signal sets to produce a two-level monitor signal indicating the accuracy achieved in the transference or arithmetic processing of the primary data by an associated operational unit to produce the corresponding secondary data.

More particularly, the modulo circuit of the present invention includes a control circuit responsive to the binary identification signals for producing control signals (which include the reset signal), a first and a second gate, each responsive to the primary and secondary magnitude signal series and certain of the binary identification signals, for selectively gating the magnitude signal series to produce series of count signals, the first gate producing first count signal series and the second gate producing second count signal series, a first modulo counter coupled to the first gate and the control circuit and responsive to the first count signal series and the control signals for producing the first binary signal set representing the first modulo equivalent, and a second modulo counter coupled to the control circuit and the second gate and responsive to the second count signals and the control signals for producing the second binary signal set representing the second modulo equivalent.

The novel features which are believed to be characteristic of the invention, both as to its organization and method of operation, together with further objects and advantages thereof, will be better understood from the following description considered in connection with the accompanying drawings in which several embodiments of the invention are illustrated by way of example. It is to be expressly understood, however, that the drawings are for the purpose of illustration and description only, and are not intended as a definition of the limits of the invention. In the accompanying drawings:

Fig. 2 is a schematic circuit diagram of the error circuit of the electronic modulo error detecting system of Fig. 1;

Fig. 3 is a schematic circuit diagram of the A gate of the electronic modulo error detecting system of Fig. 1;

Figure 1:
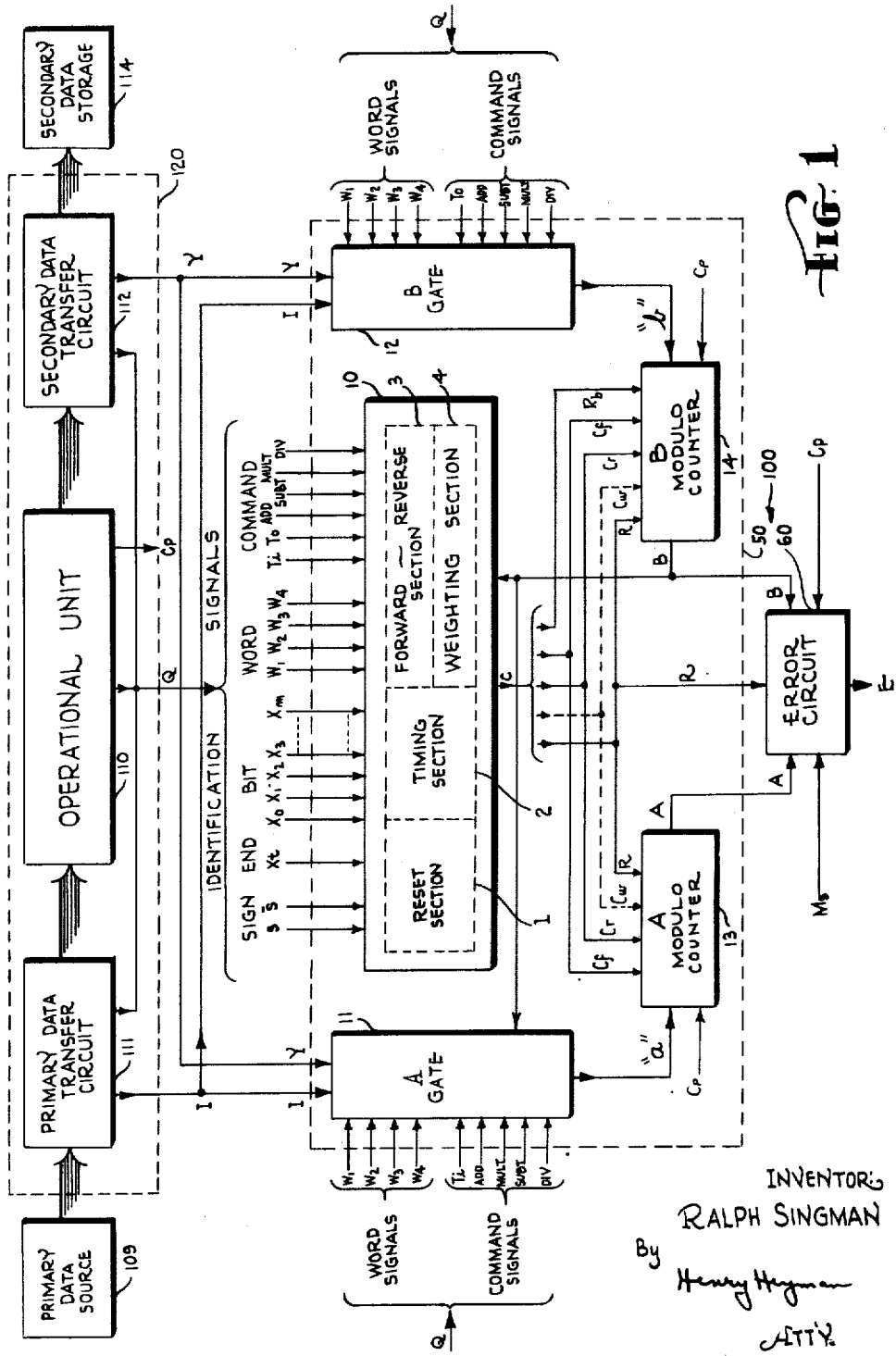
Fig. 1 is a schematic diagram in block form of the electronic modulo error detecting system of the present invention in combination with an operational circuit of a digital computer.
Figure 11A:
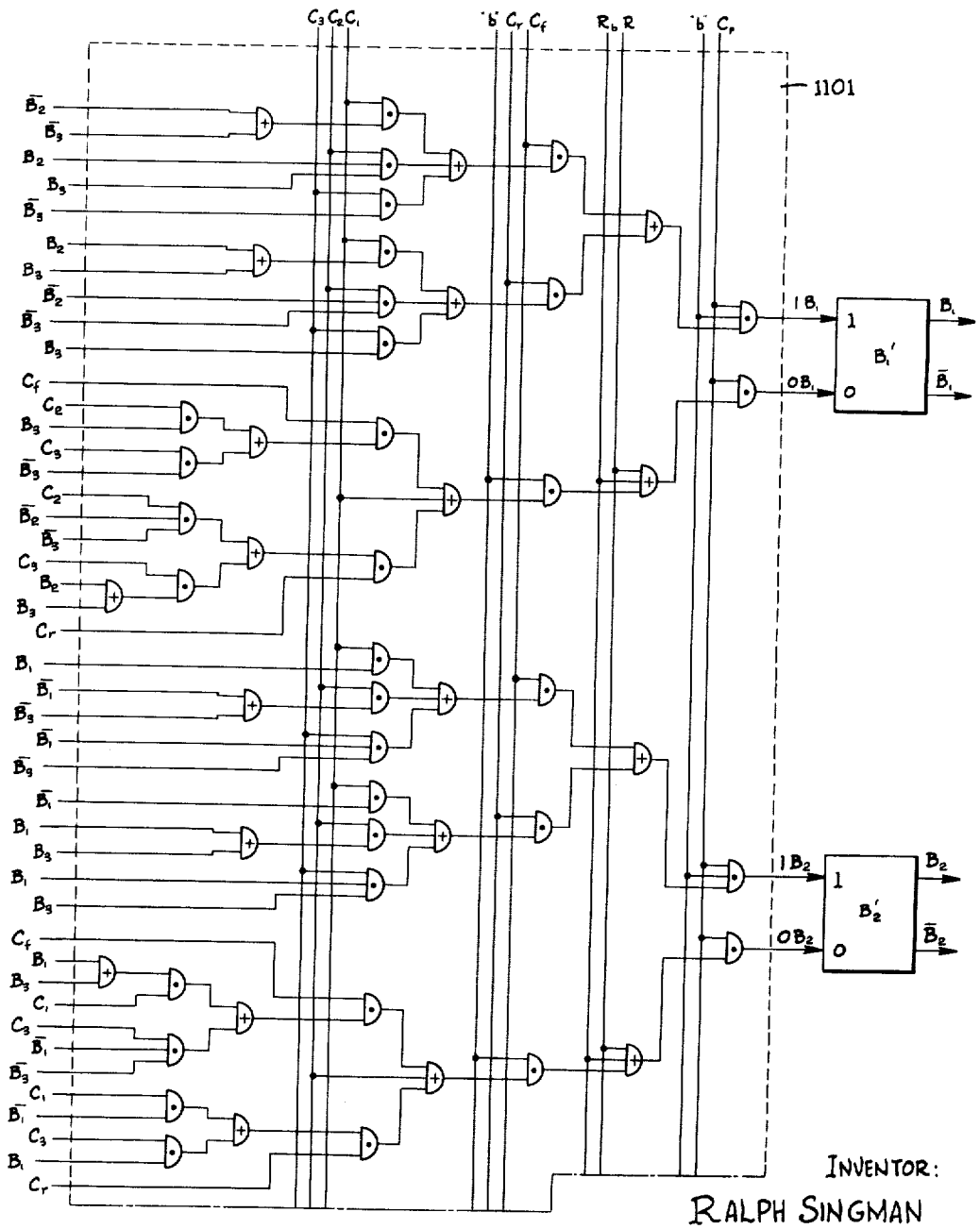
Figures 11A, 11B, 11C:
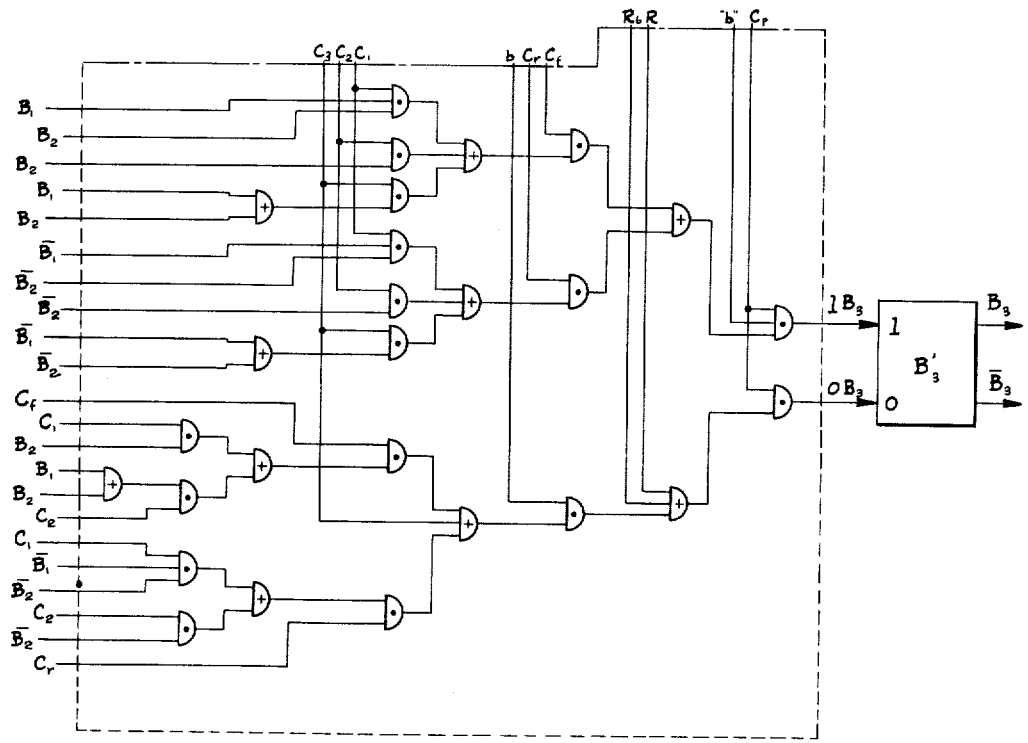
Figure 12A:
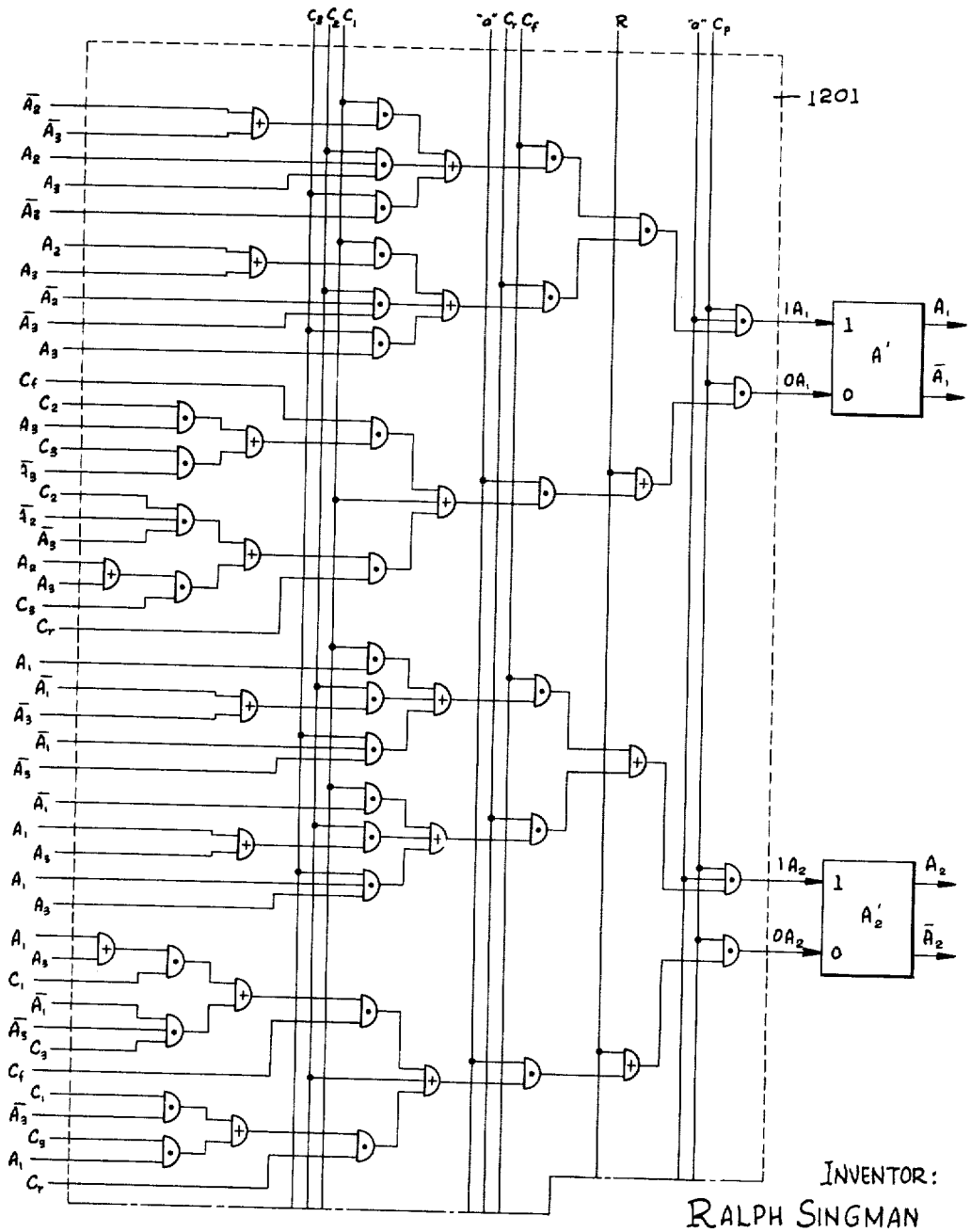
Figure 12:
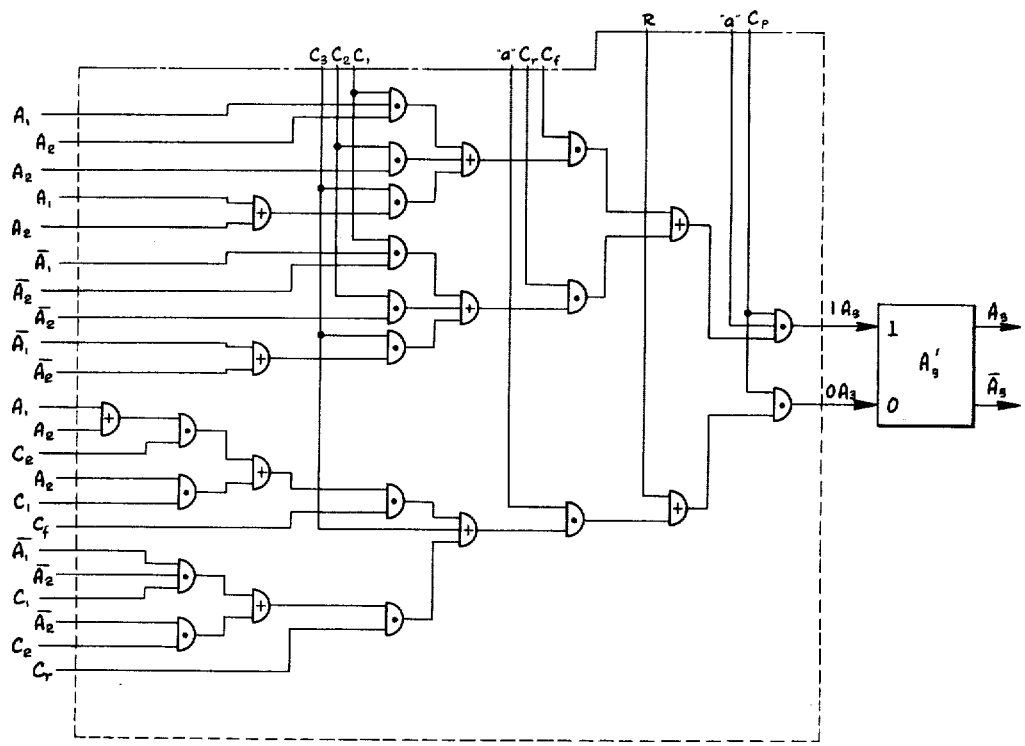
Figure 13:
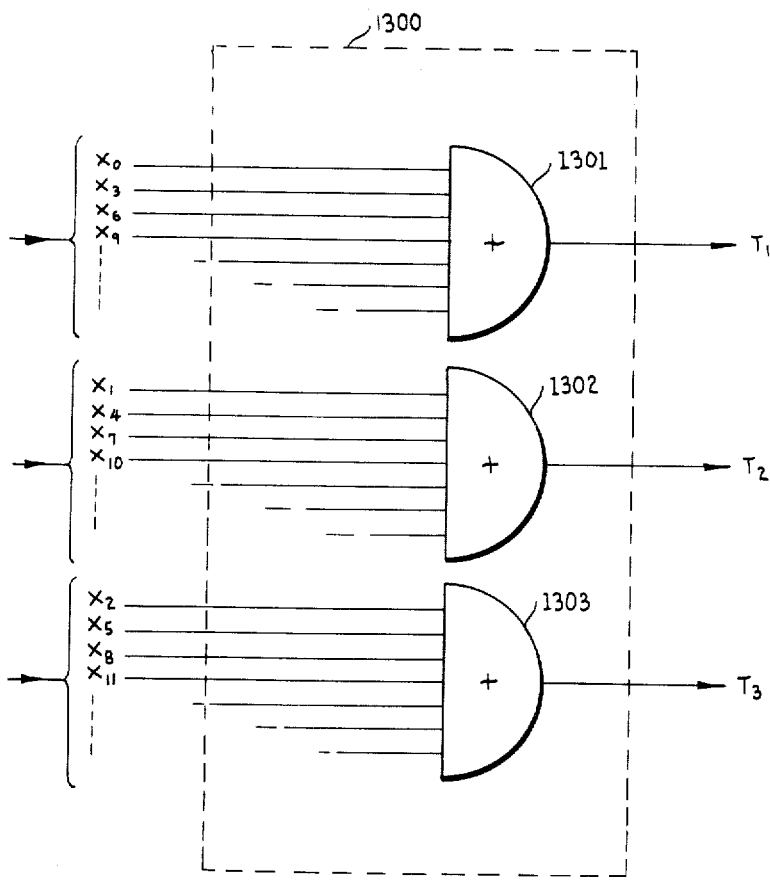
Figure 14:
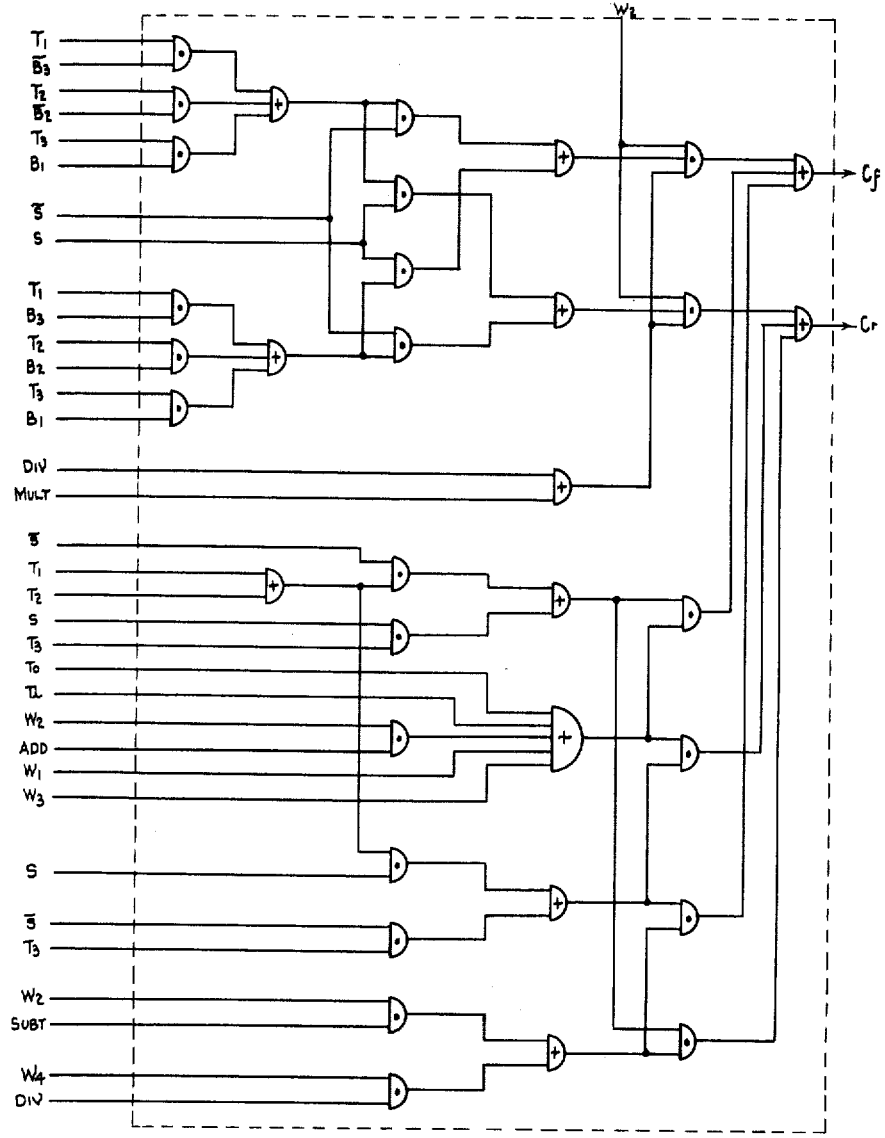
Figure 15:
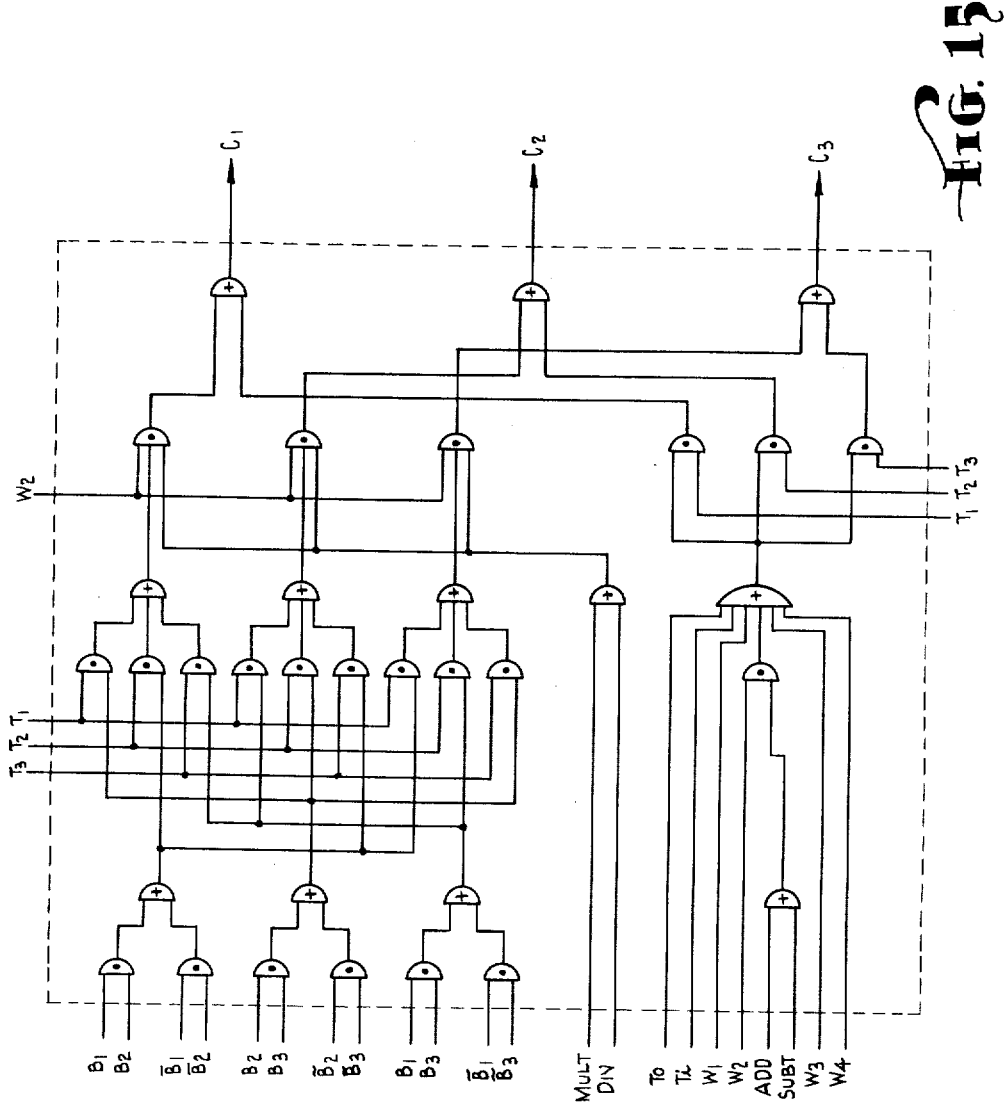

Fig. 11, consisting of Figs. 11a and 11b combined as indicated by diagrammatic Fig. 11c and hereinafter referred to simply as Fig. 11 is a schematic circuit diagram, partly in block form, of a $Mod_7$ embodiment of the B modulo counter of the electronic modulo error detecting system of Fig. 1;

Fig. 12, consisting of Figs. 12a and 12b combined as indicated by diagrammatic Fig. 12c and hereinafter referred to simply as Fig. 12 is a schematic circuit diagram, partly in block form, of a $Mod_7$ embodiment of the A modulo counter of the electronic modulo error detecting system of Fig. 1;

Fig. 13 is a schematic circuit diagram of a $Mod_7$ embodiment of the timing section of the control circuit of the electronic modulo error detecting system of Fig. 1;

Fig. 14 is a schematic circuit diagram of a $Mod_7$ embodiment of the forward and reverse section of the control circuit of the electronic modulo error detecting system of Fig. 1; and Fig. 15 is a schematic circuit diagram of a $Mod_7$ embodiment of the weighing section of the control circuit of the electronic modulo error detecting system of the present invention.

Reference is now made to Fig. 1 wherein there is presented in block form an electronic modulo error detecting system 100 according to the present invention illustrated in conjunction with an operational circuit indicated by broken lines 120 of a data handling system, such as a digital computer. The error detecting system 100 is adapted for supervising the transfer or arithmetic processing of primary binary or binary-coded algebraic data by the operational circuit 120 to produce the corresponding secondary data or result. The error detecting system 100 is responsive to trains of primary magnitude signals I and secondary or resultant magnitude signals Y representing the absolute magnitudes of the primary and the secondary or resultant data, respectively, binary identification signals Q, and clock signals Cp impressed on the error detecting system 100 from the operational circuit 120, and an externally applied setting signal Ms. In response to the applied signals I, Y, Q, Cp, and Ms, the error detecting system 100 develops a two-level monitor signal E indicating any error which may have been produced by the operational circuit 120 in transferring or arithmetically processing the primary data to produce the corresponding secondary data.

The operational circuit 120 receives the primary data in the form of binary electrical signals from a primary data source 109, such as a punched or magnetic tape read unit or an electrostatic or electromagnetic memory device, and delivers the secondary data or result in the form of binary electrical signals to a secondary data storage or utilization circuit 114 which may be a storage medium such as a tape recording device, magnetic drum or electrical memory, or a utilization circuit, such as an automatic machine tool. The operational circuit 120 of the digital computer includes a primary data transfer circuit 111 responsive to the primary data signals from the primary data source 109 for buffering in the primary data to an arithmetic and transfer unit, hereinafter referred to as an operational unit 110, in synchronism with, and at a speed commensurate with, the operating speed of the operational unit 110, and a secondary data transfer circuit 112 responsive to the secondary data signals produced by the operational unit 110 for producing secondary data signals commensurate with the operating speed of the secondary data storage or utilization circuit. The primary and secondary data transfer circuits 111, 112 may be any form of temporary data storage such as a re-circulating register or static register, and the operational unit 110, as previously explained, may be a transfer medium or an arithmetic unit.

The absolute magnitude of each primary datum is represented by a serial train of binary magnitude signals I, wherein each binary digit of the datum represented by the train is indicated by a corresponding binary signal. Similarly the absolute magnitude of each secondary or resultant datum is represented by a train of binary magnitude signals Y, wherein each binary signal represents a corresponding binary digit of the datum represented by the train. For convenience in future discussion, a train of binary magnitude signals I will hereinafter be referred to as an "I signal train" and a train of binary magnitude signals Y as a "Y signal train." The I signal trains are serially received by the error detecting system 100 from the primary transfer circuit 111, and the Y signal trains are serially received by the error detecting system 100 from the secondary transfer circuit 112, because of their convenient availability in serial order from these circuits regardless of the serial or parallel operation of the operational unit 110.

For convenience each transfer or arithmetic operation performed by the operational unit on primary data to produce the corresponding secondary datum is herein referred to as an operational cycle of the operational unit. Accordingly, the transfer of a primary datum to produce the corresponding secondary datum by the operational unit is referred to as an operational cycle. Similarly, the addition, subtraction, multiplication or division of primary data to produce the corresponding resultant secondary datum is referred to as an operational cycle of the operational unit. Although the term operational cycle, as above defined, refers to a process of the operational unit, it is advantageous to consider the time employed by the operational unit during an operational cycle as a defined time period. Accordingly, the term operational cycle period is herein utilized to refer to a period of time employed by the operational unit during an operational cycle.

During each operational cycle of the operational unit 110 (transferring, adding, subtracting, multiplying or dividing), the binary identification signals Q, received by the error detecting system 100 from the operational circuit 120 identify the operation performed by the operational unit 110 and the binary magnitude signals received by the error detecting system 100. These identification signals Q are necessary for the correct operation of operational units in an identification signal type digital computing system and are therefore readily available from the primary data transfer circuit 111, the secondary data transfer circuit 112, or the operational unit 110, or a combination thereof.

The operation performed by the operational unit 110 during each operational cycle is indicated by command identification signals $Ti$, $To$, Add, Subt, Mult, and Div normally available in a digital computing system and indicating, respectively, by 1-representing signals the operations of transferring in, transferring out, adding, subtracting, multiplying, and dividing during an operational cycle period. For example, a 1-representing Mult signal and 0-representing $Ti$, $To$, Add, Subt, and Div signals during an operational cycle period indicates that the operational unit 110 is performing the arithmetic process of multiplication.

Except during transfer operations, each serial train of magnitude signals received from the operational circuit 120 is identified, as it is received by the error detecting system 100, by a 1-representing word identification signal $W_1$, $W_2$, $W_3$, or $W_4$ usually available from a digital computing system and indicating, respectively, the first, second, third, or fourth serial train or word received during an operational cycle period. During transfer operations, word identification signals are unnecessary since no distinction is made by the error detecting system 100 between each datum in a primary and secondary datum group, it only being necessary to differentiate primary data from secondary data.

Since the magnitude signals of each train are serially received by the error detecting system 100, they may be identified in accordance with the binary digit periods or bit times they occupy. Thus if each serial train includes $m$ binary magnitude signals, where $m$ may be any whole integer, each train occupies $m$ binary digit periods or bit times. In accordance with the present invention, the binary magnitude signals of each serial train are identified as they are received by the error detecting system 100 by 1-representing bit identification signals $X_0$, $X_1$, $X_2$, $X_3$ . . . $X_m$ indicating, respectively, a magnitude signal received during the first, second, third, fourth . . . and last or $m$th binary digit period or bit time of each train. The end of each word during arithmetic operations, and the end of an operational cycle of the operational unit 110 during a transfer operation, are indicated by a 1-representing end signal $Xt$. The algebraic signs of the primary and secondary data are indicated by 1-representing sign identification signals S and $\bar{S}$ indicating, respectively, a negative and a positive algebraic sign. The bit, end, and sign binary identification signals are normally essential signals in a digital computing system and are therefore readily available.

The clock signals $Cp$ are synchronizing or timing signals conventionally used throughout a digital computer and developed therein for timing arithmetic operations and for determining the binary digit period or bit time.

During an arithmetic operational cycle of the operational unit 110, each primary datum represents an operand and each secondary datum represents a corresponding result, the nature of the operand and result being dependent upon the operation performed by the operational unit. For example, when the operational unit 110 is multiplying, the primary data will represent a multiplier and a multiplicand operand, and the secondary datum will represent the corresponding product. When the order is known in which the primary and secondary data magnitude signal trains are received by the error detecting system 100 from the operational circuit 120, combinations of 1-representing word and command identification signals identify the operands and corresponding results. For example, in accordance with the illustrated embodiments of the present invention, the operands and results are identified by 1-representing word and command signals according to Table I below wherein the dot (.) represents the logical "and" condition indicating that both signals separated by the dot (.) must be simultaneously 1-representing signals.

TABLE I

| Primary Data | | Secondary Data | |
|---|---|---|---|
| Operands | Identification Signals | Result | Identifi- Signals |
| Augends | $W_1$.Add | } Sum | $W_1$.Add. |
| Addend | $W_2$.Add | | |
| Minuend | $W_1$.Subt | } Difference | $W_3$.Subt. |
| Subtrahend | $W_2$.Subt | | |
| Multiplier | $W_1$.Mult | } Product | $W_3$.Mult. |
| Multiplicand | $W_2$.Mult | | |
| Divisor | $W_1$.Div | $Pq$ | $W_3$.Div. |
| Dividend | $W_2$.Div | Remainder | $W_4$.Div. |
| Transfer-in | $Ti$ | Transfer-out | $To$. |

As illustrated in Fig. 1, the error detecting system 100 includes a modulo circuit indicated by dotted lines 50 and an error circuit 60. The modulo circuit 50, in response to the I and Y signal trains and the identification signals, produces first modulo signals A, second modulo signals B, and binary reset signals R. The error circuit 60 is coupled to the modulo circuit 50 and responsive to signals A, B, and R, and the externally applied setting signals Ms for producing the binary monitor or error indicating signal E.

The modulo circuit 50 includes a control circuit 10, an A gate 11, a B gate 12, an A modulo counter 13, and a B modulo counter 14. The control circuit 10 receives the binary identification signals Q from the operational unit 120 and produces control signals C which are applied to the A modulo counter 13 and the B modulo counter 14. The I signal trains from the transfer circuit 111, the Y signal trains from the transfer circuit 112, and the word and command identification signals are received both by the A gate 11 and by the B gate 12. The A gate 11, in response to the word and command identification signals and signals B received from the B modulo counter 14, selectively gates I and Y signal trains to produce trains of count signals "$a$" which are applied to the A modulo counter 13. Similarly the B gate 12, in response to the word and command identification signals, selectively gates the I and Y signal trains to produce trains of count signals "$b$" which are applied to the B modulo counter 14. Each train of "$a$" count signals and each train of "$b$" count signals represents a corresponding I or Y signal train which in turn represents the absolute magnitude of a corresponding primary or secondary datum. The A modulo counter 13, in response to signals Cp and "$a$" produces signals A, and the B modulo counter 14 in response to signals Cp and "$b$" produces signals B. The values of signals A and B at the end of each operational cycle represent, respectively, the first and second modulo equivalents of the primary and secondary data processed by the operational circuit 120 during the operational cycle.

The modulo signals A produced by the A modulo counter 13 include complementary binary signals $A_1$, $\bar{A}_1$; $A_2$, $\bar{A}_2$; . . . $A_t$, $\bar{A}_t$; (not shown). The bar symbol ($\bar{\ }$) over a signal represents, as is conventional, the complement of the signal; hence 1-representing $A_1$ and $\bar{A}_1$ signals indicate, respectively, corresponding binary 1 and binary 0 digits. Furthermore $t$ is equal to the total number of binary digits represented by signals A. Similarly, modulo signals B include corresponding complementary binary signals $B_1$, $\bar{B}_1$; $B_2$, $\bar{B}_2$; . . . $B_t$, $\bar{B}_t$; (not shown), where the absence and presence of a bar ($\bar{\ }$) over a signal and the value of $t$ have the same significance as above. As will be shown later on, the value of $t$ is dependent upon the modulo base $n$ selected for the error detecting system 100 which, in turn, is a function of the numbering system employed by the operational circuit 120.

During each operational cycle of the operational unit 110, the error circuit 60 produces a 0-representing monitor signal E. At the end of each operational cycle, as indicated by a 1-representing reset signal R, the error circuit compares modulo signals A with modulo signals B. If signals A and B are equal, the error circuit 60 continues to produce a 0-representing E signal. If signals A and B are unequal, the error circuit 60 changes error indicating signal E to a 1-representing signal indicating that an error has occurred during the operational cycle. Signal E remains at a 1-representing level until a 1-representing Ms signal is externally applied to the error circuit 60 causing signal E to be changed to a 0-representing signal for the next operational cycle.

Utilizing the principles of logical Boolean equations, the value of error indicating signal E at any time may be expressed in terms of its previous value E', modulo signals A and B, reset signals R, and the external setting signals Ms as follows:

$$E = (A_1.\bar{B}_1 + \bar{A}_1.B_1 + A_2.\bar{B}_2 + \bar{A}_2.B_2 \\ + \ldots + A_t.\bar{B}_t + \bar{A}_t.B_t)R + E'.\bar{M}s \quad (1)$$

where the dot (.) and parenthesis () indicate logical "and" functions, the plus (+) logical "or" functions, and where a 1-representing $\bar{M}s$ signal indicates the absence of a 1-representing Ms signal ("not" Ms).

It should be noted that reset signal R is included in the above logical equation as an "and" function with signals A and B indicating that the comparison of modulo signals A with modulo signals B is performed only at the end of each operational cycle of the operational unit. As is explained in greater detail elsewhere, signal R has a 0-representing level during each operational cycle of the operational unit and has a 1-representing level at the end of each operational cycle. Obviously, a comparison of modulo signals A with modulo signals B during an operational cycle would be meaningless, signals A and B undergoing constant change in value during the cycle. Thus, reset signal R has a 1-representing value only at the time an error is to be indicated, i.e., at the end of each operational cycle.

Referring now to Fig. 2, there is presented a symbolic or schematic circuit diagram of an embodiment of the error circuit 60 of Fig. 1 for producing a binary monitor or error indicating signal E in response to modulo signals $A_1$, $\bar{A}_1$, $B_1$, $\bar{B}_1$, $A_2$, $\bar{A}_2$, $B_2$, $\bar{B}_2$ . . . $A_t$, $\bar{A}_t$, $B_t$, $\bar{B}_t$, reset signals R, and setting signals Ms, and clock pulse Cp. As shown in Fig. 2, the error circuit includes a logical matrix identified by dotted lines 200 for receiving signals $A_1$, $\bar{A}_1$, $B_1$, $\bar{B}_1$, $A_2$, $\bar{A}_2$, $B_2$, $\bar{B}_2$ . . . $A_t$, $\bar{A}_t$, $B_t$, $\bar{B}_t$, R, Ms, and Cp and producing a pair of control signals $1E_1$ and $0E_1$. The details of construction of logical matrix 200 will be explained hereinafter. The error circuit of Fig. 2 further includes a bistable or flip-flop circuit $E_1$ having a 1 input circuit and a 0 input circuit as indicated coupled to the control matrix 200 and responsive, respectively, to signals $1E_1$ and $0E_1$, and producing a 1-representing output signal E when in the 1 state and a 0-representing output signal E when in the 0 state.

Since the error circuit of Fig. 2 includes a flip-flop E, it is advantageous to consider, at this point, the general form of equations defining the input functions for bistable flip-flops in order to facilitate an explanation of the control matrix 200. A brief discussion will suffice since the theory of flip-flop control functions is discussed in considerable detail in copending U.S. patent applications 327,567 for "Binary-Coded Flip-Flop Counters," by Eldred C. Nelson, filed December 23, 1952, now Patent No. 2,816,223, and Serial No. 327,131 for "Binary-Coded Flip-Flop Counters," by Robert Royce Johnson, filed December 20, 1952, now Patent No. 2,853,238.

Although the flip-flop $E_1$ of the error circuit of Fig. 2 is represented as a conventional flip-flop having a 1 input circuit and a 0 input circuit such that, for example, a negative pulse applied to the 1 input sets the flip-flop to the 1 state and a negative pulse applied to the 0 input sets the flip-flop to the 0 state, it should be understood that, by a slight alteration of the control matrix 200, other types of flip-flops may be used. For example, an "over-riding" flip-flop, which is set to the 0-representing state during each binary digit time interval when a pulse is not applied to its 1 input circuit, may be substituted for the conventional flip-flop $E_1$.

As is more fully explained in the copending applications above referred to, three general classes of flip-flop input functions may be utilized to control the sequence of stable states of an associated bistable flip-flop. The three function classes may be referred to as "setting functions," "changing functions," and "simplified partial changing functions."

Setting functions are represented by logical Boolean equations which directly define the sequence of stable states of the flip-flop. The value of the Boolean equation (binary 1 or binary 0) at any instant indicates the stable state of the flip-flop after the next digit time interval. When a setting function is utilized, the flip-flop must be an over-riding flip-flop of the type just described, or a complementary or inverter circuit must be introduced to translate the gating output signal into complementary signals.

As previously mentioned, an over-riding flip-flop is characterized by a pulse being applied to the 0 input circuit of the flip-flop at each clock or timing pulse, and is only triggered to the 1-representing state for one clock-pulse interval following each application of a triggering pulse to the 1 input circuit of the flip-flop. Accordingly, the setting function, which defines the triggering signal applied to the 1 input circuit of the over-riding flip-flop, defines directly the conditions for setting the flip-flop to the 1-representing state. As a consequence, all other conditions not defined by the setting function, indirectly define the conditions for the flip-flop to be in the 0-representing state. One type of over-riding flip-flop is shown and described in co-pending U.S. patent application, Serial No. 245,737 entitled "Triggering Network for Flip-Flop Circuits," by D. L. Curtis, filed September 8, 1951, now Patent No. 2, 723,080.

Changing functions are represented by logical equations which define the conditions for changing the flip-flop from one stable state to the other stable state, or for triggering the flip-flop from its existing state to the opposite state. When this type of mechanization is utilized, a conventional flip-flop is employed and the gating circuit signal is applied simultaneously to both the 1 and the 0 input circuits of the flip-flop.

In many situations, a logical equation representing a setting function may be divided into two equations representing simplified partial changing functions, one equation defining the conditions for changing the flip-flop from the 0 state to the 1 state, and the other equation defining the conditions for changing the flip-flop from the 1 state to the 0 state. The simplified partial changing functions are particularly useful where the equations include the output signals of the flip-flop to be controlled.

The relationships between the setting, changing, and simplified partial changing functions are fully discussed in the above-mentioned copending applications and, therefore will be considered only briefly in the following discussion.

As is more fully explained in the above-mentioned co-pending applications, the input control function of any flip-flop F may be written in the form of a setting function ToF in the following form:

$$ToF = \bar{F}'.G + F'.H$$

where $F'$ and $\bar{F}'$ represent the complementary output signals of flip-flop F, and where G, H, or $\bar{H}$ may be any function of variables other than $F'$ and $\bar{F}'$. The above setting functions may be separated into two simplified partial changing functions 1F and 0F defining, respectively, conditions for applying pulses to the 1 and to the 0 input circuits of the flip-flops F as:

$$1F = G$$
$$0F = H$$

If the variables G and H above are equal, then a changing function $C_F$ for flip-flop F may be defined by:

$$C_F = G = H$$

The general logical Equation 1 above for the monitor or error indicating signal E may be written in the form of a setting function $ToE_1$ for the flip-flop $E_1$ as follows:

$$ToE_1 = \bar{E}'(A_1.\bar{B}_1 + \bar{A}_1.B_1 + A_2.\bar{B}_2 + \bar{A}_2.B_2 + \ldots$$
$$+ A_t.\bar{B}_t + \bar{A}_t.B_t)R + E'.Ms$$

where signals $E'$ and $\bar{E}'$ represent the complementary output signals of the flip-flop $E_1$. The above setting function may be separated into two simplified partial changing functions $1E_1$ and $0E_1$ as:

$$1E_1 = (A_1.\bar{B}_1 + \bar{A}_1.B_1 + A_2.\bar{B}_2 + \bar{A}_2.B_2 + \ldots$$
$$+ A_t.\bar{B}_t + \bar{A}_t.B_t)R$$
$$0E_1 = Ms$$

which may be written in the form of mechanization equations for the control matrix 200 of Fig. 2 as:

$$1E_1 = R(A_1.\bar{B}_1 + \bar{A}_1.B_1 + A_2.\bar{B}_2 + \bar{A}_2.B_2 + \ldots$$
$$+ A_t.\bar{B}_t + \bar{A}_t.B_t)Cp$$
$$0E_1 = Ms.Cp \qquad (2)$$

where the previously discussed clock signals Cp are introduced to indicate a synchronizing "and" condition for the A and B signals.

Logical or Boolean mechanization equations will be frequently employed in this discussion for explaining the mechanization of circuits employing logical "and" and "or" circuits or gates which correspond directly to the logical equations. It is not considered necessary to describe the specific mechanization of the "and" and "or" circuits, symbolic identification only being employed, since these circuits are well-known in the art. Typical circuits are shown, for example, on pages 37–45 of "High Speed-Computing Devices" by Engineering Research Associates published in 1950 by McGraw-Hill Book Co., Inc., New York and London, and on pages 511–514 of an article entitled "Diode Coincidence and Mixing Circuits in Digital Computers" by Tung Chang Chen, in the Proceedings of the IRE, volume 38, May 1950.

For specific examples of logical "and" and logical "or" together with conventional flip-flops suitable for operation in the error detecting system of applicant's invention, reference is made to U.S. Patent No. 2,644,887, entitled "Synchronizing Generator" by A. E. Wolfe, Jr., issued July 7, 1953.

Each of the "and" functions in Equation 2 is provided in the control matrix 200 of Fig. 2 by a symbolically represented "and" circuit which responds to separately applied input signals and produces a 1-representing output signal only when all of the input signals are simultaneously 1-representing signals. Thus, the "and" function $A_1.\bar{B}_1$ of Equation 2 is provided by an "and" circuit 201 symbolically represented by a semicircle with a dot (.) to indicate its logical function. "And" circuit 201 responds to separately applied signals $A_1$ and $\bar{B}_1$ obtained from A and B modulo counters 13 and 14, respectively, and produces a 1-representing output signal when signals $A_1$ and $\bar{B}_1$ are both simultaneously 1-representing signals. The "and" function $\bar{A}_1.B_1$ of Equation 2 is provided by an "and" circuit 202 which responds to separately applied signal $\bar{A}_1$ and $B_1$ and produces a 1-representing output signal when both input signals simultaneously represent 1. In a similar manner, the remaining "and" functions of Equation 2 are provided by "and" circuits 203, 204, 205, 206, 207, and 208, each of which responds to two or more separately applied input signals and produces 1-representing output signals when all the input signals simultaneously represent 1.

The "or" function in Equation 2 is provided by an "or" circuit 209 symbolically represented by a semicircle provided with a plus (+) to indicate its function. The "or" circuit in the control matrix 200 responds to separately applied input signals and produces a 1-representing output signal when at least one of the input signals is a 1-representing signal. Thus, the "or" function $$(A_1.\bar{B}_1 + \bar{A}_1.B_1 + A_2.\bar{B}_2 + \bar{A}_2.B_2 + \ldots + A_t.\bar{B}_t + \bar{A}_t.B_t)$$

of Equation 2 is provided by the "or" circuit 209 which responds to separately applied input signals $A_1.\bar{B}_1$, $\bar{A}_1.B_1$, $A_2.\bar{B}_2$, $\bar{A}_2.B_2$ ... $A_t.\bar{B}_t$, and $\bar{A}_t.B_t$, and produces a 1-representing output signal when at least one of the input signal is a 1-representing signal.

As previously mentioned, signal Ms is an externally applied signal which is normally a 0-representing signal and is a 1-representing only for a brief period following an error indication of the error circuit of Fig. 2 for the purpose of resetting flip-flop E, to the 0-representing state. In actual operation of the error detecting system of the present invention it has been found practical to use a push-button arrangement for changing signal Ms from the 0-representing level to the 1-representing level. When the error detecting system of the present invention indicates that an error has occurred in an operation of an associated digital computer, it is usually found advantageous to interrupt further operation of the computer until the source of the error has been located and rectified. Accordingly, the interval of time during which signal Ms is maintained as a 1-representing signal due to the comparatively slow operation of push-button switching techniques will not cause any loss of an error indication since computer calculations are interrupted during the interval.

It may be desired, on the other hand, to note errors as they occur without interrupting the operational cycles of the computer. It then becomes necessary to provide means for producing a 1-representing Ms signal of a predetermined short interval after each error indication, preferably having a duration of one clock-pulse period. This may be readily accomplished by merely feeding back the output signal E of flip-flop E, to logical matrix 200 of Fig. 2 as the setting signal Ms, i.e., by connecting output lead E of flip-flop E to the input lead Ms of logical matrix 200 as indicated in the figure by dotted lines. As a consequence, when flip-flop E is triggered to the 1-representing state coincident with a clock pulse Cp, the resulting 1-representing output signal E, which is fed back to logical matrix 200 as signal Ms, causes flip-flop E to be triggered back to the 0-representing state coincident with the next succeeding clock pulse Cp. In this manner, error signal E will have a 1-representing value only during one clock pulse period following each error indication. Obviously, error signal E may be utilized for triggering any appropriate alarm mechanism to provide a visual or audio alarm to alert a computer operator.

The A modulo counter 13 and the B modulo counter 14 included in the modulo circuit 50 of Fig. 1 are both recycling counters having a "forward" and a "reverse" counting sequence and a maximum count capacity of $n$ counting stages per count cycle, where $n$, as above, is equal to the modulo base, which may be any value except 0 or 1, selected for the modulo circuit 50.

The "forward" count sequence of a counter is defined as a positive or accumulating count sequence wherein each count within a counting cycle advances the accumulated count to a larger amount. The "reverse" count sequence is defined as a negative or diminishing count sequence wherein each count within a counting cycle retards or diminishes the accumulated count to a smaller value.

Figure 8A:
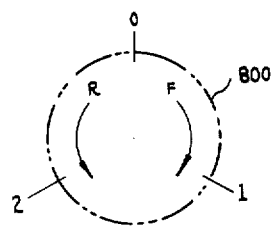
Figs. 8a and 8b are symbolic diagrams of the counts of a $Mod_3$ and a $Mod_7$ recycling counter respectively according to the present invention.
Figure 8B:
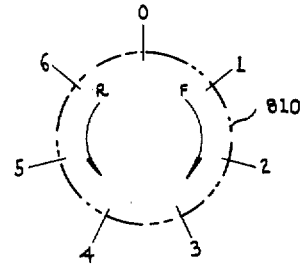

The forward and reverse counting sequences of a $Mod_3$ and a $Mod_7$ recycling counter are symbolically illustrated in Figs. 8a and 8b. In Fig. 8a, the counts 0, 1, and 2 of a $Mod_3$ counter are symbolized by points 0, 1, and 2 equidistant on the circumference of a circle 800. In Fig. 8b, the counts 0, 1, 2, 3, 4, 5 and 6 of a $Mod_7$ counter are indicated by corresponding points 0, 1, 2, 3, 4, 5 and 6 on the circumference of a circle 810. The forward count sequence of each counter is symbolized by a clockwise rotation around the periphery of the corresponding circles as indicated by arrows F in both Figs. 8a and 8b. The reverse count sequence of each counter is symbolized by a counter-clockwise rotation around the periphery of the circles indicated in both figures by arrows R.

The control signals C, developed by the control circuit 10 of Fig. 1, completely control the counting operations of the A modulo counter 13 in counting signals "a," and the B modulo counter 14 in counting signals "b."

As indicated in Fig. 1 the control signals C include forward and reverse signals Cf and Cr, respectively, weighting signals Cw (indicated by dotted lines), reset signals R, and intermediate reset signals Rb. Signals Cf, Cr, Cw, and R are impressed on both the A modulo counter 13 and the B modulo counter 14. The intermediate reset signal Rb is impressed on the B modulo counter 14 only.

Counters 13 and 14 count in a forward sequence in response to 1-representing Cf signals, and in a reverse sequence in response to 1-representing Cr signals. The Cf and Cr signals are mutually exclusive, that is, either one or the other but not both may be a 1-representing signal at any instant.

In response to a 1-representing reset signal R, counters 13 and 14 are reset to their zero counts. In addition, the B modulo counter 14 is reset to a zero count by a 1-representing signal Rb.

As each "a" and "b" count signal is received by the A modulo counter 13 and the B modulo counter 14, respectively, it is assigned a "counting weight" by the weighting signals Cw. The "counting weight" of a count signal is defined as the number of counting steps or stages through which a counter will count in response to the signal. As will be made clear later on, weight signals Cw are unnecessary in a $Mod_3$ embodiment of the present invention adapted for use in a binary, binary-coded decimal, or binary-coded octal numbering system.

The control circuit 10 includes a reset section 1, responsive to the binary identification signals Q for producing the reset and intermediate reset signals R and Rb, respectively, a timing section 2, responsive to the bit identification signals $X_0, X_1 \ldots X_m$ for producing timing signals T (not shown), a forward and reverse section 3, coupled to the timing section 2 and responsive to the identification signals Q and timing signals T for producing signals Cf and Cr, and a weighting section 4, coupled to the timing section 2 and responsive to timing signals T and the identification signals Q for producing weighting signals Cw.

In order to facilitate an explanation of the operation of the modulo circuit 50 and its elements, it is convenient at this point to consider certain fundamental relationships of modulo quantities.

For purposes of illustrating the principles of the present invention, the $Mod_n$ value of any negative quantity $(-U)$ is herein defined as the $Mod_n(n-U)$. For example, the modulo to the base 4 of $(-5)$ may be expressed as follows:

$$Mod_4(-5) = Mod_4(4-5) = Mod_4(-1) =$$
$$Mod_4(4-1) = Mod_4 3 = 3$$

Having thus defined the modulo value of a negative integer, the following algebraic relationships of the $Mod_n$ values of two quantities U and V may be verified:

$$Mod_n[Mod_nU + Mod_nV] = Mod_n(U+V)$$
$$Mod_n[Mod_nU - Mod_nV] = Mod_n(U-V)$$
$$Mod_n[(Mod_nU) \times (Mod_nV)] = Mod_n(U \times V) \quad (3)$$

where the $x$ and the brackets define separate product factors, and the plus (+) and minus (−) signs between terms indicate the addition and subtraction, respectively, of the terms.

An example may be employed to illustrate the validity of the algebraic relationships (3) above. Thus, if $U=7$, and $V=5$, then $Mod_3 7 = 1$ and $Mod_3 5 = 2$, and the $Mod_3(1+2) = Mod_3(7+5) = 0$. Similarly the $$Mod_3(1-2) = Mod_3(-1) = Mod_3(3-1) =$$

$Mod_3(7-5) = 2$, and the $Mod_3(1 \times 2) = Mod_3(7 \times 5) = 2$.

If the count signals of either an "a" count signal train received by the A modulo counter 13, or a "b" count signal train received by the B modulo counter 14, during bit times $X_0, X_1, X_2, X_3 \ldots X_m$ are successively designated as $g_0, g_1, g_2, g_3 \ldots g_m$, then the $Mod_n$ value of the absolute magnitude $Mg$ of the datum represented by the count signal train may be expressed, in light of the $\text{Mod}_n$ relationships (3) above, as follows:

$$Mod_nMg_2 = Mod_n[Mod_n(g_0 \times 2^0) + Mod_n(g_1 \times 2^1)$$
$$+ Mod_n(g_2 \times 2^2) + Mod_n(g_3 \times 2^3) + Mod_n(g_4 \times 2^4)$$
$$+ Mod_n(g_5 \times 2^5) + \ldots + Mod_n(gm \times 2^m)]$$
$$Mod_nMg_{10} = Mod_n[Mod_n(g_0 \times 2^0) + Mod_n(g_1 \times 2^1)$$
$$+ Mod_n(g_2 \times 2^2) + Mod_n(g_3 \times 2^3)$$
$$+ Mod_n(g_4 \times 10 \times 2^0) + Mod_n(g_5 \times 10 \times 2^1)$$
$$\ldots \text{etc.}]$$
$$Mod_nMg_8 = Mod_n[Mod_n(g_0 \times 2^0) + Mod_n(g_1 \times 2^1)$$
$$+ Mod_n(g_2 \times 2^2) + Mod_n(g_3 \times 8 \times 2^0)$$
$$+ Mod_n(g_4 \times 8 \times 2^1) + Mod_n(g_5 \times 8 \times 2^2)$$
$$\ldots \text{etc.}]$$

where $Mg_2$, $Mg_{10}$, and $Mg_8$ equal the absolute magnitude of a corresponding datum in a conventional binary, binary-coded decimal, and binary-coded octal numbering system, respectively.

Since each count signal may have but one of two values, either a binary 1-representing signal or a binary 0-representing signal, and since the $Mod_n0=0$ and the $Mod_n1=1$ for all values of $n$ except 0 or 1, the above expressions may be written as follows:

$$Mod_nMg_2 = Mod_n[g_0Mod_n2^0 + g_1Mod_n2^1 + g_2Mod_n2^2$$
$$+ g_3Mod_n2^3 + g_4Mod_n2^4 + g_5Mod_n2^5$$
$$+ \ldots + gmMod_n2^m]$$
$$Mod_nMg_{10} = Mod_n[g_0Mod_n2^0 + g_1Mod_n2^1 + g_2Mod_n2^2$$
$$+ g_3Mod_n2^3 + g_4Mod_n(10 \times 2^0)$$
$$+ g_5Mod_n(10 \times 2^1) + \ldots \text{etc.}]$$
$$Mod_nMg_8 = Mod_n[g_0Mod_n2^0 + g_1Mod_n2^1 + g_2Mod_n2^2$$
$$+ g_3Mod_n(8 \times 2^0) + g_4Mod_n(8 \times 2^1)$$
$$+ g_5Mod_n(8 \times 2^2) + \ldots \text{etc.}] \quad (4)$$

In Equation 4, it will be obvious that $$g_0Mod_n2^0 = g_0Mod_n1 = g_0$$

The significance of the $Mod_n$ relationships, expressed in the Equations 3 and 4 above, to the operation of the modulo circuit 50 of the present invention will become clearer with a more detailed discussion of the nature of the first and second modulo equivalents represented, respectively, by the accumulated counts of the A modulo counter 13 and the B modulo counter 14 at the end of each operational cycle.

In general, the first and second modulo equivalents must reflect the algebraic values of the primary and secondary data. Further, the first and second modulo equivalents must be such that a direct comparison of the two for equality will indicate a possible error caused by the operational unit during the preceding operational cycle.

In light of the $Mod_n$ relationships expressed in the Equations 3 and 4 above, first and second modulo equivalents meeting the above requirements may be produced as will now be explained. The $Mod_n$ of the sum, difference, and product of the $Mod_n$ values of two or more quantities are referred to, respectively, as the "$Mod_n$ Sum," "$Mod_n$ Difference," and "$Mod_n$ Product"; and the $Mod_n$ values of the sum, difference, and product of the quantities will be referred to as the "sum-result $Mod_n$," "difference-result $Mod_n$," and "product-result $Mod_n$," respectively.

During a transfer operation, the first modulo equivalent may be formed as the $Mod_n$ Sum of the transfer-in data (T$i$), and the second modulo equivalent as the $Mod_n$ Sum of the transfer-out data (T$o$). For addition operations, the first modulo equivalent may be produced as the $Mod_n$ Sum of the augend (A$g$) and addend(A$d$) and the second modulo equivalent as the sum-result $Mod_n$. In subtraction operations, the first modulo equivalent may be produced as the $Mod_n$ difference of the minuend (M$d$) and subtrahend (S$d$), and the second modulo equivalent as the difference-result $Mod_n$. For multiplication operations the first modulo equivalent may be produced as the $Mod_n$ product of the multiplier (M$r$) and multiplicant (M$n$), and the second modulo equivalent as the product-result $Mod_n$. During a division operational cycle, advantage is taken of the relationships between the divisor (D$r$), dividend (D$d$), partial quotient (P$q$) and remainder (R$e$). Since $$\frac{Dd}{Dr} = Pq + \frac{Re}{Dr}$$

by multiplying through by D$r$, the following equality is established:

$$Dd - Re = Pq \times Dr$$

permitting the formation of the first modulo equivalent as the $Mod_n$ product of P$q$ and D$r$, and the second modulo equivalent as the $Mod_n$ difference of D$d$ and R$e$, where, as is conventional, the algebraic sign of the remainder is equal to the algebraic sign of the dividend (D$d$).

For convenience, the nature of the first and second modulo equivalents are presented in tabular form in Table II below:

TABLE II

| Operation | Command | First Modulo Equivalent | Second Modulo Equivalent |
|---|---|---|---|
| Transfer | Ti / To | Mod$_n$ Sum (T$i$) | Mod$_n$ Sum (T$o$). |
| Addition | Add | Mod$_n$ Sum (A$g$) and (A$d$). | Sum-result Mod$_n$. |
| Subtraction | Subt | Mod$_n$ Difference (M$d$) and (S$d$). | Difference-result Mod$_n$. |
| Multiplication | Mult | Mod$_n$ Product (M$r$) and (M$n$). | Product-result Mod$_n$. |
| Division | Div | Mod$_n$ Product (P$q$) and (D$r$). | Mod$_n$ Difference (D$d$) and (R$e$). |

Since each count signal in a count signal train represents a corresponding binary digit of the datum represented by the train, each count signal may be considered as having a "representative weight" defined as the weight or significance of the corresponding binary digit in the datum represented by the train. Thus, count signals received by a modulo counter during bit times $X_0$, $X_1$, $X_2$, $X_3$, $X_4$, $X_5$ . . . etc. have respective representative weights of $2^0$, $2^1$, $2^2$, $2^3$, $2^4$, $2^5$ . . . etc. in a conventional binary numbering system; of $2^0$, $2^1$, $2^2$, $2^3$, $10 \times 2^0$, $10 \times 2^1$ . . . etc. in a conventional binary-coded decimal system; and of $2^0$, $2^1$, $2^2$, $8 \times 2^0$, $8 \times 2^1$, $8 \times 2^2$ . . . etc. in a binary-coded octal system.

From the relationships expressed above in Equations 3 and 4, the following characteristics of a $Mod_n$ counter, such as the A modulo counter 13 and the B modulo counter 14 of Fig. 1, may be formulated.

If the count signals of a count signal train are counted in a forward sequence for a train representing a positive algebraic datum and in a reverse sequence for a train representing a negative algebraic datum, and if each count signal of the train is given a counting weight equal to the $Mod_n$ value of its representative weight, then the value of the final accumulated count of the counter will be equal to the $Mod_n$ algebraic value of the datum represented by the train.

Counting a count signal train in a forward sequence for a train representing a positive datum, and in a reverse sequence for a train representing a negative datum will hereinafter be referred to as a "sign-count."

If a second count signal train representing a second algebraic datum is then "sign-counted" by the same counter, without having previously reset the counter to 0, the final accumulated count of the counter will be equal to the $Mod_n$ sum of the first and of the second algebraic datum. Had the second signal train been "inverse-sign-counted," that is, counted in a forward sequence for a negative datum and in a reverse sequence for a positive datum, the final accumulated count of the counter would have been equal to the $Mod_n$ difference of the first and of the second datum.

If each count signal of the second signal train above had been assigned a counting weight equal to the $Mod_n$ product of its representative weight and the $Mod_n$ value of the first datum as represented by the first accumulated count, and the train had been sign-counted by the same counter after the counter had been reset to 0 or by the other idle counter, then the final accumulated count of the counter would have been equal to the $Mod_n$ product of the first and of the second algebraic datum. This count method will hereinafter be referred to as "product-counting," and the $Mod_n$ value of the first datum during a product count will be referred to as the "product-counting factor."

An example may be used to illustrate the above relationships. Assume a first and a second count signal train representing a first and a second algebraic datum, respectively, in a conventional binary system are to be counted by a $Mod_3$ counter. Further, assume that the first datum has a value of $-37$ and the second datum a value of $+26$. The effective count signals (eliminating 0-representing signals) of the first count signal train will have representative weights of 1, 4, and 32, and the effective count signals of the second train will have representative weights of 2, 8, and 16. The weight counts, that is the $Mod_3$ values of the representative weights, of the first signal train will be 1, 1, and 2, and the weight counts of the second signal train will be 2, 2, and 1.

Referring again to Fig. 8a, the forward and reverse counting sequences of a $Mod_3$ counter in response to the above count signal trains may be exemplified. Thus sign-counting the first signal train may be illustrated by successively counting around the periphery of circle 800 in a counter-clockwise direction from the 0 point in steps of 1, 1, and 2 thus arriving at point 2. Continuing with the counting procedure, in order to find the $Mod_3$ sum of the first and second datum, the second signal train is sign-counted by beginning at point 2 which was previously obtained by sign-counting the first signal train and proceeding in a clockwise direction in successive steps of 2, 2, and 1, thus arriving at point 1.

To find the $Mod_3$ difference of the first and second datum, the second signal train is inverse-sign-counted by beginning at point 2 obtained by the same procedure from the first signal train and proceeding in a counter-clockwise direction successive steps of 2, 2, and 1 to arrive at point 0. Since the $Mod_3$ value of the first datum as previously explained is 2, the counting weights of the second signal train becomes $Mod_3(2\times2)=Mod_34$, $Mod_3(2\times2)=Mod_34$, and $Mod_3(2\times1)=Mod_32$ for a product count which are equal, respectively, to counting weights of 1, 1, and 2.

To find the product-count of the second signal train, the counting weights of 1, 1, and 2 are successively stepped in a clockwise direction from the origin of the circle or point 0 to arrive at point 1. Thus by the above methods, the following values were found.

The $Mod_3$ value of the first datum was equal to 2, and the $Mod_3$ sum, the $Mod_3$ difference, and the $Mod_3$ product of the first and second datum were equal, respectively, to 1, 0, and 1. The values of $Mod_3(-37)$, $Mod_3[(-37)+(+26)]$, $Mod_3[(-37)-(+26)]$, and $Mod_3(-37)(+26)$ are equal, respectively, to 2, 1, 0, and 1, thus checking the above empirical results.

Hence, in view of the foregoing discussion concerning the counting characteristics of a $Mod_n$ counter and the nature of the first and second modulo equivalents presented in Table II above, the operation of the modulo circuit 50 of Fig. 1 may now be considered in detail.

The I signal trains, representing the augend and addend operands during addition and the "transfer-in" data during transfer operations, are gated by the A gate 11 to form "$a$" count signal trains which are sign-counted by the A modulo counter 13. During a subtraction operation, I signal trains representing the minuend and subtrahend are successively gated by the A gate 11 to form again "$a$" count signal trains. The "$a$" count signal train representing the minuend is sign-counted while the "$a$" signal train representing the subtrahend is inverse-sign-counted by the A modulo counter 13.

During transfer, addition, and subtraction operation, the Y signal trains representing, respectively, the "transfer-out" data, the sum, and difference are gated by the B gate 12 to form "$b$" count signal trains which are sign-counted by the B modulo counter 14.

During a multiplication operational cycle, the I signal train representing the multiplier is gated by the B gate 12 to form a "$b$" count signal train which is sign-counted by the B modulo counter 14. Signals B, representing the accumulated count of the B modulo counter 14, are fed to the A gate 11 and to the control circuit 10. If the accumulated count of the B modulo counter is 0, that is, the $Mod_n$ value of the multiplier is equal to 0, then the A gate 11 is closed by signals B. If signals B represent any count other than 0, the I signal train representing the multiplicand is gated by the A gate 11 to produce an "$a$" count signal train. The "$a$" count signal train is then counted by the A modulo counter 13, in response to control signals C from the control circuit 10, in a product-count in accordance with the $Mod_n$ value of the multiplicand. The B modulo counter 14 is then reset to 0 by the intermediate reset signal $Rb$ forming part of the control signals C, and the Y signal train representing the product is then gated by the B gate 12 to form a "$b$" count signal train which is sign-counted by the B modulo counter 14.

A division operation is monitored in the following manner: the I signal train representing the divisor is gated by the B gate 12 to the B modulo counter 14 where it is sign-counted; the Y signal train representing the partial quotient is then gated by the A gate 11, provided signals B from the B modulo counter 14 indicate a value other than 0, to form an "$a$" signal train which is product-counted by the A modulo counter 13; the B modulo counter 14 is then reset to 0 by the intermediate reset signal $Rb$; the I signal train representing the dividend is then gated by the B gate 12 to form a "$b$" count signal train which is sign-counted by the B modulo counter 14; and the Y signal train representing the remainder is then gated by the B gate 12 to form a "$b$" count signal train which is inverse-sign-counted by the B modulo counter 14.

From the foregoing explanation of the error checking procedure utilized to monitor a division operation, it is apparent that the partial quotient $Pq$ is read into the error checking system 100 from the secondary transfer circuit 112 before the dividend $Dd$, a sequence contrary to the sequence of availability of the data from a conventional digital computer division unit. However, to overcome this difficulty, it is only necessary to temporarily store the dividend $Dd$ in a conventional single datum register contained within the primary data transfer circuit 111 until after the partial quotient $Pq$ becomes available from the secondary transfer circuit 112. The partial quotient $Pq$ may be then read from the datum register of the secondary transfer circuit 112 into the A modulo counter 13 through A gate 11.

At the end of each operational cycle of the operational unit 110, both the A modulo counter 13 and the B modulo counter 14 are reset to 0 by the reset signal R.

By referring to Table I above, the intermediate reset signal $Rb$ and the reset signal R may be expresed as a logical Boolean function of the end, word, and command identification signals as follows:

$$Rb = W_2(\text{Mult} + \text{Div})Xt \quad (5)$$
$$R = [To + W_3(\text{Add} + \text{Subt} + \text{Mult}) + W_4 \cdot \text{Div}]Xt$$

For convenience, the above counting sequences of the A modulo counter 13 and the B modulo counter 14 are presented in tabular form in Table III below:

TABLE III

| Datum | Magnitude Signal Train | Counted by | Form of count |
|---|---|---|---|
| Transfer-in | I | A Modulo Counter | Sign-count. |
| Transfer-out | Y | B Modulo Counter | Do. |
| Augend | I | A Modulo Counter | Do. |
| Addend | I | do | Do. |
| Sum | Y | B Modulo Counter | Do. |
| Minuend | I | A Modulo Counter | Do. |
| Subtrahend | I | do | Inverse-sign-count. |
| Difference | Y | B Modulo Counter | Sign-count. |
| Multiplier | I | do | Do. |
| Multiplicand | I | A Modulo Counter | Product-count. |
| Product | Y | B Modulo Counter | Sign-count. |
| Divisor | I | do | Do. |
| Dividend | I | do | Do. |
| Partial Quotient | Y | A Modulo Counter | Product-count. |
| Remainder | Y | B Modulo Counter | Inverse-sign-count. |

If it is assumed that a zero accumulated count of the B modulo counter 14 is represented by all 0-representing B signals, then a zero count may be expresed in logical Boolean form as:

$$B \text{ count of zero} = \bar{B}_1 . \bar{B}_2 \ldots \bar{B}_t$$

where the dot (.) as before indicates a logical "and" proposition. Conversely an accumulated count of "not" zero, that is a logical expression excluding a zero count, may be expressed:

$$B \text{ count of "not" zero} = B_1 + B_2 + \ldots + B_t$$

where the plus (+) indicates the logical non-exclusive "or" proposition.

With the aid of the above assumptions, the operation of the A gate 11 in producing count signals "$a$" and the B gate 12 in producing count signals "$b$" may be expressed, in the form of logical Boolean equations in terms of the I and Y signal trains and the identification of the operands and results given in Table I above, as follows:

$$a = I[Ti + (W_1 + W_2)(\text{Add} + \text{Subt}) + W_2.\text{Mult}(B_1 + B_2 + \ldots + B_t)] + Y.W_2.\text{Div}(B_1 + B_2 + \ldots B_t) \quad (6)$$

$$b = I[W_1(\text{Mult} + \text{Div}) + W_3.\text{Div}] + Y[To + W_3(\text{Add} + \text{Subt} + \text{Mult}) + W_4.\text{Div}] \quad (7)$$

where the parentheses ( ) and brackets [ ] indicate the logical "and."

Referring now to Fig. 3, there is presented a symbolic or schematic circuit diagram of the A gate 11 of Fig. 1 mechanized in accordance with the logical Boolean Equation 6 above.

Each of the "or" functions of Equation 6 is provided by an "or" circuit sybolically represented in Fig. 3. Thus, the "or" function $(B_1 + B_2 + \ldots + B_t)$ of Equation 6 is provided by an "or" circuit 301 which responds to signals $B_1, B_2 \ldots B_t$ and produces a 1-representing output signal when at least one of signals $B_1, B_2 \ldots B_t$ is a 1-representing signal. Similarly each of the "or" circuits 302, 303, and 304 correspond to "or" functions in Equation 6 and respond to separately applied input signals and produce 1-representing output signals when at least one of the input signals is a 1-representing signal. Thus, "or" circuit 302 responds to applied input signals $W_1$ and $W_2$, "or" circuit 303 responds to applied input signals Add and Subt, "or" circuit 304 responds to applied input signals $T_1$ and output signals of logical "and" circuits 306 and 307 (to be explained below), and "or" circuit 305 responds to applied input signals corresponding to output signals of logical "and" circuits 308 and 309 (to be explained below) for developing output signals "$a$."

Each of the "and" functions in Equation 6 above is provided by a logical "and" circuit symbolically represented in Fig. 3. Thus, the "and" function $$W_2.\text{Mult}(B_1 + B_2 + \ldots + B_t)$$

of Equation 6 is provided by an "and" circuit 306 which responds to separately applied signals $W_2$, Mult, and $(B_1 + B_2 + \ldots + B_t)$ and produces a 1-representing output signal when signals $W_2$, Mult, and $(B_1 + B_2 + \ldots + B_t)$ are all simultaneously 1-representing signals. In a similar manner the remaining "and" functions of Equation 6 are provided by "and" circuits 307, 308 and 309, each of which responds to separately applied input signals and produces 1-representing output signals when all the input signals are simultaneously 1-representing. Thus, "and" circuit 307 responds to input signals corresponding to the output signals of "or" circuits 302 and 303, "and" circuit 308 responds to input signals I and input signals corresponding to the output signals of "or" circuit 304, and "and" circuit 309 responds to applied input signals Div, $W_2$, Y and signals corresponding to the output signals of "or" circuit 301.

Figure 4:
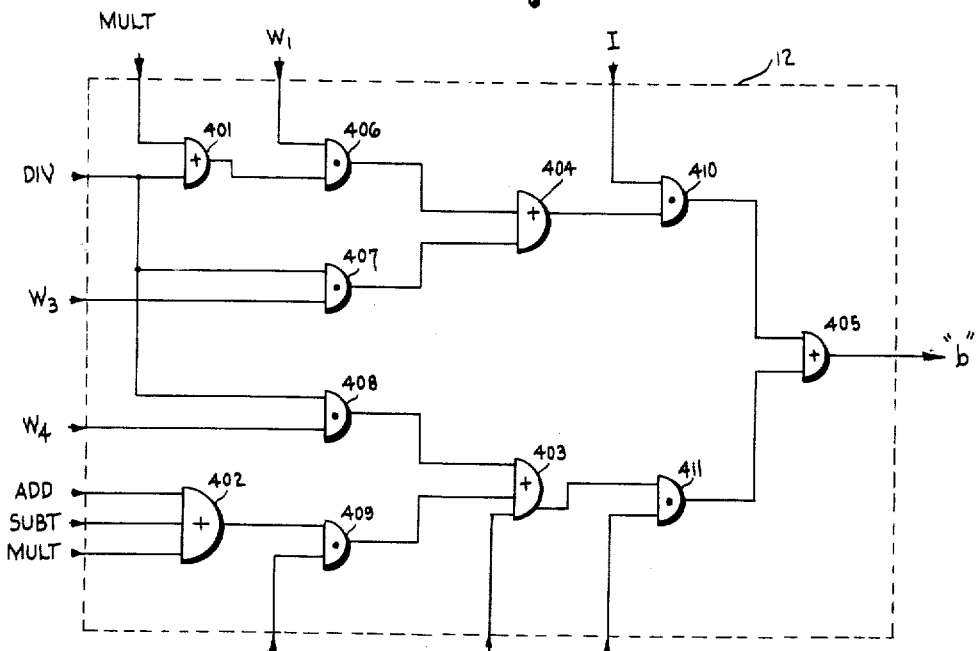
Fig. 4 is a schematic circuit diagram of the B gate of the electronic modulo error detecting system of Fig. 1.

Reference is now made to Fig. 4 wherein there is presented in symbolic form a circuit diagram of the B gate 12 of Fig. 1 for receiving primary and secondary magnitude signals I and Y, respectively, word identification signals $W_1$, $W_3$, and $W_4$, and command identification signals To, Add, Subt, Mult, and Div and producing count signals "$a$." The circuit of Fig. 4 is mechanized in accordance with Equation 7 above, the "and" and "or" functions of the equation being provided by "and" circuits 406, 407, 408, 409, 410, and 411, and by "or" circuits 401, 402, 403, 404, and 405, respectively, in the figure. In view of the previous discussion of mechanizations in accordance with logical equations, further explanation of Fig. 4 is deemed unnecessary.

Figure 5:
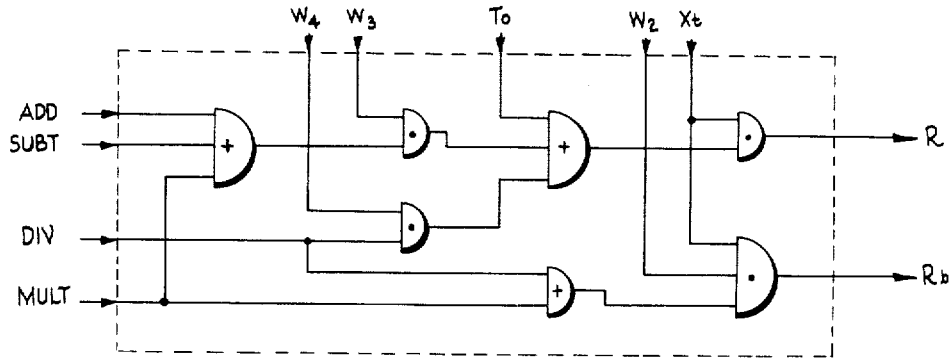
Fig. 5 is a schematic circuit diagram of the reset section of the control circuit of the electronic modulo error detecting system of Fig. 1.

Reference is now made to Fig. 5 presenting, in symbolic form, a detailed circuit diagram of the reset section 1 of the control circuit 10 of Fig. 1, mechanized in accordance with the logical Equations 5 above by means of various "and" and "or" circuits or gates. As indicated in the figure, the reset control circuit receives command signals To, Add, Subt, Mult, and Div, word signals $W_2$, $W_3$, and $W_4$, and end signal $Xt$, and produces reset signals R and intermediate reset signal $Rb$.

The detailed structure of the timing section 2, the forward and reverse section 3, and the weighting section 4 of the control circuit 10, the A modulo counter 13, and the B modulo counter 14 of the error detecting system 100 of Fig. 1 depend upon the value of the modulo base $n$ employed by the error detecting system. Various factors may influence the selection of a modulo base for a particular embodiment of the error detecting system, among which may be the numbering system employed by the operational unit monitored by the embodiment and the degree of accuracy required in the error checking. For example, an embodiment operable in connection with a digital computing system handling conventional binary or binary-coded decimal numbers may employ a different value for $n$ than an embodiment operable in combination with a digital computing system employing binary-coded octal numbers.

As will become apparent from the ensuing discussion from a standpoint of simplicity of circuitry, a modulo base of 3 is particularly adaptable to a conventional binary, binary coded-decimal or binary-coded octal numbering system. However, from an accuracy standpoint a larger integer for a modulo base may be desirable. These and other factors to be considered in selecting a value for $n$ for exemplary binary and binary-coded numbering systems are forthwith considered in detail.

In selecting a value for the modulo base $n$, three basic requirements should be considered. First, $n$ should be as small as possible without falling below the threshold of required accuracy in order to keep the $\text{Mod}_n$ values of the primary and secondary data small and thus economical to handle. Second, a value for $n$ should be chosen which permits the values of the primary and secondary data to be effectively represented by their $\text{Mod}_n$ values. Third, a value for $n$ should be chosen permitting simple and economical conversion of the binary digit weights to their corresponding $Mod_n$ weights.

In order to illustrate the influence of the above three factors in the selection of a value for $n$, reference is made to Tables IV, V, and VI below presenting the $Mod_n$ values of the weights of the binary digits or bits in a conventional binary, binary-coded decimal, and binary-coded octal numbering system for values of $n$ from 2 to 9 inclusive.

Table IV refers to a conventional binary numbering system, Table V to a conventional binary-coded decimal system, and Table VI to a conventional binary-coded octal system. In Tables IV, V, and VI the binary digit periods or bit times $X_0$ to $X_9$ inclusive are presented in the first column of each table, the binary digit or bit weights of signals received during bit times $X_0$ to $X_9$ inclusive are presented in the second column of each table, and the $Mod_n$ values of the binary digit weights for values of $n$ from 2 to 9 inclusive are presented in the remaining columns of each table.

TABLE IV

*Conventional binary*

| Bit Time | Binary Digit Weight | $Mod_n$ Value of Binary Digit Weights for Various Values of $n$ | | | | | | | |
|---|---|---|---|---|---|---|---|---|---|
| | | Value of $n$ | | | | | | | |
| | | 2 | 3 | 4 | 5 | 6 | 7 | 8 | 9 |
| $X_0$ | 1 | 1 | 1 | 1 | 1 | 1 | 1 | 1 | 1 |
| $X_1$ | 2 | 0 | 2 | 2 | 2 | 2 | 2 | 2 | 2 |
| $X_2$ | 4 | 0 | 1 | 0 | 4 | 4 | 4 | 4 | 4 |
| $X_3$ | 8 | 0 | 2 | 0 | 3 | 2 | 1 | 0 | 8 |
| $X_4$ | 16 | 0 | 1 | 0 | 1 | 4 | 2 | 0 | 7 |
| $X_5$ | 32 | 0 | 2 | 0 | 2 | 2 | 4 | 0 | 5 |
| $X_6$ | 64 | 0 | 1 | 0 | 4 | 4 | 1 | 0 | 1 |
| $X_7$ | 128 | 0 | 2 | 0 | 3 | 2 | 2 | 0 | 2 |
| $X_8$ | 256 | 0 | 1 | 0 | 1 | 4 | 4 | 0 | 4 |
| $X_9$ | 512 | 0 | 2 | 0 | 2 | 2 | 1 | 0 | 8 |

TABLE V

*Binary-coded decimal*

| Bit Time | Binary Digit Weight | $Mod_n$ Value of Binary Digit Weights for Various Values of $n$ | | | | | | | |
|---|---|---|---|---|---|---|---|---|---|
| | | Value of $n$ | | | | | | | |
| | | 2 | 3 | 4 | 5 | 6 | 7 | 8 | 9 |
| $X_0$ | 1 | 1 | 1 | 1 | 1 | 1 | 1 | 1 | 1 |
| $X_1$ | 2 | 0 | 2 | 2 | 2 | 2 | 2 | 2 | 2 |
| $X_2$ | 4 | 0 | 1 | 0 | 4 | 4 | 4 | 4 | 4 |
| $X_3$ | 8 | 0 | 2 | 0 | 3 | 2 | 1 | 0 | 8 |
| $X_4$ | 10×1 | 0 | 1 | 2 | 0 | 4 | 3 | 2 | 1 |
| $X_5$ | 10×2 | 0 | 2 | 0 | 0 | 2 | 6 | 4 | 2 |
| $X_6$ | 10×4 | 0 | 1 | 0 | 0 | 4 | 5 | 0 | 4 |
| $X_7$ | 10×8 | 0 | 2 | 0 | 0 | 2 | 3 | 0 | 8 |
| $X_8$ | 100×1 | 0 | 1 | 0 | 0 | 4 | 2 | 4 | 1 |
| $X_9$ | 100×2 | 0 | 2 | 0 | 0 | 2 | 4 | 0 | 2 |

TABLE VI

*Binary-coded octal*

| Bit Time | Binary Digit Weight | $Mod_n$ Value of Binary Digit Weights for Various Values of $n$ | | | | | | | |
|---|---|---|---|---|---|---|---|---|---|
| | | Value of $n$ | | | | | | | |
| | | 2 | 3 | 4 | 5 | 6 | 7 | 8 | 9 |
| $X_0$ | 1 | 1 | 1 | 1 | 1 | 1 | 1 | 1 | 1 |
| $X_1$ | 2 | 0 | 2 | 2 | 2 | 2 | 2 | 2 | 2 |
| $X_2$ | 4 | 0 | 1 | 0 | 4 | 4 | 4 | 4 | 4 |
| $X_3$ | 8×1 | 0 | 2 | 0 | 3 | 2 | 1 | 0 | 8 |
| $X_4$ | 8×2 | 0 | 1 | 0 | 1 | 4 | 2 | 0 | 7 |
| $X_5$ | 8×4 | 0 | 2 | 0 | 2 | 2 | 4 | 0 | 5 |
| $X_6$ | 64×1 | 0 | 1 | 0 | 4 | 4 | 1 | 0 | 1 |
| $X_7$ | 64×2 | 0 | 2 | 0 | 3 | 2 | 2 | 0 | 2 |
| $X_8$ | 64×4 | 0 | 1 | 0 | 1 | 4 | 4 | 0 | 4 |
| $X_9$ | 512×1 | 0 | 2 | 0 | 2 | 2 | 1 | 0 | 8 |

Considering first the conventional binary system, it is evident from Table IV above that values for $n$ of 2, 4, and 8 are unsatisfactory in that the magnitude of a datum represented by a group of binary signals is not substantially indicated by the sum of the $Mod_n$ values of the binary signals. For example, the $Mod_2$ value of a datum in a conventional binary system is equal to the binary value of the least significant binary digit only, the $Mod_2$ values of all higher order digits being 0 regardless of the binary values (1 to 0) of the digits. A further study of Table IV indicates that values for $n$ of 5, 6, and 9 do not appear satisfactory because of the irregular wide range of the $Mod_n$ values of the binary digits. For example, in the order of ascending significance, the $Mod_5$ of the binary digits are 1, 2, 4, 3, 1, 2 . . . etc., requiring a fairly complex conversion system.

Considering next the conventional binary-coded decimal system presented in Table V, the $Mod_2$, $Mod_4$, $Mod_5$, and $Mod_8$ values of a group of binary digits do not adequately represent the magnitude of a datum represented by the digits. Values for $n$ of 7 and 9 appear impractical because of the wide range of the $Mod_n$ values of the binary digits.

In a binary-coded octal system, it is evident from Table VI that values for $n$ of 2, 4, and 8 are unsatisfactory from the standpoint of magnitude representation, and values of 5 and 9 are impractical from a conversion standpoint.

A modulo base of 3 appears to fulfill all three of the above mentioned basic requirements for a conventional binary, binary-coded decimal, and binary-coded octal system. In Tables IV, V, and VI each binary digit has a $Mod_3$ weight other than zero as can be noted by a progression down column four of each table. Further, the $Mod_3$ weights of each binary digit in each table has a simple and uniform relationship with the preceding digit, being in the order of 1, 2, 1, 2 . . . etc., thus permitting simple conversion techniques. Finally, since the $Mod_3$ value of a quantity can have but one of three values, namely 0, 1, or 2, economical modulo counting circuitry may be employed.

Although a $Mod_3$ embodiment of the present invention appears, from Tables IV, V, and VI above, to be ideally suited for monitoring an operational unit processing binary, binary-coded decimal, or binary-coded octal data, other factors not herein considered may predicate a different modulo base. For purposes of illustrating the present invention, therefore, a $Mod_3$ embodiment adapted for use in a binary, binary-coded decimal, or binary-coded octal numbering system, and a $Mod_7$ embodiment adapted for use in a binary or binary-coded octal system, of the error detecting system 100 of Fig. 1 are described in detail, since, as previously pointed out, values for $n$ of 2, 4, 5, 6, 8 and 9 in a binary, binary-coded decimal, and binary-coded octal system, and of 7 in a binary-coded decimal system appear, from Tables IV, V, and VI above to be impracticable. As the structures of the error circuit 60, and A gate 11 and B gate 12 of the modulo circuit 50, previously described in detail, are generic to all $Mod_n$ embodiments of the error detecting system, only $Mod_3$ and $Mod_7$ modifications of the control circuit 10, the A modulo counter 13, and the B modulo counter 14 remain to be considered.

Considering first a $Mod_3$ embodiment of the present invention, the counts of a $Mod_3$ modification of the B modulo counter 14 of Fig. 1 may be arbitrarily expressed in terms of a pair of complementary binary signals $B_1$, $\bar{B}_1$ and $B_2$, $\bar{B}_2$ in accordance with a truth table, where each count is expressed by a particular permutation of signals $B_1$ and $B_2$. In other words, since a modulo-three counter may have but one of three possible counts, i.e., 0, 1, and 2, at any one time, the contents of the counter at any count may be expressed by two binary variables $B_1$, $B_2$. Consequently, binary signals $B_1$ and $B_2$ are different orders of the same count; signals $B_1$ and $B_2$ having different values for each count of the counter.

This truth table is constructed by permutating the values for the signals $B_1$ and $B_2$, it being unnecessary to consider the complementary signals $\bar{B}_1$ and $\bar{B}_2$ because a corresponding truth table for the complementary signals may readily be obtained by complementing the values of the table for the original signals. Thus a zero (0) corresponds to a 1-representing $\bar{B}$ signal, in other words if $B=0$, $\bar{B}=1$. This permutation of the values of the two signals $B_1$ and $B_2$ may be done in any manner. However, it is preferred to start the first row or line of the truth table by assigning the values 0 to both the signals $B_1$ and $B_2$. The next row of the truth table is obtained by adding 1 in a binary fashion to the signal $B_1$. This is done because the $B_1$ signal is considered the least significant or lowest order binary signal as compared to the signals $B_2$. This process is repeated to obtain subsequent rows for the truth table until all required rows are obtained. A row in the truth table where both signals $B_1$ and $B_2$ have the values 1 is not necessary because only three counts are required, that is, only three rows are necessary. The last column of the table indicates the counts which arbitrarily start with 0 and increase by one for each subsequent row. This is shown in the following truth Table VII:

TABLE VII

| $B_1$ | $B_2$ | Count |
|---|---|---|
| 0 | 0 | 0 |
| 1 | 0 | 1 |
| 0 | 1 | 2 |

The values of signals $B_1'$, $\bar{B}_1'$, $B_2'$, and $\bar{B}_2'$, defined as the signals following each unit forward sequence count of a count signal "$b$," may be expressed in logical Boolean form in terms of the present values $B_1$, $\bar{B}_1$, $B_2$, and $\bar{B}_2$ of the signals as follows:

$$B_1' = b.\bar{B}_1.\bar{B}_2 + \bar{b}.B_1$$
$$B_2' = b.\bar{B}_2.B_1 + \bar{b}.B_2 \qquad (8a)$$

The above Equations 8a express all possible conditions for obtaining 1-representing binary $B_1$ and $B_2$ signals except the condition where signals $B_1$ and $B_2$ are both simultaneously 1-representing signals. Since a simultaneously 1-representing $B_1$ and $B_2$ signal would theoretically represent a count of 3 which is not utilized in a modulo-three counter, this count condition has been purposely excluded from Table VII and from Equation 8a. For example, a 1-representing $B_1'$ signal will be obtained if $B_1$ is 0 (that is $\bar{B}_1$ is a 1-representing signal), $B_2$ is 0, and a count signal "$b$" is received, alternatively, $B_1'$ will be 1 if $B_1$ is 1 and no count signal "$b$" is received (that is $\bar{b}$ is 1). In a similar manner, the meaning of the equation for $B_2'$ may be explained.

From the above Table VII, the reverse unit count sequence may be expressed as follows and the meaning of the equations will now be obvious:

$$B_1' = b.\bar{B}_1.B_2 + \bar{b}.B_1$$
$$B_2' = b.\bar{B}_1.\bar{B}_2 + \bar{b}.B_2 \qquad (8b)$$

A counting sequence for counting weights greater than unity is not required for a $Mod_3$ counter adapted for use in a binary, binary-coded decimal or binary-coded octal system since a forward count of two is equivalent to a reverse count of one, and a reverse count of two is equivalent to a forward count of one. This may be illustrated by reference to Fig. 8a illustrating the counts of a $Mod_3$ counter by count points 0, 1, and 2 on the periphery of circle 800. Starting from any count point and proceeding in a clockwise rotation around circle 800 two count points locates the same count point as proceeding around the circle one count pointing counter-clockwise direction. For example, starting from count point 1 and counting two counts clockwise (forward sequence) one arrives at point 0. Again, starting from point 1 and counting one count counter-clockwise (reverse sequence) one again arrives at count point 0. By counting in the reverse directions as above, the corollary may also be illustrated.

Thus, all forward 2 unit counts are counted as 1 unit reverse counts, and all reverse 2 unit counts are counted as forward 1 unit counts by $Mod_3$ modifications of both the A and the B modulo counters 13, 14 of the present invention. For convenience in future discussion, an equivalent 1 unit count in the opposite count direction of that for a 2 unit count will hereinafter be referred to as an "alternative count (1a)."

By introducing the signal $Cf$ for forward count sequences and the signal $Cr$ for reverse count sequences in the above forward and reverse unit count functions as expressed by Equations 8a and 8b, they may be combined to form the following expressions:

$$B_1' = Cf(b.\bar{B}_1.\bar{B}_2 + \bar{b}.B_1) + Cr(b.\bar{B}_1.B_2 + \bar{b}.B_1)$$
$$B_2' = Cf(b.B_1.\bar{B}_2 + \bar{b}.B_2) + Cr(b.\bar{B}_1.\bar{B}_2 + \bar{b}.B_2)$$

which reduces to:

$$B_1' = b(Cf.\bar{B}_1.\bar{B}_2 + Cr.\bar{B}_1.B_2) + \bar{b}.B_1$$
$$B_2' = b(Cf.B_1.\bar{B}_2 + Cr.\bar{B}_1.\bar{B}_2) + \bar{b}.B_2$$

where $Cf + Cr = 1$. By introducing the reset signal R, the intermediate reset signal $Rb$, and synchronizing signals $Cp$, the logical equations above may be put in the form of setting functions for a pair of B modulo counter flip-flops $B_1'$ and $B_2'$ as follows:

$$ToB_1 = [b.\bar{B}_1(Cf.\bar{B}_2 + Cr.\bar{B}_2) + \bar{b}.\bar{R}.\bar{Rb}.B_1]Cp$$
$$ToB_2 = [b.\bar{B}_2(Cf.B_1 + Cr.B_1) + \bar{b}.\bar{R}.\bar{Rb}.B_2]Cp$$

Since either a 1-representing R or $Rb$ signal triggers flip-flops $B_1'$ and $B_2'$ to their zero representing states, the complementary signals $\bar{R}$ and $\bar{Rb}$ are introduced in the above equations to indicate the absence of 1-representing R and $Rb$ signals. Stated differently, this means that if either flip-flop is in the 1 state and signals $b$, R, and $Rb$ are all 0, the flip-flop will remain in its 1 state.

As previously discussed, a setting function defines the conditions for applying a triggering pulse to the 1 input circuit of an overriding flip-flop. Consequently, when the conditions defined in the setting functions are not met, the corresponding overriding flip-flop is triggered at its 0 input circuit. Accordingly, from a study of the above functions, it is evident that if either flip-flop $B_1$ or $B_2$ is in the 1-representing state during a clock-pulse period, it will be triggered to the 0-representing state by the next succeeding clock pulse unless signals $b$, R, and $Rb$ are all simultaneously 0-level signals. This may be stated another way, i.e., if either flip-flop is in the 1-representing state during a clock-pulse period, it will be triggered to the 0-representing state by the next succeeding clock pulse if any one or more of the signals $b$, R, and $Rb$ is a 1-level signal during the clock-pulse period.

The above equations may be written in the form of simplified partial changing functions by the methods previously explained in connection with flip-flop functions as follows:

$$1B_1 = b(Cf.\bar{B}_2 + Cr.B_2)Cp$$
$$0B_1 = (b + Rb + R)Cp$$
$$1B_2 = b(Cf.B_1 + Cr.\bar{B}_1)Cp$$
$$0B_2 = (b + Rb + R)Cp \qquad (9)$$

By substituting "$a$" signals for "$b$" signals, A signals for B signals, and deleting signals $Rb$ in the above functions 9, simplified partial changing functions for a pair of A modulo counter flip-flops $A_1'$ and $A_2'$ is formed as follows:

$$1A_1 = a(Cf.\bar{A}_2 + Cr.A_2)Cp$$
$$0A_1 = (a+R)Cp$$
$$1A_2 = a(Cf.A_1 + Cr.\bar{A}_1)Cp$$
$$0A_2 = (a+R)Cp \qquad (10)$$

Figure 6:
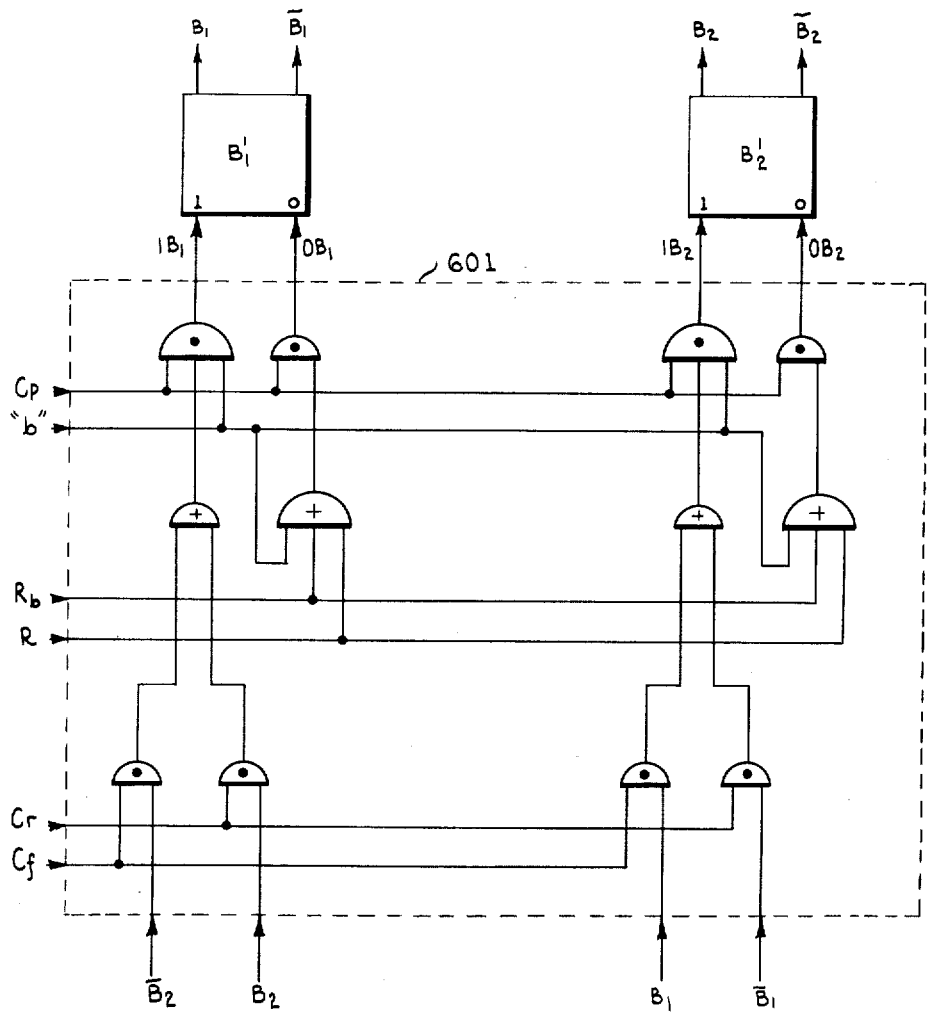
Fig. 6 is a schematic circuit diagram, partly in block form, of a $Mod_3$ embodiment of the B modulo counter of the electronic modulo error detecting system of Fig. 1.

Reference is now made to Fig. 6 wherein there is presented in symbolic or schematic form a circuit diagram of the B modulo counter 14 of Fig. 1 employing a modulo base of 3. The modulo counter of Fig. 6 produces a pair of complementary binary output signals $B_1$, $\bar{B}_1$, and $B_2$, $\bar{B}_2$ in response to control signals $Cf$, $Cr$, $Rb$, and $R$, count signals "$b$," clock signals $Cp$, and the complementary binary output signals $B_1$, $\bar{B}_1$, $B_2$, $\bar{B}_2$ which are fed back as input signals from the output of the counter. The modulo counter includes a control matrix 601 for receiving signals $Cf$, $Cr$, $Rb$, $R$, "$b$," $Cp$, $B_1$, $\bar{B}_1$, $B_2$, and $\bar{B}_2$ and producing first and second pairs of flip-flop control signals $1B_1$, $0B_1$, and $1B_2$, $0B_2$, respectively. A flip-flop $B_1'$ is coupled to the matrix 601 and has 1 and 0 input circuits responsive, respectively, to the $1B_1$ and $0B_1$ control signals for producing the complementary binary output signals $B_1$ and $\bar{B}_1$. A second flip-flop $B_2'$ is coupled to the matrix 601 and has 1 and 0 input circuits responsive to control signals $1B_2$ and $0B_2$, respectively, for producing the complementary output signals $B_2'$ and $\bar{B}_2'$. The control matrix 601 is mechanized in accordance with the logical functional Equations 9 above, and in view of the previous detailed explanation of the procedures for mechanizing circuits in accordance with logical mechanization equations, further explanation of the control matrix 601 is deemed unnecessary.

Figure 7:
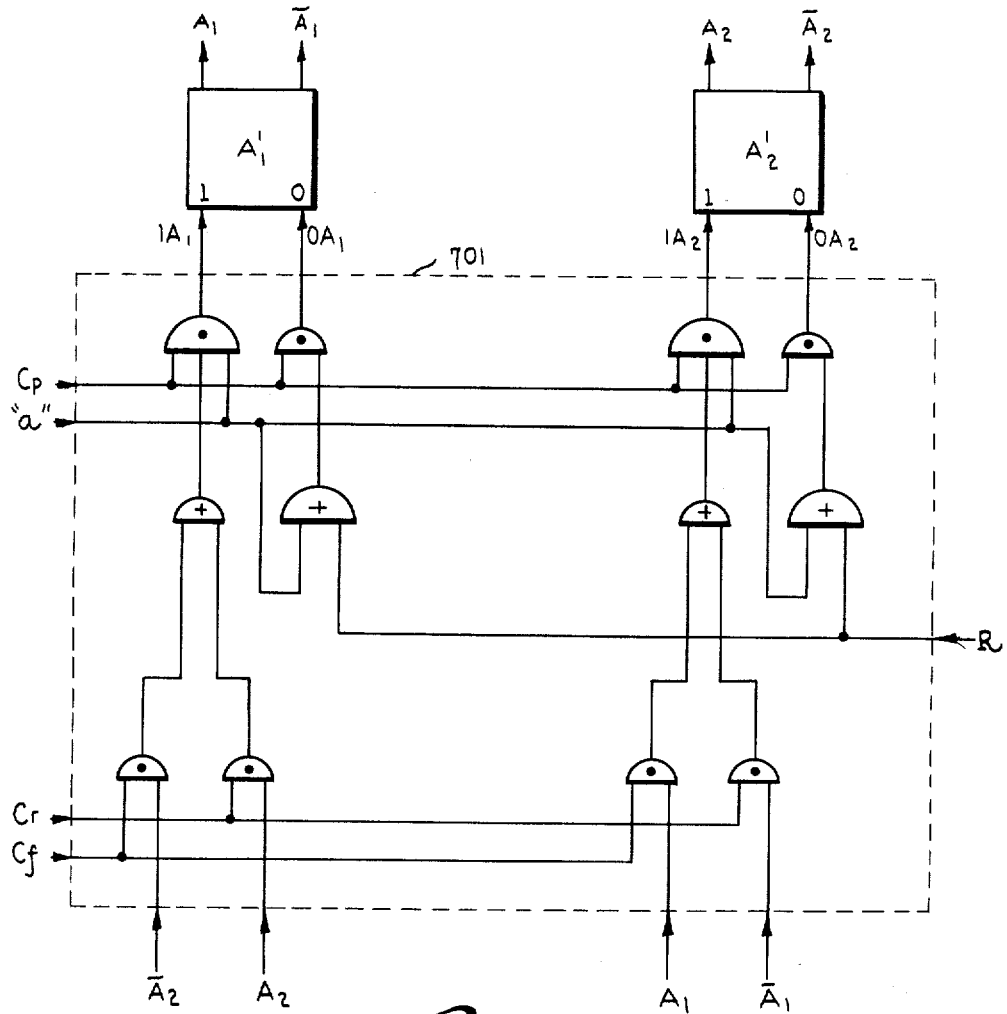
Fig. 7 is a schematic circuit diagram, partly in block form, of a $Mod_3$ embodiment of the A modulo counter of the electronic modulo error detecting system of Fig. 1.

Referring now to Fig. 7, there is presented in symbolic form a $Mod_3$ embodiment of the A modulo counter 13 of Fig. 1 for producing a pair of complementary binary output signals $A_1$, $\bar{A}_1$, and $A_2$, $\bar{A}_2$ in response to control signals $Cf$, $Cr$, and $R$, count signals "$a$," clock signals $Cp$, and the complementary binary signals $A_1$, $\bar{A}_1$, $A_2$, $\bar{A}_2$ which are fed back as input signals from the output of the counter. The modulo counter includes a control matrix 701 for receiving signals $Cf$, $Cr$, $R$, "$a$," $Cp$, $A_1$, $\bar{A}_1$, $A_2$, and $\bar{A}_2$ and producing flip-flop control signal pairs $1A_1$, $0A_1$, and $1A_2$, $0A_2$. A first flip-flop $A_1'$ having 1 and 0 input circuits is coupled to the control matrix 701 and responsive to signals $1A_1$ and $0A_1$, respectively, for producing the complementary output signals, $A_1$ and $\bar{A}_1$. A second flip-flop $A_2'$ having 1 and 0 input circuits is coupled to the control matrix 701 and responsive to signals $1A_2$ and $0A_2$, respectively, for producing the complementary output signals $A_2$ and $\bar{A}_2$. The control matrix 701 includes a plurality of logical "and" and "or" circuits connected in accordance with the logical Equation 10 above.

From Tables IV, V, and VI above, it is seen that count signals received by a $Mod_3$ counter during bit times $X_0$, $X_2$, $X_4$, $X_6$, $X_8$ . . . etc. will each have a counting weight of 1, and signals received during bit times $X_1$, $X_3$, $X_5$, $X_7$, $X_9$ . . . etc. will each have a counting weight of 2, or a 1 alternative count ($1a$). Letting a 1-representing signal $T_1$ indicate a counting weight of 1 and a 1-representing signal $T_2$ indicate a counting weight of 1 alternative ($1a$), the values of signals $T_1$ and $T_2$ may be logically expressed as follows:

$$T_1 = X_0 + X_2 + X_4 + X_6 + X_8 + \ldots \text{etc.}$$
$$T_2 = X_1 + X_3 + X_5 + X_7 + X_9 + \ldots \text{etc.} \qquad (11)$$

Forward and reverse control signals $Cf_s$ and $Cr_s$, respectively, for sign-counting a count signal train may be expressed in terms of signals $T_1$ and $T_2$ and the sign identification signals $S$ and $\bar{S}$ as follows:

$$Cf_s = \bar{S}.T_1 + S.T_2$$
$$Cr_s = S.T_1 + \bar{S}.T_2 \qquad (12)$$

where 1-representing $\bar{S}$ and $S$ signals indicate a positive and a negative datum, respectively, represented by the count signal train.

Since in an inverse-sign-count each count signal is counted in the opposite sequence from that employed for a sign-count, forward and reverse control signals $Cf_i$ and $Cr_i$ for an inverse-sign-count may be expressed in terms of the values for signals $Cr_s$ and $Cf_s$, respectively, in Equations 12 above, thus producing the following expressions:

$$Cf_i = S.T_1 + \bar{S}.T_2 = Cr_s$$
$$Cr_i = \bar{S}.T_1 + S.T_2 = Cf_s \qquad (13)$$

In order to further clarify the distinction between the above defined count control signals and the overall counting sequence employed for counting a signal train, it is well to consider that the above equations define the direction of count of a counter for each individual signal of a signal train being counted. As previously discussed, a signal train representing a positive datum is sign-counted in a forward count sequence, and a signal train representing a negative datum is sign-counted in a reverse sequence. Conversely, signal trains representing positive and negative data are inverse-sign-counted in a reverse and a forward count sequence, respectively. However, as has been previously discussed in detail, it is advantageous from an efficiency standpoint to count each signal of a signal train having a weight of 2 in the opposite direction or sequence than each signal having a weight of 1. Hence, when a signal train representing a positive datum is sign-counted, it is advantageous to cause the counter to count one unit in the forward count direction for each signal of the train having a weight of 1, and to cause the counter to count one unit in the reverse direction, alternate 1 ($1a$) for each signal of the train having a counting weight of 2. When a signal train representing a negative datum is sign-counted, it is equally advantageous to count the 1-weight signals of the train as unit reverse counts and the 2-weight signals as one unit, alternate $1a$, counts in the forward direction. Similarly, for inverse-sign-counting wherein unit weight signals of a signal train are counted by advancing the counter 1 unit count in the appropriate direction determined by the algebraic sign of the datum represented by the signals, signals having a counting weight of 2, on the other hand, are counted as 1 alternate ($1a$) counts of the counter. Accordingly, the above equations defining control signals $Cf_s$, $Cr_s$, $Cf_i$ and $Cr_i$ define the direction of count of a modulo-three counter in counting each count signal of a signal train in the most efficient manner. Control signal $Cf_s$ is utilized for sign-counting a signal train representing a positive datum, control signal $Cr_s$ is utilized for sign-counting a signal train representing a negative datum, control signal $Cf_i$ is for inverse-sign-counting the signal train of a positive datum, and signal $Cr_i$ is utilized for controlling the counter for inverse-sign-counting a negative signal train. Obviously, since a signal train representing a positive datum is sign-counted in the same manner as a signal train representing a negative datum is inverse-sign-counted, and further since a signal train representing a negative datum is sign-counted in the same manner as a positive signal train is inverse-sign-counted, signals $Cf_i = Cr_s$ and $Cr_i = Cf_s$ as indicated in Equation 13 above.

During a product-count, forward and reverse control signals for product-count-factors of 1 and 2 only need be considered since, as previously discussed, "$a$" count signals are not developed by the A gate 11 of Fig. 1 during a product-count where the product-count-factor is 0. During a product-count where the product-count-factor is 1, the "$a$" count signals are counted by the A modulo counter 13 of Fig. 1 in the same manner and in accordance with the same counting weights as in a sign-count. Forward and reverse control signals $Cf_{p(1)}$ and $Cr_{p(1)}$ are equal, therefore, to signals $Cf_s$ and $Cr_s$, respectively, in Equations 12 above. A product-count-factor of 2 produces counting weights of $Mod_3(2 \times 1)$ or 2 during a bit time represented by a 1-representing $T_1$ signal, and $Mod_3(2 \times 2)$ or 1 during a bit time represented by a 1-representing $T_2$ signal. Thus, forward and reverse control signals $Cf_{p(2)}$ and $Cr_{p(2)}$ for a product-count-factor of 2 are equivalent, respectively, to signals $Cr_s$ and $Cf_s$ in Equations 12 above. Forward and reverse control signals $Cf_{p(1)}$, $Cf_{p(2)}$, $Cr_{p(1)}$, and $Cr_{p(2)}$ for product-count-factors of 1 and 2 may be expressed, therefore, as follows:

$$Cf_{p(1)} = Cf_s = \bar{S}.T_1 + S.T_2$$
$$Cr_{p(1)} = Cr_s = S.T_1 + \bar{S}.T_2 \quad (14a)$$

$$Cf_{p(2)} = Cr_s = S.T_1 + \bar{S}.T_2$$
$$Cr_{p(2)} = Cf_s = \bar{S}.T_1 + S.T_2 \quad (14b)$$

It may be observed from Table VII above that product-count-factors of 1 and 2 are distinguishable, respectively, by 1-representing $B_1$ and $B_2$ signals. By incorporating signal $B_1$ in the above expressions 14a for $Cf_{p(1)}$ and $Cr_{p(1)}$ and incorporating signal $B_2$ in the above expressions 14b for signals $Cf_{p(2)}$ and $Cr_{p(2)}$, signals $Cf_{p(1)}$ and $Cf_{p(2)}$ may be logically added to form an expression for a general product-count forward control signal $Cf_p$, and signals $Cr_{p(1)}$ and $Cr_{p(2)}$ may be logically added to form an expression for a general product-count reverse control signal $Cr_p$, giving:

$$Cf_p = (\bar{S}.T_1 + S.T_2)B_1 + (S.T_1 + \bar{S}.T_2)B_2$$
$$Cr_p = (S.T_1 + \bar{S}.T_2)B_1 + (\bar{S}.T_1 + S.T_2)B_2 \quad (15)$$

By referring to Tables I and III above, the identification signals defining data that are sign-counted, inverse-sign-counted, and product-counted may be respectively incorporated in Equations 12, 13 and 15 above, thus producing the following expressions:

$$Cf_s = (\bar{S}.T_1 + S.T_2)(To + Ti + W_1 + W_2.\text{Add} + W_3)$$
$$Cr_s = (\bar{S}.T_2 + S.T_1)(To + Ti + W_1 + W_2.\text{Add} + W_3)$$
$$Cf_i = (S.T_1 + \bar{S}.T_2)(W_2.\text{Subt} + W_4.\text{Div})$$
$$Cr_i = (S.T_2 + \bar{S}.T_1)(W_2.\text{Subt} + W_4.\text{Div})$$
$$Cf_p = [(\bar{S}.T_1 + S.T_2)B_1 + (S.T_1 + \bar{S}.T_2)B_2]$$
$$(\text{Mult} + \text{Div})W_2$$
$$Cf_r = [(\bar{S}.T_2 + S.T_1)B_1 + (S.T_2 + \bar{S}.T_1)B_2]$$
$$(\text{Mult} + \text{Div})W_2 \quad (16)$$

From the Equations 16 above, a general expression for the forward control signal $Cf$ and the reverse control signal $Cr$ may be formed by logically adding the equations for signals $Cf_s$, $Cf_i$, $Cf_p$ and $Cr_s$, $Cr_i$, $Cr_p$, respectively, giving:

$$Cf = (\bar{S}.T_1 + S.T_2)\{To + Ti + W_1 + W_3 + W_2[\text{Add}$$
$$+ (\text{Mult} + \text{Div})B_1]\} + (S.T_1 + \bar{S}.T_2)\{W_4.\text{Div} + W_2$$
$$[\text{Subt} + (\text{Mult} + \text{Div})B_2]\}$$
$$Cr = (S.T_1 + \bar{S}.T_2)\{To + Ti + W_1 + W_3 + W_2[\text{Add}$$
$$+ (\text{Mult} + \text{Div})B_1]\} + (\bar{S}.T_1 + S.T_2)\{W_4.\text{Div} + W_2$$
$$[\text{Subt} + (\text{Mult} + \text{Div})B_2]\} \quad (17)$$

Figure 9:
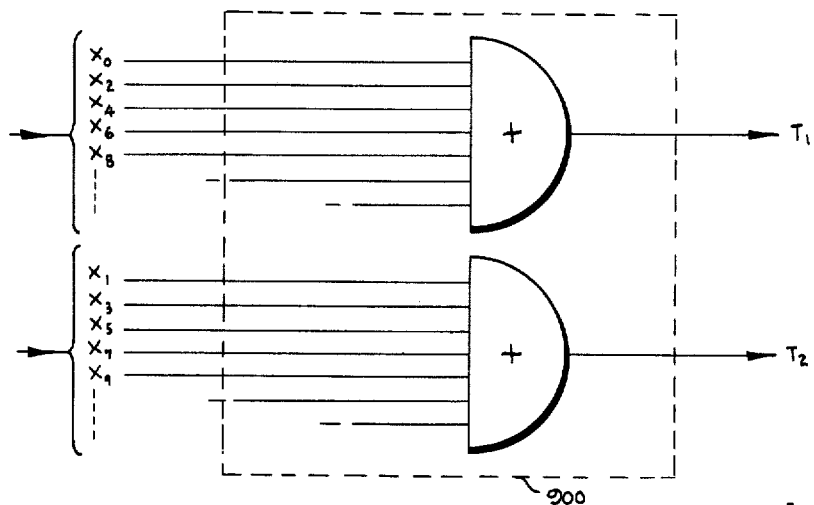
Fig. 9 is a schematic circuit diagram of a $Mod_3$ embodiment of the timing section of the control circuit of the electronic modulo error detecting system of Fig. 1.

Reference is made to Fig. 9 wherein there is presented a $Mod_3$ embodiment of the timing section 2 of the control circuit 10 of Fig. 1 mechanized in accordance with the logical Equations 11 above.

The timing section of Fig. 9 indicated by broken lines 900 receives bit identification signals $X_0$, $X_2$, $X_4$, $X_6$, $X_8$ . . . to produce first timing signals $T_1$ and bit identification signals $X_1$, $X_3$, $X_5$, $X_7$, $X_9$ . . . to produce timing signals $T_2$.

Figure 10:
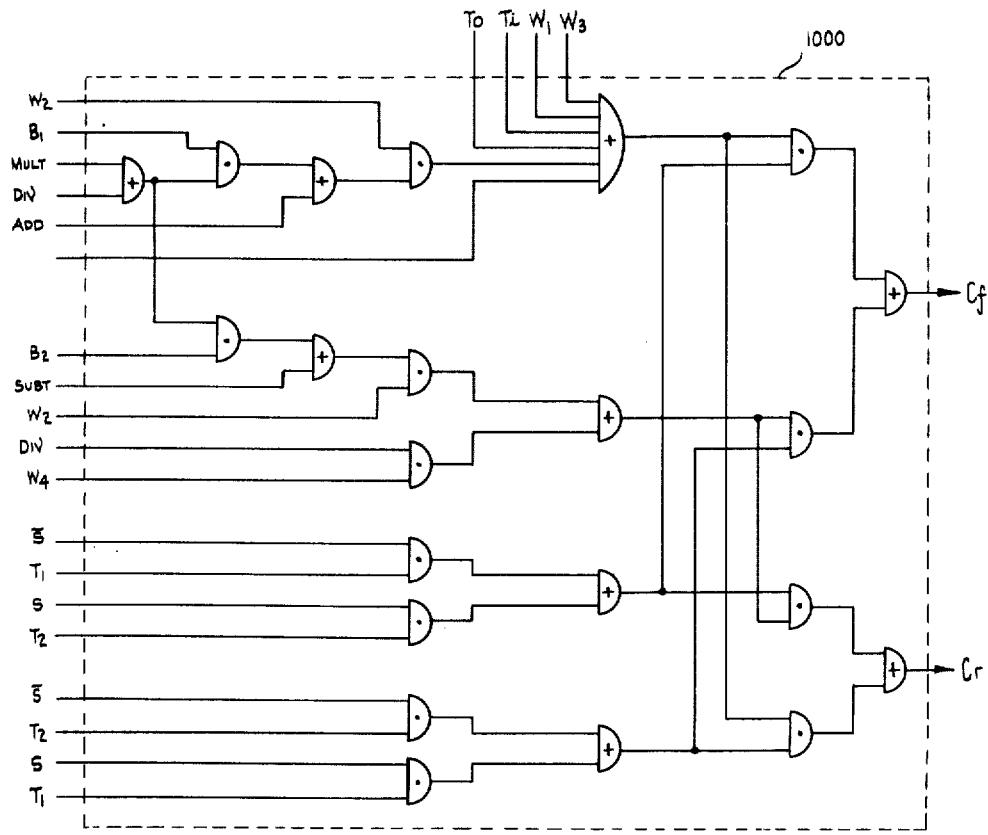
Fig. 10 is a schematic circuit diagram of a $Mod_3$ embodiment of the forward and reverse section of the control circuit of the electronic modulo error detecting system of Fig. 1.

Referring now to Fig. 10 there is presented a symbolic or schematic diagram of a $Mod_3$ modification of the forward-reverse section 3 of the control circuit 10 of Fig. 1 mechanized in accordance with the logical Equations 17 above.

As indicated in the figure, the forward-reverse section indicated by broken lines 1000 receives timing signals $T_1$ and $T_2$ from the $Mod_3$ embodiment, depicted in Fig. 9, of the timing section 1 of the control circuit of Fig. 1, and receives sign signals $\bar{S}$ and $S$, word signals $W_1$, $W_2$, $W_3$, and $W_4$, and command signals $Ti$, $To$, Add, Subt, Mult, and Div, from the operational circuit 120 of Fig. 1, and signals $B_1$, $B_2$ from the $Mod_3$ modification of the B modulo counter 14 of Fig. 1, depicted in Fig. 6 and produces forward and reverse control signals $Cf$ and $Cr$, respectively.

Having thus described in detail a $Mod_3$ embodiment of the present invention adapted for use in a binary, binary-coded octal and binary-coded decimal system, $Mod_7$ modifications of the A modulo counter 13, the B modulo counter 14, and the control circuit 10 of Fig. 1 for a $Mod_7$ embodiment of the present invention adapted for use in a binary or binary-coded octal system will now be considered.

The counts of a $Mod_7$ modification of the B modulo counter 14 of Fig. 1 may be expressed in terms of three pairs of complementary binary signals $B_1$, $\bar{B}_1$, $B_2$, $\bar{B}_2$, and $B_3$, $\bar{B}_3$ in accordance with the following truth table which may be constructed in the manner previously explained in connection with truth Table VII:

TABLE VIII

| $B_1$ | $B_2$ | $B_3$ | Count |
|---|---|---|---|
| 0 | 0 | 0 | 0 |
| 1 | 0 | 0 | 1 |
| 0 | 1 | 0 | 2 |
| 1 | 1 | 0 | 3 |
| 0 | 0 | 1 | 4 |
| 1 | 0 | 1 | 5 |
| 0 | 1 | 1 | 6 | where a zero (0) corresponds to a 1-representing $\bar{B}$ signal.

From Table VIII above, logical functions for unit, two-unit, and three-unit forward and reverse count sequences in response to count signals "$b$" may be expressed in terms of the values $B_1'$, $\bar{B}_1'$, $B_2'$, $\bar{B}_2'$, $B_3'$ and $\bar{B}_3'$ of the signals following each count and the values $B_1$, $\bar{B}_1$, $B_2$, $\bar{B}_2$, $B_3$, and $\bar{B}_3$ of the signals before each count. These logical functions may be explained as set forth above and may be written as follows:

ONE-UNIT FORWARD COUNTS $$B_1' = b.\bar{B}_1(\bar{B}_2 + \bar{B}_3) + \bar{b}.B_1$$
$$B_2' = b.\bar{B}_2.B_1 + B_2(\bar{b} + \bar{B}_1.\bar{B}_3)$$
$$B_3' = b.\bar{B}_3.B_1.B_2 + B_3(\bar{b} + \bar{B}_2)$$

ONE-UNIT REVERSE COUNTS $$B_1' = b.\bar{B}_1(B_2 + B_3) + \bar{b}.B_1$$
$$B_2' = b.\bar{B}_2.\bar{B}_1 + B_2(\bar{b} + B_1)$$
$$B_3' = b.\bar{B}_3.\bar{B}_1.\bar{B}_2 + B_3(\bar{b} + B_1 + B_2)$$

TWO-UNIT FORWARD COUNTS $$B_1' = b.\bar{B}_1.B_2.B_3 + B_1(\bar{b} + B_3)$$
$$B_2' = b.\bar{B}_2(\bar{B}_1 + \bar{B}_3) + \bar{b}.B_2$$
$$B_3' = b.\bar{B}_3.B_2 + B_3(\bar{b} + \bar{B}_1.\bar{B}_2)$$

TWO-UNIT REVERSE COUNTS $$B_1' = b.\bar{B}_1.\bar{B}_2.\bar{B}_3 + B_1(\bar{b} + B_2 + B_3)$$
$$B_2' = b.\bar{B}_2(B_1 + B_3) + B_2.\bar{b}$$
$$B_3' = b.\bar{B}_3.\bar{B}_2 + B_3(\bar{b} + B_2)$$

THREE-UNIT FORWARD COUNTS $$B_1' = b.\bar{B}_1\bar{B}_3 + B_1(\bar{b} + B_3)$$
$$B_2' = b.\bar{B}_2.\bar{B}_1.\bar{B}_3 + B_2(\bar{b} + B_1 + B_3)$$
$$B_3' = b.\bar{B}_3(B_1 + B_2) + B_3.\bar{b}$$

THREE-UNIT REVERSE COUNTS $$B_1' = b.\bar{B}_1.B_3 + B_1(\bar{b} + \bar{B}_2.\bar{B}_3)$$
$$B_2' = b.\bar{B}_2.B_1.B_3 + B_2(\bar{b} + \bar{B}_1)$$
$$B_3' = b.\bar{B}_3(\bar{B}_1 + \bar{B}_2) + B_3.\bar{b} \quad (18)$$

Counting sequences for count weights greater than 3 are not required for a $Mod_7$ counter adapted for use in a binary or binary-coded octal numbering system for the following reasons. From Tables IV and V above, it is seen that the counting weights of $Mod_7$ signals received during bit times $X_0$, $X_1$, $X_2$, $X_3$, $X_4$, $X_5$, $X_6$, $X_7$, $X_8$, $X_9$ ... etc. in a binary or binary-coded octal system are respectively 1, 2, 4, 1, 2, 4, 1, 2, 4, 1 ... etc. But a forward count of 4 units by a $Mod_7$ counter is equivalent to a reverse count of 3 units, and similarly a reverse count of 4 units is equivalent to a forward count of 3 units. In general, forward and reverse counts of N units are equivalent, respectively, to reverse and forward counts of $(7-N)$ units in a $Mod_7$ counter. This may be illustrated by referring again to Fig. 8b presenting the counts of a $Mod_7$ counter around the periphery of a circle 810. Beginning at any count point and proceeding N units in one direction locates a count point which is the same as obtained by proceeding in the opposite direction $(7-N)$ units from the point of origin. For example, beginning at point 5 on the circle 810 and a counting clockwise (forward) 6 units locates count point 4. Starting at point 5 and counting counter-clockwise (reverse) $(7-6)$ or 1 unit again locates count point 4.

In accordance with the present invention, therefore, counting weights of 4, 5, and 6 will be counted by $Mod_7$ modifications of the A and B modulo counters 13 and 14 of Fig. 1 by alternative 3 counts (3a), alternative 2 counts (2a), and alternative 1 counts (1a), respectively.

By introducing the synchronizing clock signal $Cp$ as an "and" function, and adding a reset signal R and an intermediate reset signal $Rb$, the above functions 18 may be put in the form of setting functions $ToB_1$, $ToB_2$, and $ToB_3$ for three flip-flops $B_1'$, $B_2'$, and $B_3'$, respectively, as follows:

ONE-UNIT FORWARD COUNT $ToB_1 = [\bar{B}_1(\bar{B}_2+\bar{B}_3)b+B_1.\bar{R}.\bar{Rb}.\bar{b}]Cp$
$ToB_2 = [\bar{B}_2.B_1.b+B_2(\bar{b}+\bar{B}_1.\bar{B}_3)\bar{R}.\bar{Rb}]Cp$
$ToB_3 = [\bar{B}_3.B_1.B_2.b+B_3(\bar{b}+\bar{B}_2)\bar{R}.\bar{Rb}]Cp$

ONE-UNIT REVERSE COUNT $ToB_1 = [\bar{B}_1(B_2+B_3)b+B_1.\bar{R}.\bar{Rb}.\bar{b}]Cp$
$ToB_2 = [\bar{B}_2\bar{B}_1.b+B_2(\bar{b}+B_1)\bar{R}.\bar{Rb}]Cp$
$ToB_3 = [\bar{B}_3.\bar{B}_1.\bar{B}_2.b+B_3(\bar{b}+B_1+B_2)\bar{R}.\bar{Rb}]Cp$

TWO-UNIT FORWARD COUNT $ToB_1 = [\bar{B}_1.B_2.B_3.b+B_1(\bar{b}+\bar{B}_3)\bar{R}.\bar{Rb}]Cp$
$ToB_2 = [\bar{B}_2(\bar{B}_1+\bar{B}_3)b+B_2.\bar{R}.\bar{Rb}.\bar{b}]Cp$
$ToB_3 = [\bar{B}_3.B_2.b+B_3(\bar{b}+\bar{B}_1.\bar{B}_2)\bar{R}.\bar{Rb}]Cp$

TWO-UNIT REVERSE COUNT $ToB_1 = \{\bar{B}_1.\bar{B}_2.\bar{B}_3.b+B_1(\bar{b}+B_2+B_3)\bar{R}.\bar{Rb}\}Cp$
$ToB_2 = [\bar{B}_2(B_1+B_3)b+B_2.\bar{R}.\bar{Rb}.\bar{b}]Cp$
$Tob_3 = [\bar{B}_3.\bar{B}_2.b+B_3(b+B_2)\bar{R}.\bar{Rb}]Cp$

THREE-UNIT FORWARD COUNT $ToB_1 = [\bar{B}_1.\bar{B}_3.b+B_1(\bar{b}+B_3)\bar{R}.\bar{Rb}]Cp$
$ToB_2 = [\bar{B}_2.\bar{B}_1.\bar{B}_3.b+B_2(\bar{b}+B_1+B_3)\bar{R}.\bar{Rb}]Cp$
$ToB_3 = [\bar{B}_3(B_1+B_2)b+B_3.\bar{R}.\bar{Rb}.\bar{b}]Cp$

THREE-UNIT REVERSE COUNT $ToB_1 = [\bar{B}_1.B_3.b+B_1(\bar{b}+\bar{B}_2.\bar{B}_3)\bar{R}.\bar{Rb}]Cp$
$ToB_2 = [\bar{B}_2.B_1.B_3.b+B_2(\bar{b}+\bar{B}_1)\bar{R}.\bar{Rb}]Cp$
$ToB_3 = [\bar{B}_3(\bar{B}_1+\bar{B}_2)b+B_3.\bar{R}.\bar{Rb}.\bar{b}]Cp$ (19)

In view of the previous discussion relating to the mechanics of reducing flip-flop setting functions to simplified partial changing functions, the above setting functions 19 for $ToB_1$, $ToB_2$, and $ToB_3$ for each counting sequence may be written in the form of pairs of simplified partial changing functions $1B_1$, $0B_1$; $1B_2$, $0B_2$; and $1B_3$, $0B_3$; respectively, for each counting sequence as follows:

ONE-UNIT FORWARD COUNT $1B_1 = b(\bar{B}_2+\bar{B}_3)Cp$
$0B_1 = (b+R+Rb)Cp$
$1B_2 = b.B_1.Cp$
$0B_2 = [b(B_1+B_3)+R+Rb]Cp$
$1B_3 = b.B_1.B_2.Cp$
$0B_3 = (b.B_2+R+Rb)Cp$

ONE-UNIT REVERSE COUNT $1B_1 = b(B_2+B_3)Cp$
$0B_1 = (b+R+Rb)Cp$
$1B_2 = b.\bar{B}_1.Cp$
$0B_2 = (b.\bar{B}_1+R+Rb)Cp$
$1B_3 = b.\bar{B}_1.\bar{B}_2.Cp$
$0B_3 = (b.\bar{B}_1.\bar{B}_2+R+Rb)Cp$

TWO-UNIT FORWARD COUNT $1B_1 = b.B_2.B_3.Cp$
$0B_1 = (b.\bar{B}_3+R+Rb)Cp$
$1B_2 = b(\bar{B}_1+\bar{B}_3)Cp$
$0B_2 = (b+R+Rb)Cp$
$1B_3 = b.B_2.Cp$
$0B_3 = [b(B_1+B_2)+R+Rb]Cp$

TWO-UNIT REVERSE COUNT $1B_1 = b.\bar{B}_2.\bar{B}_3.Cp$
$0B_1 = (b.\bar{B}_2.\bar{B}_3+R+Rb)Cp$
$1B_2 = b(B_1+B_3)Cp$
$0B_2 = (b+R+Rb)Cp$
$1B_3 = b.\bar{B}_2.Cp$
$0B_3 = (b.\bar{B}_2+R+Rb)Cp$

THREE-UNIT FORWARD COUNT $1B_1 = b.\bar{B}_3.Cp$
$0B_1 = (b.\bar{B}_3+R+Rb)Cp$
$1B_2 = b.\bar{B}_1.\bar{B}_3.Cp$
$0B_2 = (b.\bar{B}_1.\bar{B}_3+R+Rb)Cp$
$1B_3 = b(B_1+B_2)Cp$
$0B_3 = (b+R+Rb)Cp$

THREE-UNIT REVERSE COUNT $1B_1 = b.B_3.Cp$
$0B_1 = [b(B_2+B_3)+R+Rb]Cp$
$1B_2 = b.B_1.B_3.Cp$
$0B_2 = (b.B_1+R+Rb)Cp$
$1B_3 = b(\bar{B}_1+\bar{B}_2)Cp$
$0B_3 = (b+R+Rb)Cp$ (20)

If forward and reverse control signals $Cf$ and $Cr$, respectively, and weighting signals $C_1$, $C_2$, and $C_3$ representing counting weights of 1, 2, and 3, respectively, are introduced as "and" functions in the appropriate expressions 20 above, the above simplified partial changing functions for each flip-flop may be logically added together thus producing three combined pairs of functions $1B_1$, $0B_1$; $1B_2$, $0B_2$; and $1B_3$, $0B_3$ for controlling flip-flops $B_1'$, $B_2'$, and $B_3'$, respectively, as follows:

$1B_1 = b\{Cf[C_1(\bar{B}_2+\bar{B}_3)+C_2.B_2.B_3+C_3.\bar{B}_3]$
$\quad +Cr[C_1(B_2+B_3)+C_2.\bar{B}_2.\bar{B}_3+C_3.B_3]\}Cp$
$0B_1 = [b\{C_1+Cf[C_2.B_3+C_3.\bar{B}_3]+Cr[C_2.\bar{B}_2.\bar{B}_3$
$\quad +C_3(B_2+B_3)]\}+R+Rb]Cp$
$1B_2 = b\{Cf[C_1.B_1+C_2(\bar{B}_1+\bar{B}_3)+C_3.\bar{B}_1.\bar{B}_3]$
$\quad +Cr[C_1.\bar{B}_1+C_2(B_1+B_3)+C_3.B_1.B_3]\}Cp$
$0B_2 = [b\{Cf[C_1(B_1+B_3)+C_3.\bar{B}_1.\bar{B}_3]$
$\quad +Cr(C_1.\bar{B}_1+C_3.B_1)+C_2\}+R+Rb]Cp$
$1B_3 = b\{Cf[C_1.B_1.B_2+C_2.B_2+C_3(B_1+B_2)]$
$\quad +Cr[C_1.\bar{B}_1.\bar{B}_2+C_2.\bar{B}_2+C_3(\bar{B}_1+\bar{B}_2)]\}Cp$
$0B_3 = [b\{Cf[C_1.B_2+C_2(B_1+B_2)]+Cr(C_1.\bar{B}_1.\bar{B}_2$
$\quad +C_2.\bar{B}_2)+C_3\}+R+Rb]Cp$ (21)

By substituting count signals "$a$" for count signals "$b$,"

substituting signals $A_1, \bar{A}_1, A_2, \bar{A}_2, A_3$, and $\bar{A}_3$ for signals $B_1, \bar{B}_1, B_2, \bar{B}_2, B_3,$ and $\bar{B}_3$, respectively, and dropping the intermediate reset signal $Rb$ in the above Equation 21 three pairs of functions $1A_1, 0A_1; 1A_2, 0A_2;$ and $1A_3, 0A_3$ for controlling three flip-flops $B_1', B_2',$ and $B_3'$, respectively, are obtained as follows:

$$1A_1 = a\{Cf[C_1(\bar{A}_2+\bar{A}_3)+C_2.A_2.A_3+C_3.\bar{A}_3]$$
$$+Cr[C_1(A_2+A_3)+C_2.\bar{A}_2.\bar{A}_3+C_3.A_3]\}Cp$$
$$0A_1 = [a\{C_1+Cf[C_2.A_3+C_3.\bar{A}_3]$$
$$+Cr[C_2.\bar{A}_2.\bar{A}_3+C_3(A_2+A_3)]\}+R]Cp$$
$$1A_2 = a\{Cf[C_1.A_1+C_2(\bar{A}_1+\bar{A}_3)+C_3.\bar{A}_1.\bar{A}_3]$$
$$+Cr[C_1.\bar{A}_1+C_2(A_1+A_3)+C_3.A_1.A_3]\}Cp$$
$$0A_2 = [a\{Cf[C_1(A_1+A_3)+C_3.\bar{A}_1.\bar{A}_3]$$
$$+Cr(C_1.\bar{A}_1+C_3.A_1)+C_2\}+R]Cp$$
$$1A_3 = a\{Cf[C_1.A_1.A_2+C_2.A_2+C_3(A_1+A_2)]$$
$$+Cr[C_1.\bar{A}_1.\bar{A}_2+C_2.\bar{A}_2+C_3(\bar{A}_1+\bar{A}_2)]\}Cp$$
$$0A_3 = [a\{Cf[C_1.A_2+C_3(A_1+A_2)]$$
$$+Cr(C_1.\bar{A}_1.\bar{A}_2+C_2.\bar{A}_2)+C_3\}+R]Cp \quad (22)$$

Reference is now made to Fig. 11, wherein there is presented a schematic circuit diagram of a Mod₇ modification of the B modulo counter 14 of Fig. 1 in accordance with the present invention. The Mod₇ counter of Fig. 11 is responsive to count signals "$b$," forward and reverse control signals $Cf$ and $Cr$, respectively, one-unit, two-unit and three-unit counting weight signals $C_1, C_2,$ and $C_3$, respectively, reset and intermediate reset signals R and $Rb$, respectively, synchronizing clock pulses $Cp$, and three pairs of complementary signals $B_1, \bar{B}_1; B_2, \bar{B}_2;$ and $B_3, \bar{B}_3$ fed back from the output of the counter for producing the output signals $B_1, \bar{B}_1, B_2, \bar{B}_2, B_3,$ and $\bar{B}_3$, the aggregate of which, at any instant, indicate the accumulated count of the Mod₇ counter of Fig. 11 at that instant.

As indicated in the figure, the Mod₇ counter includes a flip-flop control circuit indicated by broken lines 1101 responsive to signals "$b$," R, $Rb$, $C_1$, $C_2$, $C_3$, $Cr$, $Cf$, $B_1$, $\bar{B}_1$, $B_2$, $\bar{B}_2$, $B_3$, and $\bar{B}_3$, and the synchronizing pulse $Cp$ for producing three pairs of flip-flop control signals $1B_1$, $0B_1$; $1B_2$, $0B_2$; and $1B_3$, $0B_3$. The Mod₇ counter further includes three double input flip-flops $B_1'$, $B_2'$, and $B_3'$, responsive to signals $1B_1$, $0B_1$; $1B_2$, $0B_2$; and $1B_3$, $0B_3$; respectively, for producing the pairs of complementary output signals $B_1, \bar{B}_1; B_2, \bar{B}_2;$ and $B_3, \bar{B}_3$; respectively.

The flip-flop control circuit 1101 is mechanized in accordance with the logical Equation 21 above, and in view of the previous examples for mechanizing logical equation, further explanation of Fig. 11 is not considered necessary.

Reference is now made to Fig. 12 wherein there is presented a schematic diagram of a Mod₇ modification of the A modulo counter 13 of Fig. 1 in accordance with the present invention. As indicated, the counter receives count signals "$a$," forward and reverse control signals $Cf$ and $Cr$, respectively, weighting signals $C_1$, $C_2$, and $C_3$; reset signals R, synchronizing pulses $Cp$, and three pairs of complementary signals $A_1, \bar{A}_1; A_2, \bar{A}_2;$ and $A_3, \bar{A}_3$ fed back from the output of the counter for producing output signals $A_1, \bar{A}_1, A_2, \bar{A}_2, A_3,$ and $\bar{A}_3$ indicating, at any instant, the accumulated count of the counter at that instant.

The counter of Fig. 12 includes a flip-flop control circuit indicated by broken lines 1201 for receiving signals "$a$," $Cf$, $Cr$, $C_1$, $C_2$, $C_3$, R, $Cp$, and the three pairs of complementary signals $A_1, \bar{A}_1; A_2, \bar{A}_2;$ and $A_3, \bar{A}_3$, fed back from the output of the counter and for producing three pairs of flip-flop control signals $1A_1$, $0A_1$; $1A_2$, $0A_2$; and $1A_3$, $0A_3$. The Mod₇ counter further includes three flip-flops $A_1'$, $A_2'$, and $A_3'$ coupled to the control circuit 1201 and responsive to signals $1A_1$, $0A_1$; $1A_2$, $0A_2$; and $1A_3$, $0A_3$; respectively, for producing the three pairs of complementary output signals $A_1, \bar{A}_1; A_2, \bar{A}_2;$ and $A_3, \bar{A}_3$, respectively.

Flip-flops $A_1'$, $A_2'$, and $A_3'$ each have 1 and 0 input circuits responsive to the 1A and 0A control signals, respectively, of an associated one of the pairs of flip-flop control signals.

The flip-flop control circuit 1201 includes a plurality of logical "and" and "or" circuits connected in accordance with the logical Equation 22 above.

From Tables IV and VI above, it is seen that count signals received by a Mod₇ counter during bit times $X_0$, $X_3$, $X_6$, $X_9$ . . . etc. in a binary or binary-coded octal system have counting weights of 1, signals received during bit times $X_1$, $X_4$, $X_7$, $X_{10}$ . . . etc. have weights of 2, and signals received during bit times $X_2$, $X_5$, $X_8$, $X_{11}$ . . . etc. have counting weights of 4 or alternate 3 ($3a$). Letting 1 representing signals $T_1$, $T_2$, and $T_3$ indicate counts of 1, 2, and $3a$, respectively, the value of signals $T_1$, $T_2$, and $T_3$ in a binary or a binary-coded octal numbering system, but not a binary-coded decimal system, may be expressed in logical Boolean form as:

$$T_1 = X_0 + X_3 + X_6 + X_9 + \ldots \text{etc.}$$
$$T_2 = X_1 + X_4 + X_7 + X_{10} + \ldots \text{etc.}$$
$$T_3 = X_2 + X_5 + X_8 + X_{11} + \ldots \text{etc.} \quad (23)$$

Letting $S$ and $\bar{S}$ represent a positive and negative algebraic datum or algebraic sign, respectively, forward and reverse control signals $Cf_s$ and $Cr_s$ for a sign-count may be logically expressed as:

$$Cf_s = S(T_1 + T_2) + \bar{S}.T_3$$
$$Cr_s = \bar{S}(T_1 + T_2) + S.T_3 \quad (24)$$

Forward and reverse inverse-sign-count control signals $Cf_i$ and $Cr_i$, respectively, may be logically expressed as:

$$Cf_i = S(T_1 + T_2) + \bar{S}.T_3 = Cr_s$$
$$Cr_i = \bar{S}(T_1 + T_2) + S.T_3 = Cf_s \quad (25)$$

In a Mod₇ modification of the modulo circuit 50 of Fig. 1, weighting signals $Cw$ produced by the error circuit 10 include signals $C_1$, $C_2$, and $C_3$ representing, respectively, weight counts of 1, 2, and 3. By reference to Tables IV and V, and Equation 23 above, the values of signals $C_{1s}$, $C_{2s}$, and $C_{3s}$ for a sign-count, and $C_{1i}$, $C_{2i}$, and $C_{3i}$ for an inverse-sign-count may be expressed in terms of signals $T_1$, $T_2$, and $T_3$ as follows:

$$C_{1s} = C_{1i} = T_1$$
$$C_{2s} = C_{2i} = T_2$$
$$C_{3s} = C_{3i} = T_3 \quad (26)$$

During a product-count, a product-count factor of 0 need not be considered for the reasons explained above in connection with a Mod₃ embodiment of the present invention. For product-count-factors of 1, 2, 3, 4, 5, and 6, the counting weights of count signals received during bit times represented by signals $T_1$, $T_2$, and $T_3$ are presented in Table IX below:

TABLE IX

*Product-count factors*

| | 1 | 2 | 3 | 4 | 5 | 6 | |
|---|---|---|---|---|---|---|---|
| Count Signal Periods: | | | | | | | |
| $T_1$ | 1 | 2 | 3 | $3a$ | $2a$ | $1a$ | Counting Weight. |
| $T_2$ | 2 | $3a$ | $1a$ | 1 | 3 | $2a$ | |
| $T_3$ | $3a$ | 1 | $2a$ | 2 | $1a$ | 3 | |

By reference to Tables VIII and IX above and realizing that an alternate count weight ($1a$, $2a$, or $3a$) is counted in the opposite sequence direction as a non-alternate count weight, forward and reverse count control signals $Cf_p$ and $Cr_p$ may be expressed for a product-count as:

$$Cf_p = \bar{S}(T_1.\bar{B}_3 + T_2.\bar{B}_2 + T_3.\bar{B}_1) + S(T_1.B_3 + T_2.B_2 + T_3.B_1)$$

$$Cr_p = S(T_1.\bar{B}_3 + T_2.\bar{B}_2 + T_3.\bar{B}_1)$$
$$+ \bar{S}(T_1.B_3 + T_2.B_2 + T_3.B_1) \quad (27)$$

Equation 27 defining forward and reverse count control signals $Cf_p$ and $Cr_p$, respectively, for a product-count are derived from Tables VIII and IX above in the following manner. From Table IX it is determined that for a forward count sequence, i.e., product-counting a signal representing a positive datum, the modulo-seven counter should count in a forward direction for signals of the train received during $T_1$ count period where the value of the product-count factor is 1, 2, or 3. From Table VIII it is seen that product count factors of 1, 2, and 3 may be identified by a 0-level $B_3$ signal, i.e., a 1-level $\bar{B}_3$ signal, since, as previously explained, a 0 count-factor may be ignored. This may be expressed logically as $Cf_p = \bar{S}.T_1.\bar{B}_3$ where signal $\bar{S}$ is introduced to indicate a positive algebraic datum. From Table IX, it is further noted that the modulo-seven counter should count in a forward direction for signals of a train received during $T_2$ count period where the value of the product-count factor is 2, 4 or 5. From Table VIII, these product-count factors may be expressed by a $\bar{B}_2$ signal. This may be expressed logically as $Cf_p = \bar{S}.T_2.\bar{B}_2$. For signals received during a $T_3$ count period, it is seen from Table IX that the counter should count signals of a train representing a positive datum in a forward direction for product-count factors of 2, 4 or 6. From Table VIII this may be expressed logically as $Cf_p = \bar{S}.T_3.\bar{B}_1$. The above three decimal logical expressions for $Cf_p$ may be logically combined by "or" functions to provide $$Cf_p = \bar{S}(T_1.\bar{B}_3 + T_2.\bar{B}_2 + T_3.\bar{B}_1)$$

which agrees with the left-hand term of the logical expression 27 above for count control signal $Cf_p$ for a signal train representing a positive datum. The right-hand term of the logical expression for $Cf_p$ (27) for a signal train representing a negative datum is derived in precisely the same manner from Tables VIII and IX above wherein the alternate count weights, 1a, 2a, and 3a of Table IX are defined in the resulting logical term of the equation.

The above logical Equation 27 defining count control signal $Cr_p$ may be derived from Tables VIII and IX in the same manner as above explained in relation to the derivation of the Equation 27 defining count control signal $Cf_p$. However, since it is known that the reverse count control signals $Cr_p$ are the antithesis of the forward count control signals $Cf_p$, the logical equation defining reverse count control signals $Cr_p$ may be more directly derived by merely interchanging signals S and $\bar{S}$ in the equation defining forward count control signals $Cf_p$.

From Tables VIII and IX above, the values of the weighting signals $C_{1p}$, $C_{2p}$, and $C_{3p}$ for a product-count, representing counts of 1, 2, and 3, respectively, may be derived in a manner similar to the derivation of count control signals $Cf_p$ and $Cr_p$ (27) above, wherein the counting weight of each signal of a train may be found from Table IX in terms of count periods $T_1$, $T_2$ and $T_3$, and the product-count factors 1 to 6. From Table VIII the product-count factors may then be expressed in terms of signals $B_1$, $B_2$ and $B_3$ in the manner previously explained in relation to Equation 27 above.

As an example of the above, consider the derivation of an expression for unit weighting signals $Cp_1$. From Table IX, it is seen that a unit-weight is assigned to signals received during count period $T_1$ for product-count factors of 1 and 6, during count period $T_2$ for product-count factors of 3 and 4, and for signals received during count periods $T_3$ for product-count factors of 2 and 5. Referring to Table VII, it is seen that product-count factors of 1 and 6 may be expressed in terms of signals $B_1$, $B_2$ and $B_3$ as $(\bar{B}_2.\bar{B}_3 + B_2.B_3)$, product-count factors 3 and 4 as $(\bar{B}_1.\bar{B}_2 + B_1.B_2)$, and product-count factors 2 and 5 as $(B_1.B_3 + \bar{B}_1.\bar{B}_3)$. Combining each of the above terms with the appropriate T signal by a logical "and" function, the logical expression for weighting signal $C_{1p}$ defining all unit-weight signals for a product count becomes:

$$C_{p1} = T_1(B_2.\bar{B}_3 + B_2.B_3) + T_2(\bar{B}_1.\bar{B}_2 + B_1.B_3)$$
$$+ T + T_3(B_1.B_3 + \bar{B}_1.\bar{B}_3)$$

In a similar manner, the logical expressions for 2-unit and 3-unit weighting signals $C_{2p}$ and $C_{3p}$ may be derived. Thus weighting signals $C_{1p}$, $C_{2p}$ and $C_{3p}$ indicating counting weights of 1, 2, and 3, respectively, may be expressed as:

$$C_{1p} = T_1(\bar{B}_2.\bar{B}_3 + B_2.B_3) + T_2(\bar{B}_1.\bar{B}_2 + B_1.B_2)$$
$$+ T_3(B_1.B_3 + \bar{B}_1.\bar{B}_3)$$

$$C_{2p} = T_1(B_1.B_3 + \bar{B}_1.\bar{B}_3) + T_2(B_2.B_3 + \bar{B}_2\bar{B}_3)$$
$$+ T_3(B_1.B_2 + \bar{B}_1.\bar{B}_2)$$

$$C_{3p} = T_1(B_1.B_2 + \bar{B}_1.\bar{B}_2) + T_2(B_1.B_3 + \bar{B}_1.\bar{B}_3)$$
$$+ T_3(B_2.B_3 + \bar{B}_2.\bar{B}_3) \quad (28)$$

By referring to Tables I and III, the identification signals defining data that are sign-counted, inverse-sign-counted, and product-counted may be incorporated in the forward and reverse control signal expressions 24, 25, and 27, respectively, thus giving:

$$Cf_s = [\bar{S}(T_1 + T_2) + S.T_3](To + Ti + W_1 + W_2.\text{Add} + W_3)$$

$$Cf_i = [S(T_1 + T_2) + \bar{S}.T_3](W_2.\text{Subt} + W_4.\text{Div})$$

$$Cf_p = [\bar{S}(T_1.\bar{B}_3 + T_2.\bar{B}_2 + T_3.\bar{B}_1) + S(T_1.B_3 + T_2.B_2 + T_3.B_1)](\text{Mult} + \text{Div})W_2$$

$$Cr_s = [S(T_1 + T_2) + \bar{S}.T_3](To + Ti + W_1 + W_2.\text{Add} + W_3)$$

$$Cr_i = [\bar{S}(T_1 + T_2) + S.T_3](W_2.\text{Subt} + W_4.\text{Div})$$

$$Cr_p = [S(T_1.\bar{B}_3 + T_2.\bar{B}_2 + T_3.\bar{B}_1) + \bar{S}(T_1.B_3 + T_2.B_2 + T_3.B_1)](\text{Mult} + \text{Div})W_2 \quad (29)$$

The identification signals defining data that are sign-counted, inverse-sign-counted, and product-counted may also be incorporated in the counting-weight signal expressions 26 and 28 giving:

$$C_{1s} = C_{1i} = T_1[To + Ti + W_1 + W_2(\text{Add} + \text{Subt}) + W_3 + W_4]$$

$$C_{1p} = [T_1(B_2.B_3 + \bar{B}_2.\bar{B}_3) + T_2(B_1.B_2 + \bar{B}_1.\bar{B}_2)$$
$$+ T_3(B_1.B_3 + \bar{B}_1.\bar{B}_3)](\text{Mult} + \text{Div})W_2$$

$$C_{2s} = C_{2i} + T_2[To + Ti + W_1 + W_2(\text{Add} + \text{Subt}) + W_3 + W_4]$$

$$C_{2p} = [T_1(B_1.B_3 + \bar{B}_1.\bar{B}_3) + T_2(B_2.B_3 + \bar{B}_2.\bar{B}_3)$$
$$+ T_3(B_1.B_2 + \bar{B}_1.\bar{B}_2)](\text{Mult} + \text{Div})W_2$$

$$C_{3s} = C_{3i} + T_3[To + Ti + W_1 + W_2(\text{Add} + \text{Subt}) + W_3 + W_4]$$

$$C_{3p} = [T_1(B_1.B_2 + \bar{B}_1.\bar{B}_2) + T_2(B_1.B_3 + \bar{B}_1.\bar{B}_3) \quad (30)$$
$$+ T_3(B_2.B_3 + \bar{B}_2.\bar{B}_3)](\text{Mult} + \text{Div})W_2$$

By incorporating the data identification signals in accordance with Tables I and III above in the above forward and reverse control and counting-weight signal expressions 29 and 30, respectively, the expressions may be logically combined to form composite forward and reverse control and counting weight signal logical equations as follows:

$$Cf = [\bar{S}(T_1 + T_2) + S.T_3](To + Ti + W_1 + W_2.\text{Add} + W_3)$$
$$+ [S(T_1 + T_2) + \bar{S}.T_3](W_2.\text{Subt} + W_4.\text{Div})$$
$$+ [\bar{S}(T_1.\bar{B}_3 + T_2.\bar{B}_2 + T_3.\bar{B}_1) + S(T_1.B_3 + T_2.B_2 + T_3.B_1)](\text{Mult} + \text{Div})W_2$$
(31)

$$Cr = [S(T_1 + T_2) + \bar{S}.T_3](To + Ti + W_1 + W_2.\text{Add} + W_3)$$
$$+ [\bar{S}(T_1 + T_2) + S.T_3](W_2.\text{Subt} + W_4.\text{Div})$$
$$+ [S(T_1.\bar{B}_3 + T_2.\bar{B}_2 + T_3.\bar{B}_1) + \bar{S}(T_1.B_3 + T_2.B_2 + T_3.B_1)](\text{Mult} + \text{Div})W_2$$

$$C_1 = T_1[To + Ti + W_1 + W_2(\text{Add} + \text{Subt}) + W_3 + W_4]$$
$$+ [T_1(\bar{B}_2.\bar{B}_3 + B_2.B_3) + T_2(\bar{B}_1.\bar{B}_2 + B_1.B_2)$$
$$+ T_3(B_1.B_3 + \bar{B}_1.\bar{B}_3)](\text{Mult} + \text{Div})W_2$$

$$C_2 = T_2[To + Ti + W_1 + W_2(\text{Add} + \text{Subt}) + W_3 + W_4]$$
$$+ [T_1(B_1.B_3 + \bar{B}_1.\bar{B}_3) + T_2(B_2.B_3 + \bar{B}_2.\bar{B}_3)$$
$$+ T_3(B_1.B_2 + \bar{B}_1.\bar{B}_2)](\text{Mult} + \text{Div})W_2$$

(32)

$$C_3 = T_3[To + Ti + W_1 + W_2(\text{Add} + \text{Subt}) + W_3 + W_4]$$
$$+ [T_1(B_1.B_2 + \bar{B}_1.\bar{B}_2) + T_2(B_1.B_3 + \bar{B}_1.\bar{B}_3)$$
$$+ T_3(B_2.B_3 + \bar{B}_2.\bar{B}_3)](\text{Mult} + \text{Div})W_2$$

Referring now to Fig. 13, there is presented a symbolic representation or circuit diagram of the timing section indicated by broken lines 1300 of the control circuit 10 of Fig. 1, mechanized in accordance with the logical Equation 23 above.

As indicated, the timing section receives bit identification signals $X_0, X_1, X_2, X_3, X_4, X_5, X_6, X_7, X_8, X_9, X_{10}, X_{11}$ . . . etc. and produces timing signals $T_1, T_2,$ and $T_3$. Included within the timing section are a first logical "or" circuit 1301 responsive to signals $X_0, X_3, X_6, X_9$ . . . etc. for producing signals $T_1$, a second logical "or" circuit 1302 responsive to signals $X_1, X_4, X_7, X_{10}$ . . . etc. for producing signals $T_2$, and a third logical "or" circuit 1303 responsive to signals $X_2, X_5, X_8, X_{11}$ . . . etc. for producing signals $T_3$.

Reference is now made to Fig. 14, presenting a symbolic or schematic circuit diagram of a $\text{Mod}_7$ modification of the forward-reverse section 3 of the control circuit 10 of Fig. 1, mechanized in accordance with the logical Equations 31 above.

As indicated in the figure, the forward-reverse section indicated by broken lines 1400 receives timing signals $T_1, T_2,$ and $T_3$ from the timing section 1 of the control circuit 10, binary sign signals $\bar{S}$ and $S$, binary word signals $W_1, W_2, W_3,$ and $W_4$, and binary command signals $Ti, To,$ Add, Subt, Mult, and Div from the operational circuit 120, and signals $B_1, \bar{B}_1, B_2, \bar{B}_2, B_3$ and $\bar{B}_3$ from the B modulo counter 14 of Fig. 1, and produces forward and reverse control signals $Cf$ and $Cr$, respectively.

Referring now to Fig. 15, there is presented a schematic circuit diagram of a $\text{Mod}_7$ modification of the weighting section 4 of the control circuit 10 of Fig. 1.

The weighting section of Fig. 15 indicated by broken lines 1500 includes a plurality of logical "and" and logical "or" circuits connected in accordance with the logical Equation 32 above, for receiving timing signals $T_1, T_2,$ and $T_3$ produced by the timing section 1 of the control circuit 10, modulo count signals $B_1, \bar{B}_1, B_2, \bar{B}_2, B_3,$ and $\bar{B}_3$ from the B modulo counter 14, and word and command identification signals $W_1, W_2, W_3, W_4$ and $To, Ti,$ Add, Subt, Mult, and Div, respectively, from the operational circuit 120 of Fig. 1, and producing counting weight signals $C_1, C_2,$ and $C_3$.

From the foregoing discussion, it is apparent that the present invention provides an electronic modulo error detecting system for supervising the transfer and arithmetic processing of primary binary or binary-coded algebraic data by an operational unit to produce the corresponding secondary algebraic data by forming and directly comparing a first and a second modulo equivalent of the primary and secondary data, an error in the transfer and arithmetic processing of the data being indicated by any dissimilarity between the first and the second modulo equivalent formed. The first modulo equivalent is formed as the algebraic $\text{Mod}_n$ sum of the primary data during transfer and addition operations, as the algebraic $\text{Mod}_n$ difference of the primary data during subtraction operations, the algebraic $\text{Mod}_n$ product of the primary data representing the multiplier and multiplicand during multiplication operations, and the algebraic $\text{Mod}_n$ product of the primary datum representing the divisor and the secondary datum representing the partial quotient during division operations. The second modulo equivalent is formed as the algebraic sum-result $\text{Mod}_n$, algebraic difference-result $\text{Mod}_n$, and algebraic product-result $\text{Mod}_n$ of the secondary data during transfer and addition, subtraction, and multiplication operations, respectively, and as the algebraic $\text{Mod}_n$ difference of the primary datum representing the dividend and the secondary datum representing the remainder.

The electronic modulo error detecting system of the present invention has been described as comprising a modulo circuit responsive to the primary and secondary data magnitude and identification signals for producing the first and the second modulo equivalents, and an error circuit for comparing for equality the first and second modulo equivalents and producing an error signal if the first and the second modulo equivalents are unequal.

The modulo circuit of the present invention has been described as including an A gate, a B gate, an A modulo counter, a B modulo counter, and a control circuit.

It has been shown that single mechanizations of the error circuit and the A and the B gate of the modulo circuit are generic to all embodiments of the present invention adapted to receive serial trains of binary magnitude signals. It has been further demonstrated that the mechanization of the A and the B modulo counters and the control circuit of the modulo circuit of the present invention vary in specific structure for different values of $n$, where $n$ is the modulo base chosen for embodiments of the present invention in view of the particular binary code used by the operational unit supervised by the error detecting system of the present invention.

$\text{Mod}_3$ and $\text{Mod}_7$ embodiments of the A and the B modulo counters and the control circuit of the present invention have been described in detail. From the foregoing discussion, logical mechanization equations for other embodiments of the two $\text{Mod}_n$ counters and the control circuit for various values of $n$ selected in accordance with any specific requirements are readily derivable in the light of the principles herein taught and the well-known rules of logical Boolean algebra.

Although the present invention has been described in relation to binary electrical pulses, it should be apparent that the principles herein taught are equally applicable to any two-condition signal system such as mark-space, symmetrical wave, or carrier modulation system. It should be further apparent that the present invention is not limited to binary, binary-coded decimal, or binary-coded octal number systems but is equally operable in any binary digit coded system such as a reflected binary code, or the like.

The embodiments herein described utilize electrical signals, electrical gating circuits, and electronic flip-flops, but it should be clearly understood that the principles of the invention are equally applicable to electromechanical, mechanical, hydraulic, or chemical devices having similar gating features, two stable states, and storage capacity or memory.

What is claimed as new is:

1. An electronic modulo—$n$ error detecting system where $n$ is an integer greater than 1, for supervising an operation of transferring, adding, subtracting, multiplying, or dividing primary algebraic data to produce corresponding resultant algebraic data, each primary and resultant datum being represented by primary and resultant binary magnitude signals, respectively, and binary identification signals including command signals identifying the operation performed, word signals identifying each primary and secondary datum, bit signals identifying each binary bit of each datum, and sign signals indicating the algebraic sign of each datum, said error detecting system comprising: first means responsive to the binary magnitude and identification signals for selectively gating said binary magnitude signals in particular ones of the primary and resultant data to produce a first signal series representing the weighted significance of each binary magnitude signal and the polarity of each such weighted significance; second means responsive to the binary magnitude and identification signals for selectively gating said binary magnitude signals in particular ones of the primary and resultant data to produce a second signal series representing the weighted significance of each binary magnitude signal and the polarity of each such weighted significance; third means, including a plurality of logical "and" and logical "or" circuits, responsive to the binary identification signals for producing binary control signals; means including a first modulo counter coupled to said first and third means and responsive to said first signal series and said control signals for producing a forward and reverse count in said counter in accordance with the polarity and weighted digital significance of each signal in said first series to obtain first binary modulo signals representing, at any instant, the accumulated count of said first counter at that instant, and representing, after completion of the operation, a first modulo—$n$ equivalent of the algebraic data; means including a second modulo counter coupled to said second and third means and responsive to said second signal series and said control signals for producing a forward and reverse count in said counter in accordance with the polarity and weighted digital significance of each signal in said second series to obtain second binary modulo signals representing, at any instant, the accumulated count of said second modulo counter at that instant, and representing, after completion of an operation, a second modulo—$n$ equivalent of the algebraic data whereby inequality of said first and second modulo equivalents will indicate an error; and fourth means coupled to said first and second modulo counters for comparing said first and second modulo equivalents for equality.

2. The electronic modulo error detecting system defined in claim 1 wherein said first gating means includes a plurality of logical "and" and "or" circuits connected to gate the primary magnitude signals during a transfer, addition, and subtraction operation, to gate the primary magnitude signals representing the absolute magnitude of the multiplicand during a multiplication operation, and to gate the secondary magnitude signals representing the absolute magnitude of the partial quotient during a division operation to obtain the production of said first signals of weighted digital significance, and wherein said second gating means includes a plurality of logical "and" and "or" circuits connected to gate the resultant magnitude signals during transfer, addition, and subtraction operations, to gate the primary magnitude signals representing the absolute magnitude of the multiplier and the resultant magnitude signals representing the absolute magnitude of the product during a multiplication operation, and to gate the primary magnitude signals representing the absolute magnitudes of the divisor and dividend and the resultant magnitude signals representing the absolute magnitude of the remainder during a division operation to obtain the production of said second signals of weighted digital significance.

3. The electronic modulo error detecting system defined in claim 2 wherein said first modulo counter includes a first control matrix responsive to said first signals of weighted digital significance and said control signals for producing first flip-flop control signals, and further includes at least two bistable flip-flops coupled to first control matrix and responsive to said first flip-flop control signals for producing said first modulo equivalent representing the modulo-$n$ sum during a transfer or addition operation, representing modulo-$n$ difference during a subtraction operation, and representing the modulo-$n$ product during a multiplication operation of the primary algebraic data, and representing the modulo-$n$ product of the divisor and partial quotient during a division operation, and wherein said second modulo counter includes a second control matrix responsive to said second signals of weighted digital significance and said control signals for producing second flip-flop control signals, and further includes at least two bistable flip-flops coupled to said second control matrix and responsive to said second flip-flop control signals for producing said second modulo equivalent representing the modulo-$n$ sum of the resultant data during a transfer operation, representing the sum-result modulo-$n$, the difference-result modulo-$n$ and product-result modulo-$n$ during respective addition, subtraction, and multiplication operations, and representing the modulo-$n$ difference of the divident and remainder during a division operation, where $n$ is an integer greater than 1.

4. The electronic modulo error detecting system defined in claim 3 wherein $n$ is equal to 3, wherein said control circuit includes a forward-reverse section responsive to the binary identification signals and to the signals of weighted digital significance for producing forward and reverse control signals $Cf$ and $Cr$, respectively, and further includes a reset section responsive to the binary identification signals for producing an intermediate reset signal $Rb$, said signals $Cf$, $Cr$, and $Rb$ forming part of said control signals, and wherein each of said first and second modulo counters is a modulo-three unit-count recycling counter having a forward and a reverse counting sequence selectively operable in response to the signals $Cf$ and $Cr$, respectively, and wherein said second modulo counter is coupled to said control circuit to become reset to 0 in response to the signal $Rb$.

5. The electronic modulo error detecting system defined in claim 3 wherein $n$ is equal to 7, wherein said control circuit includes a weighting section responsive to the binary identification signals and to the signals of weighted digital significance, a forward-reverse section responsive to the binary identification signals and to the signals of weighted digital significance, and a reset section responsive to the binary identification signals for producing respectively weighting signals $C_1$, $C_2$, and $C_3$; forward and reverse signals $Cf$ and $Cr$, respectively; and an intermediate reset signal $Rb$, and wherein each of said first and second modulo counters is a modulo-seven recycling counter having a one-unit, two-unit, and three-unit count sequence selectively operable in response to the signals $C_1$, $C_2$, and $C_3$, respectively, and a forward and reverse count sequence selectively operable in response to the signals $Cf$ and $Cr$, respectively, and wherein said second modulo counter is coupled to said control circuit to become reset to 0 in response to the signal $Rb$ forming a part of said control signals.

6. In combination for providing a check as to the correctness of computations on a first plurality of signals digitally representing a first quantity and the polarity of the quantity and on a second plurality of signals digitally representing a second quantity and the polarity of the quantity to obtain the production of a third plurality of signals digitally representing a third quantity and the polarity of the quantity in accordance with the occurrence of signals controlling the type of operation to be performed on the first and second quantities including addition, subtraction and multiplication, means including electrical circuitry for weighting each of the signals in the first, second and third pluralities in accordance with the particular digital significance of these signals in representing their respective quantities and in accordance with a selected modulo base to provide for each signal a weight less than the modulo base, means including electrical circuitry connected in a first counter for providing a digital count having a maximum value related to the selected modulo base and for initiating a new count upon each occurrence of the maximum count and for counting in a forward and reverse direction, means including electrical circuitry connected in a second counter for providing a digital count having a maximum value related to the selected modulo base and for initiating a new count upon each occurrence of the maximum count and for counting in a forward and reverse direction, means including electrical circuitry for providing for an arithmetic combination of weighted significances in the first counter for the signals in the first plurality and for providing for a forward or reverse arithmetic count in the first counter from the cumulative value in the first counter in accordance with the weighted significances of the signals in the second plurality and in accordance with the polarities of the first and second quantities and in accordance with the occurrence of control signals representing the operations of addition or subtraction, means including electrical circuitry for providing for a cumulative combination of weighted significances in the second counter for the signals in the first plurality and for providing for a forward or reverse arithmetic count in the first counter from a value of zero in the first counter and in accordance with the cumulative count in the second counter at the end of the signals in the first plurality and in accordance with the weighted significances of the signals in the second plurality and in accordance with the occurrence of control signals representing the operation of multiplication, means including electrical circuitry for providing a resetting of the second counter to a value of zero after the introduction of the signals in the first plurality and for thereafter providing for a forward or reverse count in the second counter in accordance with the weighted significances of the signals in the third plurality in accordance with the occurrence of the control signals representing the operation of multiplication, and means including electrical circuitry for comparing the cumulative count in the first and second counters to determine the correctness of combining the signals in the first and second pluralities for obtaining the signals in the third pluralities.

7. In combination for providing a check as to the correctness of computations on a first plurality of signals digitally representing a first quantity and the polarity of the quantity and on a second plurality of signals digitally representing a second quantity and the polarity of the quantity to obtain the production of a third plurality of signals digitally representing a third quantity and the polarity of the quantity in accordance with the occurrence of signals controlling the type of operation to be performed on the first and second quantities, means including a plurality of "and" networks and "or" networks connected in a particular interrelationship for providing a weighted significance for each of the signals in the first, second and third pluralities in accordance with the digital significance of the signals and in accordance with a selected modulo base to provide for each signal a weight less than the modulo base, first means including a plurality of "and" networks and "or" networks connected in a particular interrelationship for providing a count on a cyclic basis and in a forward or reverse direction between minimum and maximum limits, second means including a plurality of "and" networks and "or" networks connected in a particular interrelationship for providing a count on a cyclic basis and in a forward or reverse direction between minimum and maximum limits, means including a plurality of "and" networks and "or" networks connected in a particular relationship and responsive to particular ones of the first, second and third pluralities of signals and responsive to the control signals for providing an accumulation in particular ones of the counters of the weighted significance of the introduced signals, means including a plurality of "and" networks and "or" networks connected in a particular relationship and responsive to the control signals for producing intermediate reset signals for introduction to the counter after the introduction of the first, second and third pluralities of signals and in accordance with the particular type of operation being performed, means including a plurality of "and" networks and "or" networks connected in a particular relationship and responsive to the intermediate reset signals for resetting the counters for subsequent accumulations of counts in the counters in accordance with the particular type of operation being performed, means including a plurality of "and" networks and "or" networks connected in a particular relationship and responsive to particular ones of the first, second and third pluralities of signals and to the control signals upon the resetting of the first and second counters for providing an accumulation in particular ones of the counters of the weighted significances of the introduced signals and at a rate dependent upon the accumulated count in the counters immediately prior to the resetting, and means for comparing the counts accumulated in the first and second counters after any resetting operation to provide a determination as to the correctness of the computations in obtaining the signals in the third plurality.

8. An electronic modulo-$n$ error detecting system, where $n$ is an integer greater than 1, for supervising an operation of transferring or arithmetic processing primary algebraic data to produce the corresponding secondary algebraic data, each primary and secondary datum being represented by primary and secondary binary magnitude signals, respectively, and binary identification signals; said error detecting system comprising: first means including a plurality of logical "and" and logical "or" circuits responsive to the binary identification signals for producing binary control signals, said binary identification signals including command signals identifying the operation performed, word signals identifying each primary and secondary datum, bit signals identifying each binary bit of each datum, and sign signals indicating the algebraic sign of each datum; means responsive to the binary identification signals and to the digital significance of the binary magnitude signals for producing weighted signals representing a forward or reverse count for each binary magnitude signal in the primary and secondary datum and representing the weighted significance of each such count; means including a first modulo counter coupled to said first means and responsive to said control signals and the signals of weighted digital significance for counting in a forward and reverse direction in accordance with the weighted significance of each of the weighted signals in particular sets of the primary and secondary data and in accordance with the operation being performed; means including a second modulo counter coupled to said first means and responsive to said control signals and the signals of weighted digital significance for counting in a forward and reverse direction in accordance with the weighted significance of each of the weighted signals in particular sets of the primary and secondary data and in accordance with the operation being performed; and means including an error circuit coupled to said first and second modulo counters for comparing said first and second sets of modulo signals for equality, whereby inequality between said sets of modulo signals indicates an error.

9. The electronic error detecting system defined in claim 8 wherein $n$ is equal to three; wherein said first modulo counter includes a first control matrix having a plurality of logical "and" and logical "or" circuits responsive to said control signals and the signals of weighted digital significance for producing first and second pairs of flip-flop control signals, and also includes first and second bistable flip-flops coupled to said first control matrix and responsive, respectively, to said first and second pairs of flip-flop control signals for producing said first set of binary modulo signals, and wherein said second modulo counter includes a second control matrix having a plurality of logical "and" and logical "or" circuits responsive to the signals of weighted digital significance and said control signals for producing third and fourth pairs of flip-flop control signals, and also includes third and fourth bistable flip-flops coupled to said second control matrix and responsive, respectively, to said third and fourth pairs of flip-flop control signals for producing said second set of binary modulo signals.

10. The electronic error detecting system defined in claim 8 wherein $n$ is equal to seven; wherein said first modulo counter includes a first control matrix having a plurality of logical "and" and logical "or" circuits responsive to the signals of weighted digital significance and said control signals for producing a first set of three pairs of flip-flop control signals, and also includes a first group of three bistable flip-flops for producing said first set of binary modulo signals, each flip-flop of said first group being coupled to said first control matrix and responsive to an associated pair of control signals of said first set for controlling its stable states, and wherein said second modulo counter includes a second control matrix having a plurality of logical "and" and logical "or" circuits responsive to the signals of weighted digital significance and said control signals for producing a second set of three pairs of flip-flop control signals, and a second group of three bistable flip-flops for producing said second binary modulo signals, each flip-flop of said second group being coupled to said second control matrix and responsive to an associated pair of control signals of said second set for controlling its stable state.

11. An electronic modulo—$n$ error detecting system, where $n$ is an integer greater than one, for supervising operations of transferring, adding, subtracting, multiplying, and dividing primary algebraic data corresponding to transferred-in data, augend and addend, minuend and subtrahend, multiplier and multiplicand, and diviser and dividend, respectively, to produce a secondary data corresponding to transferred-out data, sum, difference, product, and partial quotient and remainder, respectively, each primary and secondary datum being represented by primary and secondary binary magnitude signals, respectively, and binary identification signals; said error detecting system comprising: first means responsive to the binary identification signals for producing binary control signals, said binary identification signals including commanding signals identifying the operation, word signals identifying each primary and secondary datum, bit signals identifying each binary bit of each datum, and sign signals identifying the algebraic sign of each datum; means responsive to the binary identification signals and to the digital significance of the binary magnitude signals for producing a plurality of weighted signals each indicating a forward or reverse count of a corresponding binary magnitude signal and the magnitude of such forward or reverse count; means including a first modulo counter coupled to said first means and responsive to said control signals and the signals of weighted digital significance for producing a first set of binary modulo signals representing the modulo-$n$ equivalent of the sum of the modulo-$n$ values of the transferred-in data, and the minuend and subtrahend after completion of a transfer and an addition operation, respectively, the modulo-$n$ equivalent of the difference of the modulo-$n$ values of the minuend and the subtrahend after completion of a subtraction operation, the modulo-$n$ equivalent of the product of the modulo-$n$ values of the multiplier and the multiplicand after completion of a multiplication operation, and representing the modulo-$n$ equivalent of the difference between the modulo-$n$ values of the dividend and the remainder after completion of a division operation; means including a second modulo counter coupled to said first means and responsive to said control signals and the signals of weighted digital significance for producing a second set of binary modulo signals representing the modulo-$n$ equivalent of the sum of the modulo-$n$ values of the transferred-out data after completion of a transfer operation, the modulo-$n$ equivalent of the sum, the difference, and the product after completion of an addition, subtraction and multiplication operation, respectively, and representing the modulo-$n$ equivalent of the product of the modulo-$n$ of the divisor and the partial quotient after a division operation; and means including an error circuit coupled to said first and second modulo counters for comparing said first and second sets of binary modulo signals for equality, whereby inequality of said first and second binary modulo signals after completion of an operation indicates that an error has occurred during the operation.

12. An electronic modulo error detecting system for supervision an operation of transferring or addition upon primary algebraic data to produce the corresponding resultant algebraic data, each primary and resultant datum being represented by primary and secondary binary magnitude signals, respectively, and binary identification signals, whereby said error detecting system produces a two-level monitor signal after the completion of the operation indicative of an error occurring during the operation; said error detecting system comprising: first means responsive to the binary identification signals for producing binary control signals, said binary identification signals including word signals identifying each primary and resultant datum, bit signals identifying each binary bit of each datum, and sign signals identifying the algebraic sign of each datum; means responsive to the binary identification signals and the binary magnitude signals for the primary and resultant data to produce signals representing the weighted modulo significance in the forward or reverse direction of each magnitude signal and representing the particular direction of the weighted modulo significance of each magnitude signal; means including a first modulo counter coupled to said first means and responsive to said control signals and the signals of weighted significance for the primary data for sign-counting said signals of weighted significance to produce a first set of modulo signals representing the modulo-$n$ equivalent of the sum of the modulo-$n$ values of primary data; means including a second modulo counter coupled to said first means and responsive to said control signals and the signals of weighted significance for the resultant datum for sign-counting said signals of weighted significance to produce a second set of binary modulo signals representing the modulo-$n$ equivalent of the sum of the modulo-$n$ values of the resultant data; and means including an error circuit coupled to said first and second modulo counters for directly comparing the count in said first and second counters for equality to produce the two level monitor signal in accordance with an occurrence or lack of any difference in such comparison.

13. An electronic error detecting system for supervising an operation of multiplication upon primary algebraic data corresponding to a multiplier and a multiplicand to produce a resultant algebraic datum corresponding to the product of the multiplier and the multiplicand, each primary and secondary datum being represented by primary and resultant binary magnitude signals, respectively, and identification signals whereby said error detecting system produces a two-level monitor signal indicating a possible error in carrying-out the operation; said error detecting system comprising: first means responsive to the binary identification signals for producing binary control signals including a reset signal, said binary identification signals including word signals identifying each primary and secondary datum, bit signals identifying each binary bit of each datuum, and sign signals identifying the algebraic sign of each datum; second means coupled to said first means and responsive to the identification signals and said control signals and said binary magnitude signals for selectively gating the binary magnitude signals to produce a first and a second signal series respectively representing the weighted significance of each binary digit in the primary data indicative of the multiplier and multiplicand and representing the polarity of each such weighted digit and to produce a third signal series representing the weighted significance of each binary digit in the resultant datum indicative of the product and representing the polarity of each such weighted digit; means including a first modulo counter coupled to said first and second means and responsive to said control signals, to the weighted significance and polarity of each digit in the multiplicand as indicated by said second signal series, and to a first signal set for product counting said second signal series in accordance with said first signal set to produce first modulo signals representing the modulo-$n$ product of the multiplier and the multiplitand; means including a second modulo counter coupled to said first and second means and responsive to said control signals and to the weighted digital significance and polarity of each digit in the multiplier and in the product as respectively indicated by said first and third signal series for sign-counting said first signal series to produce said first signal set representing the modulo-$n$ equivalent of the multiplier and responsive to said reset signal for subsequently obtaining a resetting of the counter to a zero count and for thereafter sign-counting said third signal series to produce second modulo signals representing the modulo-$n$ equivalent of the product; and means including an error circuit coupled to said first means and said first and second modulo counters and responsive to said first and second modulo signals and said reset signal for directly comparing said first and second modulo signals to produce the two-level modulo signal in accordance with an occurrence or lack of occurrence of any difference in such comparison.

14. An electronic error detecting system for supervising an operation of division upon primary algebraic data corresponding to a divisor and a dividend to produce secondary algebraic data corresponding to a partial quotient and a remainder, each primary and secondary datum being represented by primary and secondary binary magnitude signals, respectively, and binary identification signals whereby said error detecting system produces a two-level monitor signal indicating a possible error occurring in carrying-out the operation; said error detecting system comprising: first means responsive to the binary identification signals for producing binary control signals including a reset signal, said binary identification signals including word signals identifying each primary and secondary datum, bit signals identifying each binary bit of each datum, and sign signals identifying the algebraic sign of each datum; second means responsive to the identification signals and to the control signals and the binary magnitude signals for the primary and secondary data to produce first, second, third and fourth signal series representing the weighted modulo significance in the forward or reverse direction of each binary magnitude signal in the data indicating the divisor, the dividend, the partial quotient and the remainder, respectively, and representing the particular direction of this weighted significance; means including a first modulo counter coupled to said first and second means and responsive to said control signals, to the weighted significance and polarity of each digit in the partial quotient as indicated by said third signal series and to a first signal set for product-counting said third signal series in accordance with said first signal set to produce first modulo signals representing the modulo-$n$ product of the divisor and the partial quotient; means including a second modulo counter coupled to said first and second means and responsive to said control signals and to the weighted significance and polarity of each digit in the divisor as indicated by said first signal series for sign-counting said first signal series to produce said first signal set representing the modulo-$n$ equivalent of the divisor and responsive to said control signals including said reset signal for subsequently resetting said first modulo counter to a zero count and responsive to said control signals and to the weighted significance and polarity of each digit in the dividend as indicated by said second signal series for thereafter sign-counting said second signal series to produce a second signal set representing the modulo-$n$ equivalent of the dividend and responsive to said control signals and the weighted significance and polarity of each digit in the remainder as indicated by said fourth signal series for still later inverse-sign-counting said fourth signal series to produce second modulo signals representing the modulo-$n$ equivalent of the difference between the remainder and the dividend; and means including an error circuit coupled to said first and second modulo counter and said first means and responsive to said first and second modulo signals and said reset signal for directly comparing said first and second modulo signals to produce the two-level monitor signal in accordance with the occurrence or lack of occurrence of any difference in such comparison.

15. The control circuit defined in claim 14 wherein said forward-reverse section includes a plurality of logical "and" and "or" circuits connected in accordance with the logical equation:

$$Cf = (\bar{S}.T_1 + S.T_2)\{T_0 + T_i + W_1 + W_3 + W_2[\text{Add} + (\text{Mult} + \text{Div})B_1]\} + (S.T_1 + \bar{S}.T_2)\{W_4.\text{Div} + W_2[\text{Subt} + (\text{Mult} + \text{Div})B_2]\}$$

$$Cr = (S.T_1 + \bar{S}.T_2)\{T_0 + T_i + W_1 + W_3 + W_2[\text{Add} + (\text{Mult} + \text{Div})B_1]\} + (\bar{S}.T_1 + S.T_2)\{W_4.\text{Div} + W_2[\text{Subt} + (\text{Mult} + \text{Div})B_2]\}$$

where a dot (.) and a parenthesis ( ) represent the logical "and" function, and a plus (+) represents the logical "or" function.

16. The control circuit defined in claim 14 wherein said timing section includes a first logical "or" circuit responsive to signals $X_0$, $X_2$, $X_4$, $X_6$, . . . $X_{m-1}$ for producing said first timing signal $T_1$, and a second logical "or" circuit responsive to signals $X_1$, $X_3$, $X_5$, $X_7$, . . . $X_m$ for producing said second timing signal $T_2$.

17. The control circuit defined in claim 14 wherein said reset section includes a plurality of logical "and" and "or" circuits connected in accordance with the logical equation:

$$Rb = W_2(\text{Mult} + \text{Div})Xt$$
$$R = [T_0 + W_3(\text{Add} + \text{Subt} + \text{Mult}) + W_4.\text{Div}]Xt$$

where a dot (.) and a parenthesis ( ) represent the logical "and" function and a plus (+) the logical "or" function.

18. In an electronic modulo-three error detecting system for supervising an arithmetic or transfer operation upon primary algebraic data to produce the corresponding secondary algebraic data, each primary and secondary datum being represented by binary identification signals and a signal train of binary magnitude signals, said system producing a first and a second set of binary modulo signals $A_1$, $\bar{A}_1$, $A_2$, $\bar{A}_2$ and $B_1$, $\bar{B}_1$, $B_2$, $\bar{B}_2$, respectively which are directly comparable after completion of an operation for indicating an error occurring during the operation, where a bar (—) over a symbol of a signal indicates the complement of the signal represented by the symbol and where said binary identification signals include word identification signals $W_1$, $W_2$, $W_3$ and $W_4$ identifying the primary and secondary data, bit signals $X_0$, $X_1$, $X_2$ . . . $X_m$ identifying successive binary signals of each signal train and sign signals S, $\bar{S}$ identifying the algebraic sign of each datum, said system including a control circuit responsive to the binary identification signals for producing forward and reverse control signals $Cf$ and $Cr$, respectively, a reset signal R and an intermediate reset signal $Rb$, and responsive to the binary identification signals and to the binary magnitude signals for producing signal trains representing the weighted significance of the successive digits in each of the primary and secondary data and for producing signals $Cf$ and $Cr$ representing the polarity of the weighted significance of each digit and also includes a first and a second modulo-three counter coupled to the control circuit and responsive to the control signals and the signal trains of weighted digital significance for selectively counting the signals of said trains in accordance with their weighted digital significance and in a forward or reverse direction in response to the signals $Cf$ and $Cr$, respectively, to obtain the production by said first and second modulo-three counters of the first and the second set of binary modulo signals $A_1$, $\bar{A}_1$, $A_2$, $\bar{A}_2$ and $B_1$, $\bar{B}_1$, $B_2$, $\bar{B}_2$, respectively, and to obtain a resetting of said counters to zero in response to signals R and $Rb$ and also includes comparison circuitry responsive to the binary modulo signals $A_1$, $\bar{A}_1$, $A_2$, $\bar{A}_2$ and $B_1$, $\bar{B}_1$, $B_2$, $\bar{B}_2$ and to the reset signal R for comparing the binary modulo signals from the first and second modulo-three counters to provide an indication of any difference or lack of difference in the state of operation of the first and second counters in accordance with such comparison; said control circuit comprising: means including a timing section responsive to the sequential binary bit identification signals $X_0$, $X_1$, $X_2$, ... $X_m$ identifying the successive binary signals of each signal train for alternately producing a pair of binary timing signals $T_1$ and $T_2$, where $m$ equals the number of binary signals in each train; means including a reset section responsive to the word identification signals $W_1$, $W_2$, $W_3$, $W_4$ identifying each primary and secondary datum, command identification signals Ti, To, Add, Subt, Mult, and Div indicating the operations of transfer-in, transfer-out, addition, subtraction, multiplication, and division, respectively, performed on the primary data, and an end-of-word identification signal $X_t$ identifying the last binary signal of each signal train for producing the reset signal R and the intermediate reset signals Rb; and means including a forward-reverse section coupled to said timing section and responsive to said timing signals $T_1$ and $T_2$, binary modulo signals $B_1$ and $B_2$, and the sign identification signals S, $\bar{S}$ for each word, the word identification signals $W_1$, $W_2$, $W_3$, $W_4$, the command identification signals To, Ti, Add, Subt, Mult, and Div for producing the forward and reverse control signals Cf and Cr, respectively and the signal trains of weighted digital significance.

19. The control circuit defined in claim 18 wherein said forward-reverse section includes a plurality of logical "and" and "or" circuits connected in accordance with the logical equations:

$$Cf = [\bar{S}(T_1+T_2)+S.T_3](T_o+T_i+W_1+W_2.\text{Add}+W_3)$$
$$+[S(T_1+T_2)+\bar{S}.T_3](W_2.\text{Subt}+W_4.\text{Div})$$
$$+[\bar{S}(T_1.\bar{B}_3+T_2.\bar{B}_2+T_3.\bar{B}_1)+S(T_1.B_3+T_2.B_2$$
$$+T_3.B_1)](\text{Mult}+\text{Div})W_2$$
$$Cr=[S(T_1+T_2)+\bar{S}.T_3](T_o+T_i+W_1+W_2.\text{Add}+W_3)$$
$$+[\bar{S}(T_1+T_2)+S.T_3](W_2.\text{Subt}+W_4.\text{Div})+[S(T_1.\bar{B}_3$$
$$+T_2.\bar{B}_2+T_3.\bar{B}_1)+\bar{S}(T_1.B_3+T_2.B_2+T_3.B_1)](\text{Mult}$$
$$+\text{Div})W_2$$

where a dot (.), a parenthesis ( ), and a bracket [ ] represent a logical "and" function, and a plus (+) the logical "or" function.

20. The control circuit defined in claim 18 wherein said weighting section includes a plurality of logical "and" and "or" circuits connected in accordance with the logical equations:

$$C_1=T_1[T_o+T_i+W_1+W_2(\text{Add}+\text{Subt})+W_3+W_4]$$
$$+[T_1(\bar{B}_2.\bar{B}_3+B_2.B_3)+T_2(\bar{B}_1.\bar{B}_2+B_1.B_2)+T_3(B_1.B_3$$
$$+\bar{B}_1.\bar{B}_3)](\text{Mult}+\text{Div})W_2$$
$$C_2=T_2[T_o+T_i+W_1+W_2(\text{Add}+\text{Subt})+W_3+W_4]$$
$$+[T_1(B_1.B_3+\bar{B}_1.\bar{B}_3)+T_2(B_2.B_3+\bar{B}_2.\bar{B}_3)+T_3(B_1.B_2$$
$$+\bar{B}_1.\bar{B}_2)](\text{Mult}+\text{Div})W_2$$
$$C_3=T_3[T_o+T_i+W_1+W_2(\text{Add}+\text{Subt})+W_3+W_4]$$
$$+[T_1(B_1.B_2+\bar{B}_1.\bar{B}_2)+T_2(B_1.B_3+\bar{B}_1.\bar{B}_3)+T_3(B_2.B_3$$
$$+\bar{B}_2.\bar{B}_3)](\text{Mult}+\text{Div})W_2$$

where a dot (.), a parenthesis ( ) and a bracket [ ] represent the logical "and" function and a plus (+) the logical "or" function.

21. The control circuit defined in claim 18 wherein said timing section includes a first logical "or" circuit for receiving bit signals $X_0$, $X_3$, $X_6$ ... $X_{m-2}$ for producing said first timing signals $T_1$, a second logical "or" circuit for receiving bit signals $X_1$, $X_4$, $X_7$ ... $X_{m-1}$ and for producing said second timing signal $T_2$, and a third logical "or" circuit for receiving signals $X_2$, $X_5$, $X_8$ ... $X_m$ for producing said third timing signals $T_3$.

22. In an electronic modulo-seven error detecting system for supervising an arithmetic or transfer operation upon primary algebraic data to produce the corresponding secondary algebraic data, each primary and secondary datum being represented by binary identification signals and a signal train of binary magnitude signals, said system producing a first and a second set of binary modulo signals $A_1$, $\bar{A}_1$, $A_2$, $\bar{A}_2$, $A_3$, $\bar{A}_3$ and $B_1$, $\bar{B}_1$, $B_2$, $\bar{B}_2$, $B_3$, $\bar{B}_3$, respectively, which are directly comparable after completion of an operation for indicating an error occurring during the operation, where a bar (—) over a symbol of a signal indicates the complement of the signal represented by the symbol and where said binary identification signals include word identification signals $W_1$, $W_2$, $W_3$ and $W_4$ identifying the primary and secondary data, bit signals $X_0$, $X_1$, $X_2$ ... $X_m$ identifying successive binary signals of each signal train and sign signals S, $\bar{S}$ identifying the algebraic sign of each datum, said system including a control circuit responsive to the binary identification signals for producing forward and reverse control signals Cf and Cr, respectively, 1-unit, 2-unit, and 3-unit weight control signals $C_1$, $C_2$, and $C_3$, respectively, a reset signal R and an intermediate reset signal Rb, and responsive to the binary identification signals and to the binary magnitude signals for producing signals representing the weighted significance of successive digits in each of the primary and secondary data and for producing signals Cf and Cr representing the polarity of the weighted significance of each digit and also includes a first and a second modulo-seven counter coupled to the control circuit and responsive to the signal trains of signals of weighted digital significance and the control signals for selectively counting the signals of said trains in accordance with counting weights of 1, 2, and 3 in response to the signals $C_1$, $C_2$ and $C_3$, respectively, and in a forward or reverse count sequence in response to the signals Cf and Cr, respectively, to obtain the production by said first and second modulo-seven counters of the first and the second sets of binary modulo signals $A_1$, $\bar{A}_1$, $A_2$, $\bar{A}_2$, $A_3$, $\bar{A}_3$, and $B_1$, $\bar{B}_1$, $B_2$, $\bar{B}_2$, $B_3$, $\bar{B}_3$, respectively, and to obtain the resetting of said counters to zero in response to the reset signals R and Rb and also includes comparison circuitry responsive to the binary modulo signals $A_1$, $\bar{A}_1$, $A_2$, $\bar{A}_2$, $A_3$, $\bar{A}_3$ and $B_1$, $\bar{B}_1$, $B_2$, $\bar{B}_2$, $B_3$, $\bar{B}_3$ and to the reset signal R for comparing the binary modulo signals from the first and second modulo-seven counters to provide an indication of any difference or lack of difference in the state of operation of the first and second counters in accordance with such comparison; means including said control circuit comprising: a timing section responsive to the binary bit identification signals $X_0$, $X_1$, $X_2$, ... $X_m$ identifying the successive binary signals of each signal train for producing a set of binary timing signals $T_1$, $T_2$ and $T_3$ where $m$ equals the number of binary signals in each train; means including a reset section responsive to the word identification signals $W_1$, $W_2$, $W_3$, $W_4$ identifying each primary and secondary datum, command identification signals Ti, To, Add, Subt, Mult, and Div indicating the operations of transfer-in, transfer-out, addition, subtraction, multiplication, and division, respectively, performed on the primary data, and an end-of-word identification signal $X_t$ identifying the last binary signal of each signal train for producing the reset signal R and the intermediate reset signals Rb; means including a weighting section coupled to said timing section and responsive to said timing signals $T_1$, $T_2$, and $T_3$, the second set of binary modulo signals and the binary identification signals including the algebraic sign identification signals S, $\bar{S}$, the word identification signals $W_1$, $W_2$, $W_3$, $W_4$ and the command identification signals To, Ti, Add, Subt, Mult, and Div for producing the weight control signals $C_1$, $C_2$ and $C_3$; and means including a forward-reverse section coupled to said timing section and responsive to said timing signals $T_1$, $T_2$ and $T_3$, the binary modulo signals $A_1$, $A_2$, and $A_3$ and $B_1$, $B_2$ and $B_3$, and the sign identification signals S, $\bar{S}$, the word identification signals $W_1$, $W_2$, $W_3$, $W_4$, the command identification signals $To$, $Ti$, Add, Sub, Mult, and Div for producing the forward and reverse control signals $Cf$ and $Cr$, respectively, and the signal trains of weighted digital significance.

23. The system defined in claim 22 wherein the first modulo-seven counter includes bistable members for producing binary output signals $A_1$, $\bar{A}_1$, $A_2$, $\bar{A}_2$, $A_3$, $\bar{A}_3$ representing at any instant the accumulated count in the counter at that instant and wherein the second modulo-seven counter includes bistable members for producing binary output signals $B_1$, $\bar{B}_1$, $B_2$, $\bar{B}_2$, $B_3$, $\bar{B}_3$ representing at any instant the accumulated count of the counter at that instant and wherein the modulo-seven counters are coupled to the control circuit for selectively counting the signals of weighted significance with counting weights of 1, 2 and 3 in response to the signals $C_1$, $C_2$ and $C_3$ and in a forward or reverse direction in response to signals $Cf$ and $Cr$ and wherein the first modulo-seven counter includes a control matrix responsive to the control signals $Cf$ and $Cr$, the signals of weighted digital significance, the reset signals R and the complementary binary output signals $A_1$, $\bar{A}_1$, $A_2$, $\bar{A}_2$, $A_3$, $\bar{A}_3$ fed back from the output of said counter to produce pairs of control signals $1A_1$, $0A_1$ and $1A_2$, $0A_2$ and $1A_3$, $0A_3$ for respectively triggering the bistable members in the first counter and wherein the second modulo-seven counter includes a control matrix responsive to the control signals $Cf$ and $Cr$, the signals of weighted digital significance, the reset signals R and the complementary binary output signals $B_1$, $\bar{B}_1$, $B_2$, $\bar{B}_2$, $B_3$, $\bar{B}_3$ fed back from the output of said counter to produce pairs of control signals $1B_1$, $0B_1$ and $1B_2$, $0B_2$ and $1B_3$, $0B_3$ for respectively triggering the bistable members in the second counter.

24. The system defined in claim 23 wherein the control matrix for the first modulo-seven counter is connected in accordance with the following logical equations:

$$1A_1 = a\{Cf[C_1(\bar{A}_2+\bar{A}_3)+C_2.A_2.A_3+C_3.\bar{A}_3]$$
$$+Cr[C_1(A_2+A_3)+C_2.\bar{A}_2.\bar{A}_3+C_3.A_3]\}Cp$$
$$0A_1 = [a\{C_1+Cf[C_2.A_3+C_3.\bar{A}_3]+Cr[C_2.\bar{A}_2.\bar{A}_3$$
$$+C_3(A_2+A_3)]\}+R]Cp$$
$$1A_2 = a\{Cf[C_1.A_1+C_2(\bar{A}_1+\bar{A}_3)+C_3.\bar{A}_1.\bar{A}_3]$$
$$+Cr[C_1.\bar{A}_1+C_2(A_1+A_3)+C_3.A_1.A_3]\}Cp$$
$$0A_2 = [a\{Cf[C_1(A_1+A_3)+C_3.\bar{A}_1.\bar{A}_3]+CrC_1.\bar{A}_1$$
$$+C_3.A_1)+C_2\}+R]Cp$$
$$1A_3 = a\{Cf[C_1.A_1.A_2+C_2.A_2+C_3(A_1+A_2)]$$
$$+Cr[C_1.\bar{A}_1.\bar{A}_2+C_2.\bar{A}_2+C_3(\bar{A}_1+\bar{A}_2)]\}Cp$$
$$0A_3 = [a\{Cf[C_1.A_2+C_2(A_1+A_2)]+Cr(C_1.\bar{A}_1.\bar{A}_2$$
$$+C_2.\bar{A}_2)+C_3\}+R]Cp$$

wherein a dot (.), a pair of parentheses ( ) and a pair of brackets [ ], a pair of braces { } represent logical "and" functions, where a plus (+) represents the logical "or" function and where a bar (−) over a signal indicates the complement of the signal.

25. The system defined in claim 18 wherein the first modulo-three counter includes a pair of bistable members for producing binary output signals $A_1$, $\bar{A}_1$ and $A_2$, $\bar{A}_2$, respectively, representing at any instant the accumulated count of the counter at that instant and wherein the second modulo-three counter includes a pair of bistable members for producing binary output signals $B_1$, $\bar{B}_1$ and $B_2$, $\bar{B}_2$, respectively, representing at any instant the accumulated count of the counter at that instant and wherein the first modulo-three counter includes a control matrix responsive to the control signals $Cf$ and $Cr$, the signals of weighted digital significance, the reset signals R and the complementary binary output signals $A_1$, $\bar{A}_1$, $A_2$ and $\bar{A}_2$ fed back from the output of said counter to produce pairs of control signals $1A_1$, $0A_1$ and $1A_2$, $0A_2$ for respectively triggering the pair of bistable members in the first counter and wherein the second modulo-three counter includes a control matrix responsive to the control signals $Cf$ and $Cr$, the signals of weighted digital significance, the reset signals R and the complementa y binary output signals $B_1$, $\bar{B}_1$, $B_2$ and $\bar{B}_2$ fed back from the output of said counter to produce pairs of control signals $1B_1$, $0B_1$, and $1B_2$, $0B_2$ for respectively triggering the pair of bistable members in the second counter.

26. The system defined in claim 25 wherein the control matrix for the first modulo-three counter is connected in accordance with the following logical equations:

$$1A_1 = a(Cf.\bar{A}_2+Cr.A_2)Cp$$
$$0A_1 = (a+R)Cp$$
$$1A_2 = a(Cf.A_1+Cr.\bar{A}_1)Cp$$
$$0A_2 = (a+R)Cp$$

and wherein "$a$" represents the introduction of each signal of weighted digital significance to obtain a count and wherein a dot (.) and a pair of parentheses ( ) symbolically represent logical "and" functions, where a plus (+) symbolically represents a logical "or" function and where a bar (−) over a signal represents the complement of the signal.

27. In combination for providing a check as to the correctness of computations on a first plurality of signals digitally representing a first quantity and the polarity of the quantity and on a second plurality of signals digitally representing a second quantity and the polarity of the quantity to obtain the production of a third plurality of signals digitally representing a third quantity and the polarity of the quantity in accordance with the occurrence of signals controlling the operation of multiplication to be performed on the first and second quantities, means including a plurality of "and" networks and "or" networks connected in a particular interrelationship for providing a weighted significance for each of the signals in the first, second and third pluralities in accordance with the digital significance of the signals and in accordance with a selected modulo base to obtain for each digit a value less than the modulo base and for providing for each of the signals a polarity dependent upon the weighted significance, first means including a plurality of "and" networks and "or" networks connected in a particular interrelationship for providing a count on a cyclic basis and in a forward or reverse direction between particular minimum and maximum values dependent upon the selected modulo base, second means including a plurality of "and" networks and "or" networks connected in a particular interrelationship for providing a count on a cyclic basis and in a forward or reverse direction between the particular minimum and maximum values, means including a plurality of "and" networks and "or" networks responsive to the signals in the first plurality and to the control signals for providing a count in the first counter in the forward and reverse directions in accordance with the weighted significances of the signals in the first plurality and the polarities of such weighted significances and in accordance with the polarity of the first quantity, means including a plurality of "and" networks and "or" networks responsive to the signals in the second plurality and to the control signals for providing a count in the second counter in the forward and reverse directions in accordance with the weighted significances of the signals in the second plurality and the polarities of such weighted significances and in accordance with the polarity of the second quantity and in accordance with the count produced in the first counter, means including a plurality of "and" networks and "or" networks responsive to the control signals for resetting the first counter to the setting of the counter before the introduction of the signals in the first plurality and responsive to the control signals and the signals in the third plurality for providing a count in the first counter after the resetting and for providing the count in the forward and reverse directions in accordance with the weighted significances of the signals in the third plurality and the polarities of such weighted significances and the polarity of the third quantity, and means including a plurality of "and" networks and "or" networks responsive to the signals produced by the first and second counters to provide a comparison between the results in the counters for a determination as to the correctness of the signals in the third plurality.

References Cited in the file of this patent

UNITED STATES PATENTS

| | | |
|---|---|---|
| 2,241,591 | Gates | May 13, 1941 |
| 2,634,052 | Bloch | Apr. 17, 1953 |
| 2,686,299 | Eckert | Aug. 10, 1954 |
| 2,775,402 | Weiss | Dec. 25, 1956 |
| 2,826,359 | Deerhake et al. | Mar. 11, 1958 |
| 2,837,278 | Schreiner et al. | June 3, 1958 |

OTHER REFERENCES

"A Symbolic Analysis of Relay and Switching Circuits," Claude E. Shannon, Transactions of the AIEE, December 1938.

UNITED STATES PATENT OFFICE

Certificate of Correction

January 5, 1960

Patent No. 2,919,854

Ralph Singman

It is hereby certified that error appears in the printed specification of the above numbered patent requiring correction and that the said Letters Patent should read as corrected below.

Column 2, line 16, for "bi-quuinary" read —bi-quinary—; line 51, for "system it" read —system is—; column 3, line 30, for "decimal or" read —decimal nor—; column 4, line 23, for "dividen" read —dividend—; column 8, line 15, for "or $m$th" read —or $m^{th}$—; column 14, line 43, for "$Mod_n(_n-U)$" read —$Mod_n(n-U)$—; column 19, line 43, Equation (6), for "$B_t$)", second occurrence, read —$+B_t$)—; line 45, Equation (7), for that portion reading "(Add+Subt." read —(Add+Subt—; column 22, line 10, for "binary values (1 to 0)" read —binary values (1 or 0)—; column 24, line 36, for "$+Cr.\bar{B}_2$)" read —$+Cr.B_2$)—; column 28, line 57, for "$+B_2$)" read —$+\bar{B}_2$)—; line 63, for "$+B_2.b$" read —$+B_2.\bar{b}$—; column 29, line 21, for "and a counting" read —and counting—; line 45, for "$ToB_2=[\bar{B}_2\bar{B}_1$" read —$ToB_2=[\bar{B}_2.\bar{B}_1$—; line 56, for "$.b]Cp$" read —$.\bar{b}]Cp$—; line 57, for "$+B_3(b+B_2)$" read —$+B_3(\bar{b}+B_2)$—; column 34, line 10, for "$+B_1.B_3$)" read —$+B_1.B_2$)—; line 20, for "$+\bar{B}_2\bar{B}_3$)" read —$+\bar{B}_2.\bar{B}_3$)—; line 52, for "$C_{ss}=C_{st}+$" read —$C_{ss}=C_{st}=$—; column 38, line 6, for "divident" read —dividend—; column 41, line 67, for "modulo-$n$ of" read —modulo-$n$ values of—; column 42, line 1, for "supervision" read —supervising—.

Signed and sealed this 27th day of September 1960.

[SEAL]

Attest:
KARL H. AXLINE,
Attesting Officer.

ROBERT C. WATSON,
Commissioner of Patents.